US012536473B2

(12) United States Patent
Zahid et al.

(10) Patent No.: US 12,536,473 B2
(45) Date of Patent: Jan. 27, 2026

(54) HANDOFF SEQUENCE FOR CITY NODES

(71) Applicant: TOYOTA MOTOR NORTH AMERICA, INC., Plano, TX (US)

(72) Inventors: Imad Zahid, Carrollton, TX (US); Sumit K. Jha, Frisco, TX (US); Anil Nagpal, Plano, TX (US); Joshua C. Batie, Frisco, TX (US); Nikhil Rajendra, Dallas, TX (US)

(73) Assignees: TOYOTA MOTOR NORTH AMERICA, INC., Plano, TX (US); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 18/481,944

(22) Filed: Oct. 5, 2023

(65) Prior Publication Data

US 2025/0030505 A1      Jan. 23, 2025

Related U.S. Application Data

(60) Provisional application No. 63/514,512, filed on Jul. 19, 2023.

(51) Int. Cl.
*H04L 1/1809*      (2023.01)
*B60R 11/04*       (2006.01)
(Continued)

(52) U.S. Cl.
CPC ............... *G06N 20/00* (2019.01); *B60R 11/04* (2013.01); *B60R 21/01532* (2014.10); *B60W 40/08* (2013.01); *B60W 50/0097* (2013.01);
*B60W 50/14* (2013.01); *B60W 60/0015* (2020.02); *G01C 21/28* (2013.01);
(Continued)

(58) Field of Classification Search
None
See application file for complete search history.

(56) References Cited

U.S. PATENT DOCUMENTS 5,082,333 A     1/1992   Fukushima et al.
7,183,932 B2    2/2007   Bauer
(Continued)

FOREIGN PATENT DOCUMENTS

CA         3026666 A1      12/2018
CN       104778056 A       7/2015
(Continued)

OTHER PUBLICATIONS

US 2023/0031452 A1, 02/2023, Myers, Jr. et al. (withdrawn)
(Continued)

*Primary Examiner* — Daniel F. McMahon

(57) ABSTRACT

An example operation establishes a communication link between a first vehicle and a computing node. The system then identifies the data to be transmitted from the computing node to the first vehicle, considering that a portion of this data is already stored on a second vehicle. As the second vehicle is determined to be in proximity to the first vehicle, the system transmits the portion of the data stored on the second vehicle to the first vehicle. The remaining portion of the data is transmitted directly from the computing node to the first vehicle, completing the data transfer when the vehicles are in close proximity.

20 Claims, 52 Drawing Sheets

(51) Int. Cl.

| | | |
|---|---|---|
| *B60R 21/015* | (2006.01) | |
| *B60W 40/08* | (2012.01) | |
| *B60W 50/00* | (2006.01) | |
| *B60W 50/14* | (2020.01) | |
| *B60W 60/00* | (2020.01) | |
| *G01C 21/00* | (2006.01) | |
| *G01C 21/28* | (2006.01) | |
| *G06N 20/00* | (2019.01) | |
| *G06V 20/59* | (2022.01) | |
| *G08G 1/01* | (2006.01) | |
| *G08G 1/0962* | (2006.01) | |
| *G08G 1/0967* | (2006.01) | |
| *H04W 64/00* | (2009.01) | |
| *H04W 76/15* | (2018.01) | |

(52) U.S. Cl.
CPC ..... *G01C 21/3841* (2020.08); *G01C 21/3874* (2020.08); *G01C 21/3896* (2020.08); *G06V 20/597* (2022.01); *G08G 1/0112* (2013.01); *G08G 1/0116* (2013.01); *G08G 1/0125* (2013.01); *G08G 1/09626* (2013.01); *G08G 1/096716* (2013.01); *G08G 1/096783* (2013.01); *H04L 1/1809* (2013.01); *H04W 64/003* (2013.01); *H04W 76/15* (2018.02); *B60W 2050/009* (2013.01); *B60W 2050/143* (2013.01); *B60W 2050/146* (2013.01); *B60W 2540/043* (2020.02); *B60W 2540/215* (2020.02); *B60W 2540/221* (2020.02)

(56) References Cited

U.S. PATENT DOCUMENTS

| | | |
|---|---|---|
| 7,254,482 B2 | 8/2007 | Kawasaki et al. |
| 7,292,152 B2 | 11/2007 | Torkkola et al. |
| 7,450,603 B2 | 11/2008 | Nix et al. |
| 7,707,576 B2 | 4/2010 | Sun |
| 8,301,108 B2 | 10/2012 | Naboulsi |
| 8,326,258 B2 | 12/2012 | Chmielewski et al. |
| 8,495,239 B2 | 7/2013 | Cohen et al. |
| 8,725,311 B1 | 5/2014 | Breed |
| 8,972,090 B2 | 3/2015 | Weslati et al. |
| 9,075,702 B2 | 7/2015 | Park et al. |
| 9,211,891 B2 | 12/2015 | Scofield et al. |
| 9,240,079 B2 | 1/2016 | Lambert et al. |
| 9,460,601 B2 | 10/2016 | Mimar |
| 9,531,737 B2 | 12/2016 | Stählin |
| 9,792,740 B2 | 10/2017 | Lambert et al. |
| 9,821,657 B2 | 11/2017 | Gan |
| 9,849,802 B2 | 12/2017 | Chow et al. |
| 9,905,057 B2 | 2/2018 | Stacy |
| 9,915,950 B2 | 3/2018 | Hartung et al. |
| 10,036,646 B2 | 7/2018 | Schumann et al. |
| 10,081,317 B2 | 9/2018 | Naboulsi |
| 10,091,299 B2 | 10/2018 | Mian et al. |
| 10,104,525 B1 | 10/2018 | Kaiser et al. |
| 10,163,340 B2 | 12/2018 | Vandikas et al. |
| 10,196,071 B1 | 2/2019 | Rowson et al. |
| 10,225,348 B2 * | 3/2019 | Wang ............... H04L 67/02 |
| 10,235,859 B1 | 3/2019 | Hiles |
| 10,429,195 B2 | 10/2019 | Hashisho |
| 10,474,794 B2 | 11/2019 | Patton et al. |
| 10,490,075 B2 | 11/2019 | Bai et al. |
| 10,532,658 B2 | 1/2020 | Kim et al. |
| 10,672,200 B2 | 6/2020 | Wang et al. |
| 10,696,299 B2 | 6/2020 | Weldemariam et al. |
| 10,741,178 B2 | 8/2020 | Jo et al. |
| 10,816,978 B1 | 10/2020 | Schwalb |
| 10,829,110 B2 | 11/2020 | Nienhueser et al. |
| 10,850,616 B2 | 12/2020 | Koebler et al. |
| 10,912,509 B2 | 2/2021 | Alsbou |
| 10,976,170 B2 | 4/2021 | Morgan-Brown |
| 11,037,443 B1 | 6/2021 | Cui et al. |
| 11,044,588 B2 * | 6/2021 | Fox ................ H04W 8/005 |
| 11,047,704 B2 | 6/2021 | Yamamoto |
| 11,084,494 B2 | 8/2021 | Hu et al. |
| 11,124,153 B2 | 9/2021 | Narumi |
| 11,163,270 B2 | 11/2021 | Migneco et al. |
| 11,206,453 B2 | 12/2021 | Ramos et al. |
| 11,221,621 B2 | 1/2022 | Wengreen et al. |
| 11,221,622 B2 | 1/2022 | Schwie et al. |
| 11,287,270 B2 | 3/2022 | Xiang et al. |
| 11,310,626 B2 | 4/2022 | Mian et al. |
| 11,323,168 B2 | 5/2022 | Legg et al. |
| 11,388,241 B1 | 7/2022 | Myers, Jr. et al. |
| 11,400,944 B2 | 8/2022 | Soltanian et al. |
| 11,513,523 B1 | 11/2022 | Schwalb |
| 11,526,721 B1 | 12/2022 | O'Malley |
| 11,539,818 B2 * | 12/2022 | Sabella ............ H04L 67/289 |
| 11,620,473 B1 | 4/2023 | Zhang |
| 11,625,745 B1 | 4/2023 | Warden et al. |
| 11,667,299 B2 | 6/2023 | Memani et al. |
| 11,673,570 B2 | 6/2023 | Chambers et al. |
| 11,685,409 B2 | 6/2023 | Kim et al. |
| 11,694,543 B2 | 7/2023 | Biala et al. |
| 11,697,420 B2 | 7/2023 | Bade et al. |
| 11,780,458 B1 | 10/2023 | Hussain et al. |
| 11,794,676 B1 | 10/2023 | Benqassmi et al. |
| 11,866,036 B2 | 1/2024 | Klingemann et al. |
| 12,162,500 B1 | 12/2024 | Egbert et al. |
| 2006/0069473 A1 | 3/2006 | Sumcad et al. |
| 2006/0261933 A1 | 11/2006 | Deniau et al. |
| 2007/0054685 A1 | 3/2007 | Kellum |
| 2008/0133120 A1 | 6/2008 | Romanick |
| 2008/0243558 A1 | 10/2008 | Gupte |
| 2008/0293405 A1 | 11/2008 | Meyer |
| 2009/0319341 A1 | 12/2009 | Berkobin et al. |
| 2010/0023201 A1 | 1/2010 | Kinney et al. |
| 2010/0070128 A1 | 3/2010 | Johnson |
| 2011/0131666 A1 | 6/2011 | Tanaka |
| 2012/0101713 A1 | 4/2012 | Moshchuk et al. |
| 2013/0167037 A1 | 6/2013 | Xaio |
| 2013/0342364 A1 | 12/2013 | Grimm et al. |
| 2014/0277896 A1 | 9/2014 | Lathrop et al. |
| 2014/0303806 A1 | 10/2014 | Bai et al. |
| 2014/0309886 A1 | 10/2014 | Ricci |
| 2015/0120135 A1 | 4/2015 | Lawrenson |
| 2015/0245280 A1 | 8/2015 | Zhou et al. |
| 2015/0294547 A1 | 10/2015 | Ito et al. |
| 2016/0001781 A1 | 1/2016 | Fung et al. |
| 2017/0129496 A1 | 5/2017 | Li et al. |
| 2017/0132923 A1 | 5/2017 | Li et al. |
| 2017/0262453 A1 | 9/2017 | Raichelgauz et al. |
| 2017/0334374 A1 | 11/2017 | Naboulsi |
| 2017/0355377 A1 | 12/2017 | Vijaya Kumar et al. |
| 2018/0012424 A1 | 1/2018 | Ricci |
| 2018/0024627 A1 | 1/2018 | McNew |
| 2018/0029612 A1 | 2/2018 | Tsuyunashi et al. |
| 2018/0128628 A1 * | 5/2018 | Cheaz ............... H04W 84/00 |
| 2018/0146323 A1 * | 5/2018 | Tseng ............... H04W 4/80 |
| 2018/0240335 A1 | 8/2018 | Dong et al. |
| 2018/0244288 A1 | 8/2018 | Glaser et al. |
| 2018/0332509 A1 | 11/2018 | Feng |
| 2018/0365998 A1 | 12/2018 | Shibata et al. |
| 2019/0028904 A1 * | 1/2019 | Carpenter ............ B64U 70/93 |
| 2019/0050718 A1 * | 2/2019 | Tickoo ............... G01C 21/28 |
| 2019/0116476 A1 | 4/2019 | Qiu et al. |
| 2019/0128681 A1 * | 5/2019 | Hans ............... G01C 21/3492 |
| 2019/0302766 A1 | 10/2019 | Mondello et al. |
| 2019/0377362 A1 | 12/2019 | Lee |
| 2019/0392707 A1 * | 12/2019 | McEnroe ........... H04L 67/535 |
| 2020/0031371 A1 | 1/2020 | Soliman |
| 2020/0073405 A1 * | 3/2020 | Xu ............... B60W 60/001 |
| 2020/0117187 A1 | 4/2020 | Kothari |
| 2020/0130711 A1 | 4/2020 | Turek et al. |
| 2020/0166363 A1 | 5/2020 | Mcgavran et al. |
| 2020/0290630 A1 | 9/2020 | Elwart et al. |
| 2020/0346663 A1 | 11/2020 | Park et al. |
| 2020/0388154 A1 | 12/2020 | Kim et al. |
| 2021/0035125 A1 | 2/2021 | Casey et al. |
| 2021/0149397 A1 | 5/2021 | Shin et al. |
| 2021/0150828 A1 | 5/2021 | Mezaael et al. |

(56) References Cited

U.S. PATENT DOCUMENTS

| | | | |
|---|---|---|---|
| 2021/0272462 A1* | 9/2021 | Yang | G05D 1/0289 |
| 2021/0297472 A1 | 9/2021 | Calvert et al. | |
| 2021/0309217 A1 | 10/2021 | Kim et al. | |
| 2021/0309255 A1 | 10/2021 | Roesner | |
| 2021/0312725 A1 | 10/2021 | Milton | |
| 2021/0319691 A1* | 10/2021 | Merwaday | G08G 1/0116 |
| 2021/0407292 A1 | 12/2021 | Cui et al. | |
| 2022/0074756 A1 | 3/2022 | Gewickey et al. | |
| 2022/0129948 A1 | 4/2022 | Cho et al. | |
| 2022/0163969 A1 | 5/2022 | Li | |
| 2022/0194433 A1 | 6/2022 | Nagata et al. | |
| 2022/0201584 A1 | 6/2022 | Piriou et al. | |
| 2022/0228874 A1 | 7/2022 | Nader et al. | |
| 2022/0234615 A1 | 7/2022 | Nishino et al. | |
| 2022/0242448 A1 | 8/2022 | Chen et al. | |
| 2022/0266842 A1 | 8/2022 | Li et al. | |
| 2022/0289250 A1 | 9/2022 | Oba | |
| 2022/0297726 A1 | 9/2022 | Zhang et al. | |
| 2022/0308579 A1 | 9/2022 | Flores et al. | |
| 2022/0381564 A1 | 12/2022 | Kitchen et al. | |
| 2022/0408340 A1 | 12/2022 | Paczkowski et al. | |
| 2023/0020772 A1 | 1/2023 | Aluvila et al. | |
| 2023/0031709 A1 | 2/2023 | Yu et al. | |
| 2023/0055974 A1 | 2/2023 | Arnold et al. | |
| 2023/0058508 A1 | 2/2023 | Bush et al. | |
| 2023/0063370 A1 | 3/2023 | Li | |
| 2023/0096556 A1 | 3/2023 | Lerner et al. | |
| 2023/0115240 A1 | 4/2023 | Sidhu et al. | |
| 2023/0140079 A1 | 5/2023 | Zhu et al. | |
| 2023/0147000 A1 | 5/2023 | Heiden et al. | |
| 2023/0156055 A1 | 5/2023 | Apanovitch et al. | |
| 2023/0343223 A1* | 10/2023 | Obraczka | G05D 1/0295 |
| 2023/0373334 A1* | 11/2023 | Lu | B60L 55/00 |
| 2023/0375351 A1 | 11/2023 | Palanisamy et al. | |
| 2024/0029484 A1* | 1/2024 | Benjamin | G07C 5/008 |
| 2024/0101123 A1 | 3/2024 | Ksiazek | |
| 2024/0123975 A1 | 4/2024 | Sridharan | |
| 2024/0144695 A1 | 5/2024 | Ropel et al. | |
| 2024/0169259 A1 | 5/2024 | Ferreira et al. | |
| 2024/0198937 A1 | 6/2024 | Benqassmi et al. | |
| 2024/0198938 A1 | 6/2024 | Carlos et al. | |
| 2024/0211797 A1 | 6/2024 | Pronovost | |
| 2024/0314578 A1 | 9/2024 | Henry et al. | |
| 2024/0400077 A1 | 12/2024 | Kondasani et al. | |
| 2024/0422764 A1 | 12/2024 | Sun et al. | |
| 2025/0153729 A1 | 5/2025 | Minnerup et al. | |

FOREIGN PATENT DOCUMENTS

| | | |
|---|---|---|
| CN | 105976609 A | 9/2016 |
| CN | 105989712 A | 10/2016 |
| CN | 106548679 A | 3/2017 |
| CN | 108650656 A | 10/2018 |
| CN | 112801351 A | 5/2021 |
| CN | 112950939 A | 6/2021 |
| CN | 112970285 A | 6/2021 |
| CN | 113056930 A | 6/2021 |
| CN | 113891823 A | 1/2022 |
| CN | 114358240 A | 4/2022 |
| CN | 114802059 A | 7/2022 |
| EP | 2288521 A1 | 3/2011 |
| EP | 2992418 A1 | 3/2016 |
| EP | 3269203 A1 | 1/2018 |
| EP | 3272613 A1 | 1/2018 |
| EP | 3299766 A1 | 3/2018 |
| EP | 3374902 A1 | 9/2018 |
| EP | 3401786 A2 | 11/2018 |
| EP | 3543906 A1 | 9/2019 |
| EP | 3629105 A1 | 4/2020 |
| EP | 4011740 A2 | 6/2022 |
| WO | 2016020151 A1 | 2/2016 |

OTHER PUBLICATIONS

M. Kanwal, A. W. Malik, A. U. Rahman, I. Mahmood and M. Shahzad, "Sustainable Vehicle-Assisted Edge Computing for Big Data Migration in Smart Cities," in IEEE Internet of Things Journal, vol. 7, No. 3, pp. 1857-1871, Mar. 2020, (Year: 2020).*

Rechtin, Goodbye MBUX, hello MB.OS. New Mercedes infotainment coming soon 'Hey Mercedes' gets smarter, navigation gets more realistic, audio goes full 3D, Mar. 21, 2022, https://www.autoblog.com/2022/03/21/mercedes-mb-os/.

Smith, Hallucinations Could Blunt ChatGPT's Success OpenAI says the problem's solvable, Yann LeCun says we'll see, Mar. 13, 2023, https://spectrum.ieee.org/ai-hallucination.

Smith, The Future of Intelligent Transportation Systems (ITS): Applying Lessons Learned From 30 Years of Innovation, Spring 2022, Issue No. vol. 86 No. 1Publication No. FHWA-HRT-22-003, https://highways.dot.gov/public-roads/spring-2022/03.

SOMANYM3s, You can now Watch videos in the browsers [Update: only while in Park], Oct. 26, 2019, https://teslamotorsclub.com/tmc/threads/you-can-now-watch-videos-in-the-browsers-update-only-while-in-park.171461/.

Stocksdale, Audi testing bus, school zone vehicle-to-infrastructure system, May 23, 2021, https://www.autoblog.com/2021/05/23/audi-v2x-vehicle-infrastructure-school-bus-zone-warning-system/.

Tan, GPT-4 Inherits "Hallucinating" Facts and Reasoning Errors From Earlier GPT Models, Mar. 16, 2023, https://mpost.io/gpt-4-inherits-hallucinating-facts-and-reasoning-errors-from-earlier-gpt-models/.

Unknown, MHI Group to Participate in Vehicle-to-Infrastructure (V2I) Demonstration Test Program to Support Autonomous Highway Driving—Groupwide Technologies to Help Achieve Autonomous Driving Society—, Oct. 5, 2022, https://www.mhl.com/news/22100502.html.

Weise et al., When A.I. Chatbots Hallucinate, The New York Times, May 1, 2023.

Unknown, Cadillac unveils electric Escalade IQ; 200kWh, 450 miles, pricing starting around 130K, Aug. 10, 2023, https://www.greencarcongress.com/2023/08/20230910-escaladeiq.html.

Bellan, GM aims to build Netflix-sized subscription business by 2030, Oct. 6, 2021, https://techcrunch.com/2021/10/06/gm-aims-to-build-netflix-sized-subscription-business-by-2030/.

Bhardwaj, Audi GLOSA (Green Light Optimised Speed Advisory), Jul. 8, 2022, https://gomechanic.in/blog/audi-glosa-green-light-optimised-speed-advisory/.

McEachern, Just 25 Percent Of Car Buyers Willing To Pay For Subscription Services, Apr. 21, 2022, https://gmauthority.com/blog/2022/04/just-25-percent-of-car-buyers-willing-to-pay-for-subscription-services/.

Palkar, How Uber Uses Machine Learning to Reinvent Transportation?, Nov. 10, 2020, https://palkardurvesh.medium.com/how-uber-uses-machine-learning-to-reinvent-transportation-9412e4a3e4e9.

Unknown, Artificial Intelligence (AI) in Automotive Market Size by Component (Software, Hardware, Service), by technology (computer vision, context Awareness, Deep Learning, Machine Learning, Natural Language Processing (NLP)), Process Application, 2018-2032, Published Dec. 2022, https://www.gminsights.com/industry-analysis/artificial-intelligence-ai-in-automotive-market.

Unknown, Automotive Artificial Intelligence (AI) Market Size (By Offering: Software and Hardware; By Process: Signal Recognition, Image Recognition, Voice Recognition, and Data Mining; By Technology: Deep Learning, Machine Learning, Context Awareness, Computer Vision, and Natural Language Processing; and By Application: Human-Machine Interface, Semi-Autonomous Driving, Autonomous Driving)—Global Industry Analysis, Market Size, Opportunities and Forecast 2022-2030, published May 2022, https://www.acumenresearchandconsulting.com/.

Unknown, Comfort and Infotainment Subscriptions: A Scalable Growth Vector for OEMs, intellias, published Mar. 31, 2023, updated Aug. 21, 2023, https://intellias.com/comfort-infotainment-subscriptions/.

Unknown, Personal development market size to grow by USD 755.16 million between 2022 and 2027; Growth driven by the rise in cost-effective content development—Technavio, Technavio, Apr.

(56) References Cited

OTHER PUBLICATIONS 3, 2023, https://www.prnewswire.com/news-releases/personal-development-market-size-to-grow-by-usd-755-16-million-between-2022-and-2027-growth-driven-by-the-rise-in-cost-effective-content-development---technavio-301785709.html.

Unknown, Personal Development Market Size, Share & Trends Analysis Report By Instrument (Books, e-Platforms), By Focus Area (Mental Health, Physical Health), By Region, And Segment Forecasts, 2023-2030, Report ID: GVR-4-68038-804-6.

Unknown, Research Blog, top 10 Automotive Industry Trends & Innovations in 2024, last downloaded on , https://www.startus-insights.com/innovators-guide/automotive-industry-trends-10-innovations-that-will-impact-automotive-companies-in-2020-beyond/.

Unknown, The subscription Economy Index, Zuora, Mar. 2023.

International Search Report and Written Opinion issued in the International PCT Application No. PCT/US2024/038905, mailed on Oct. 18, 2024.

\* cited by examiner

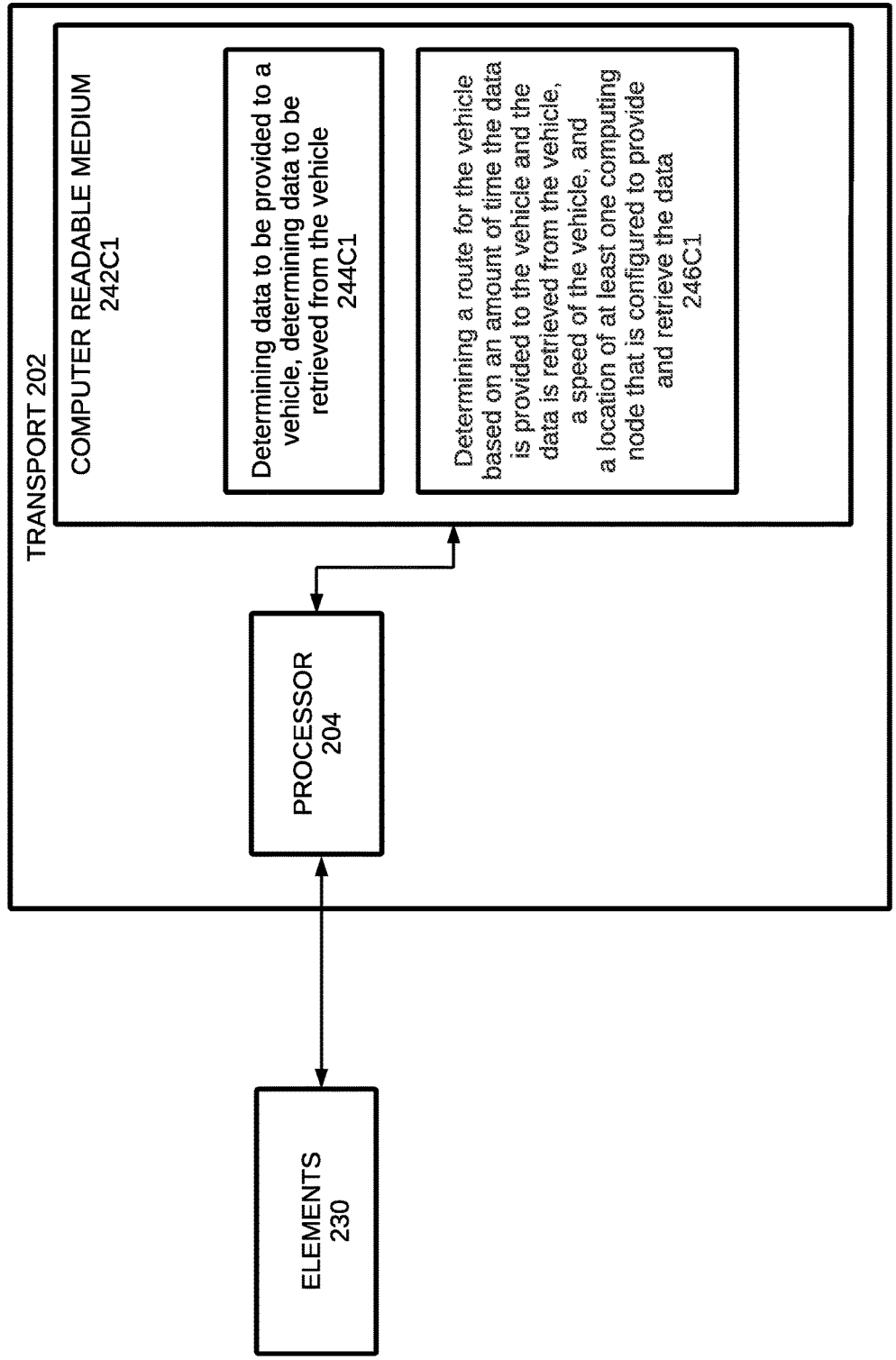
FIG. 2C1

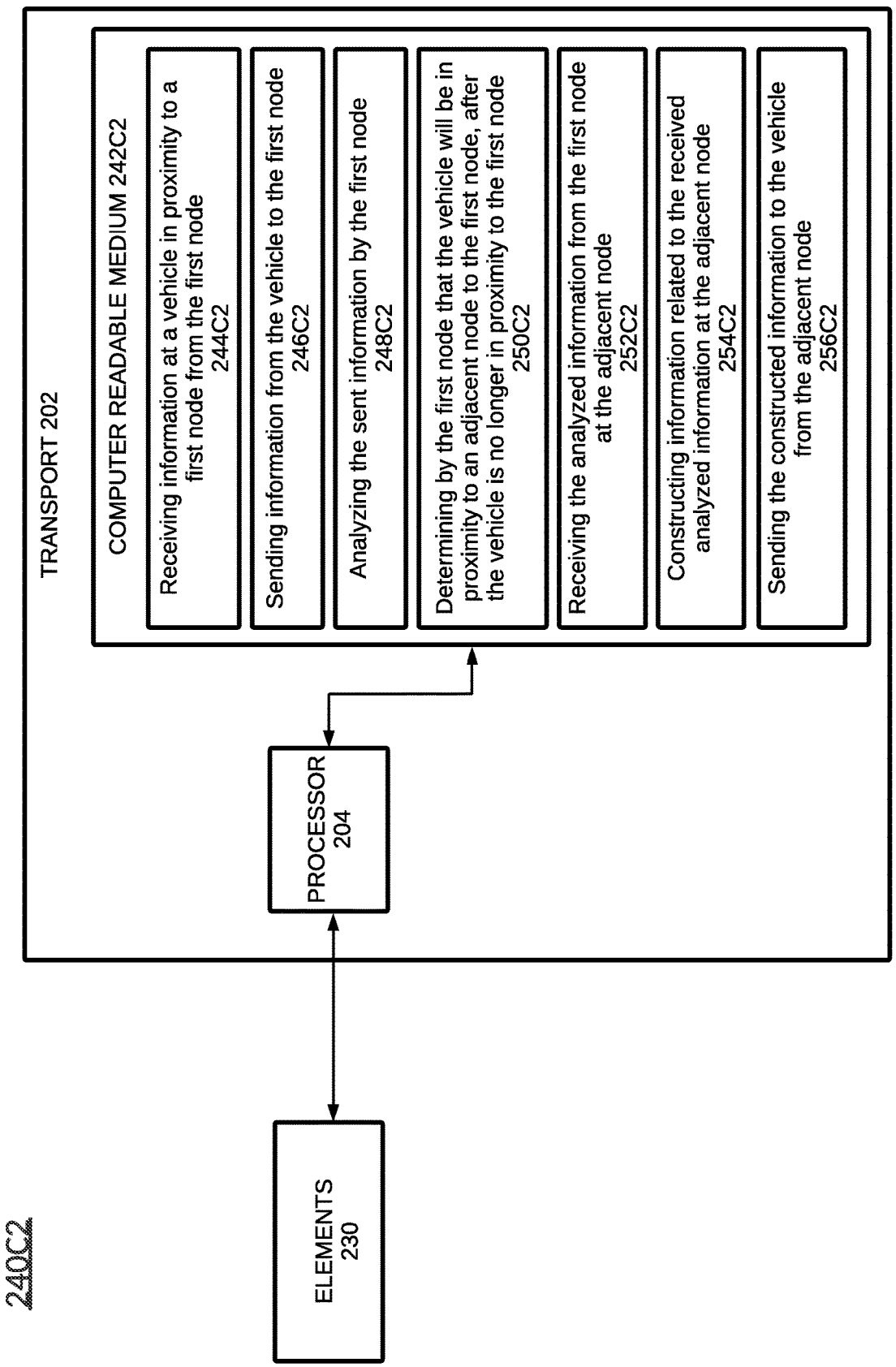
FIG. 2C2

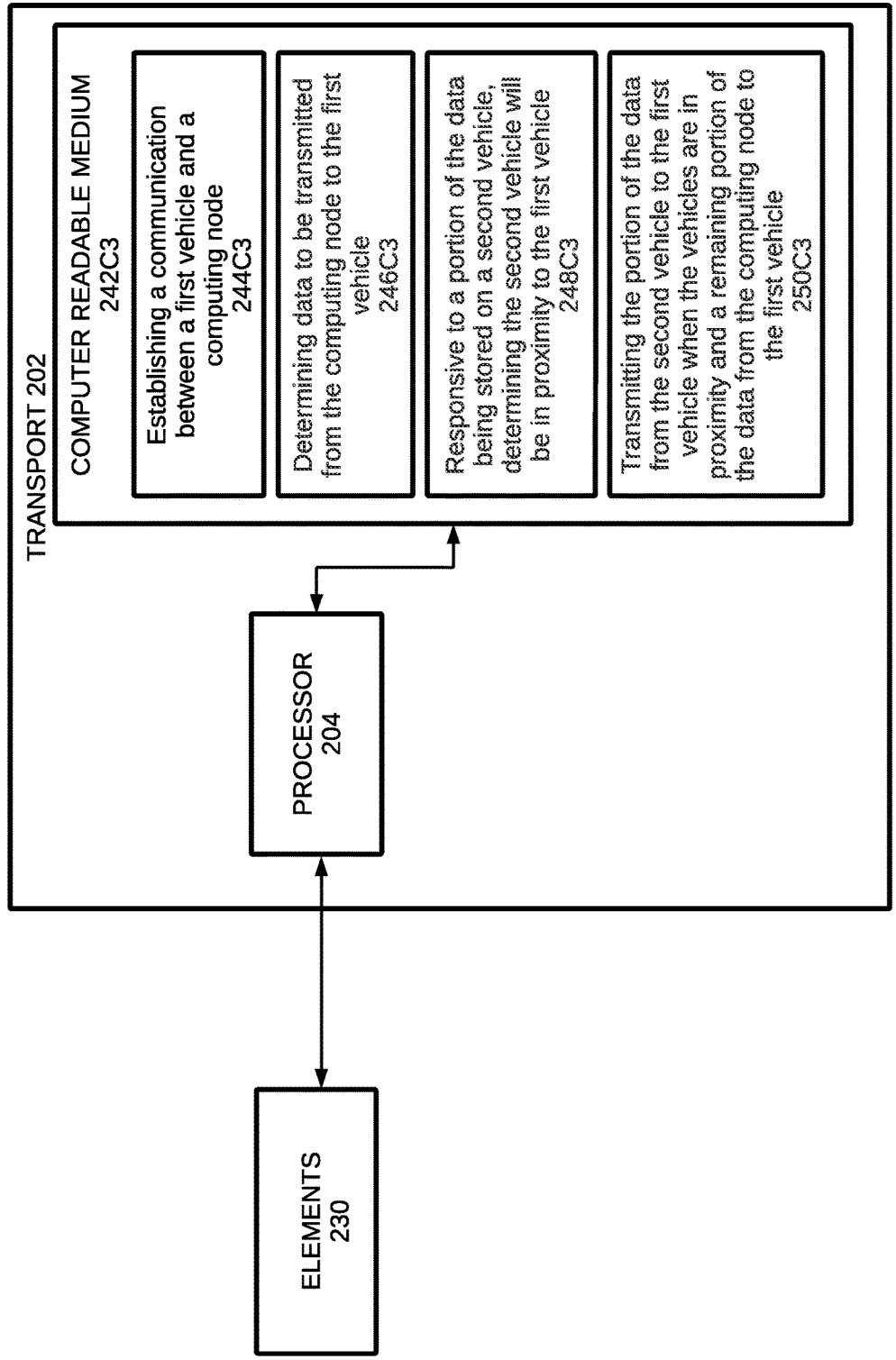
FIG. 2C3

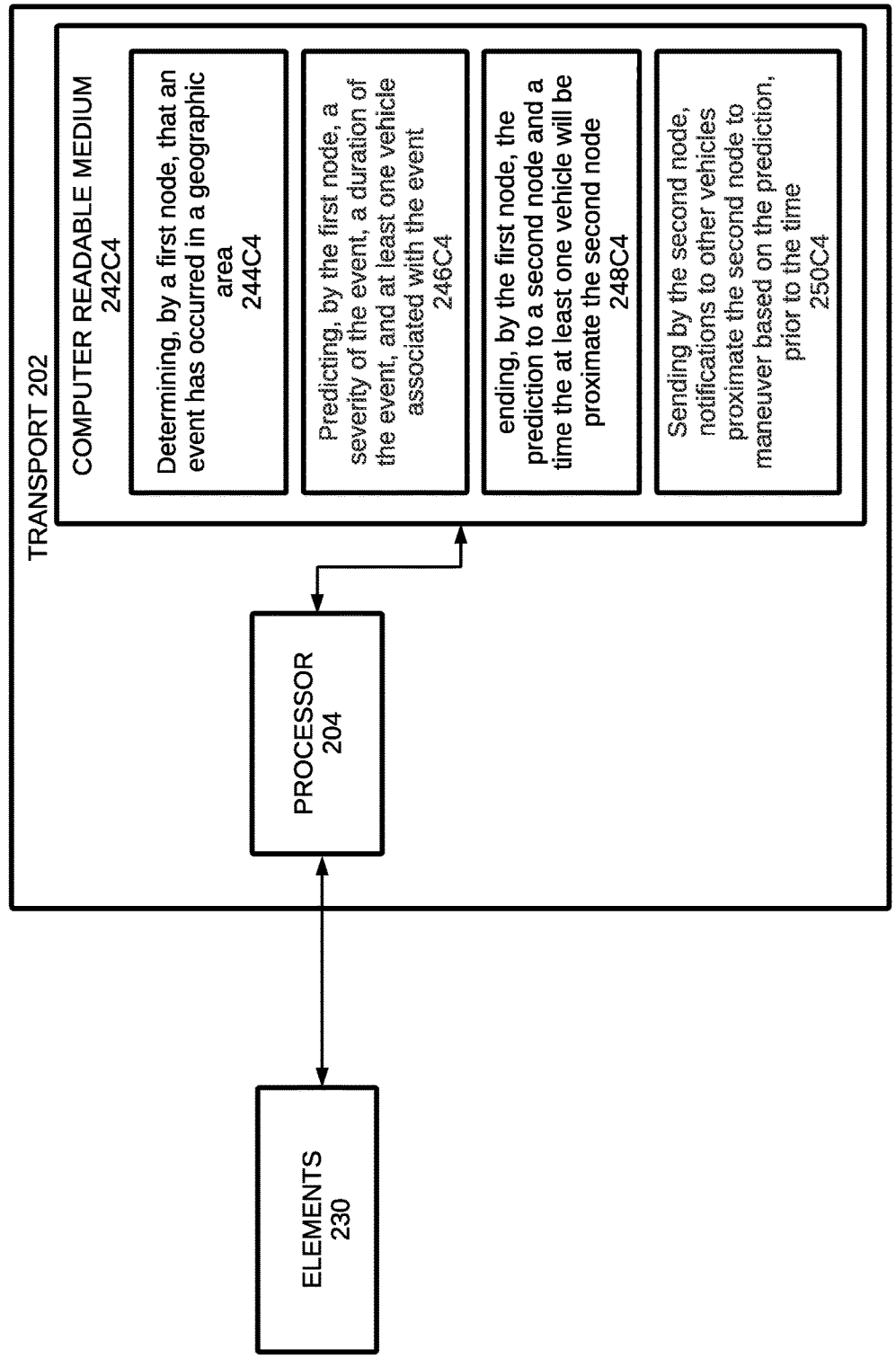

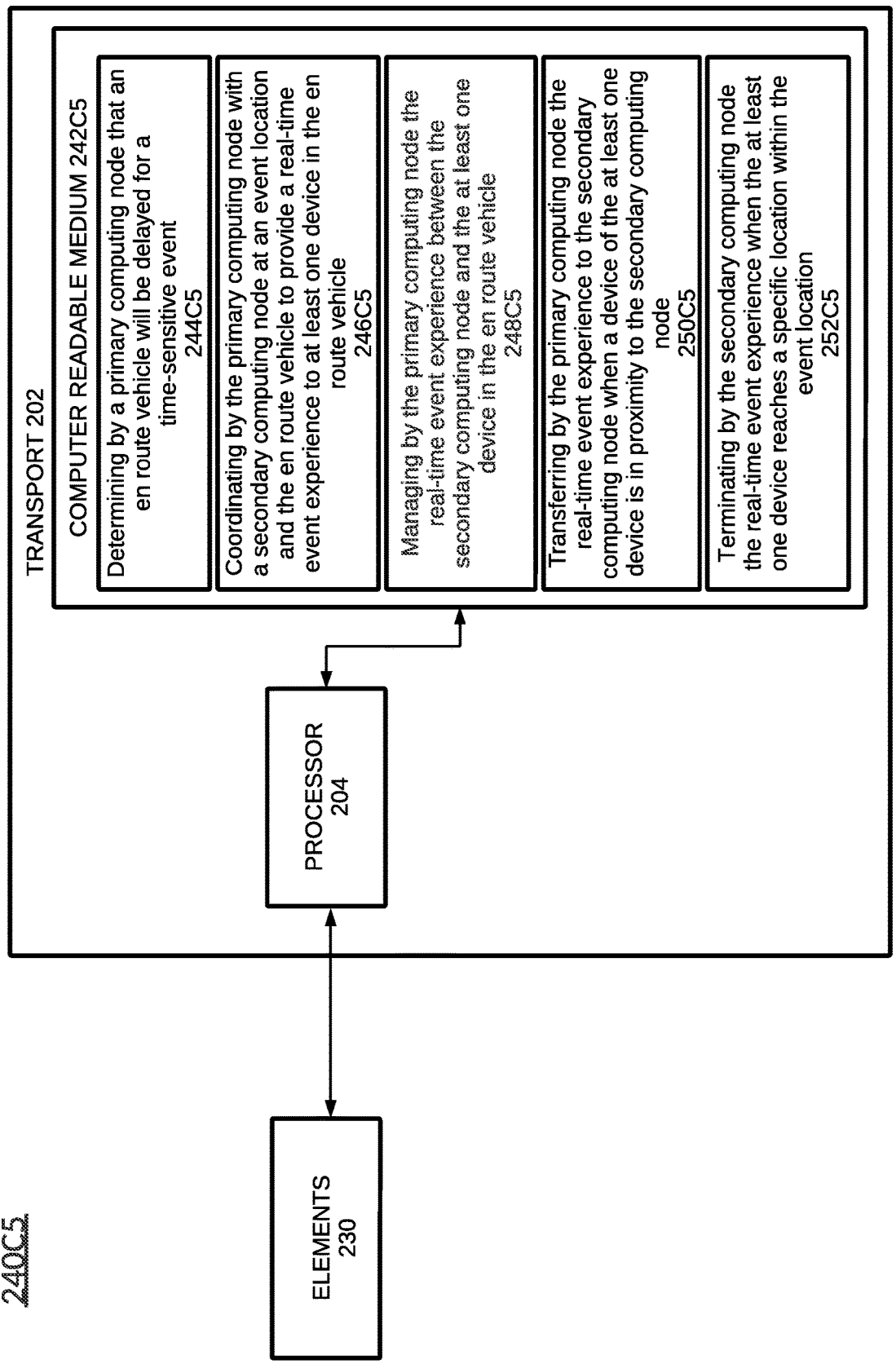
FIG. 2C5

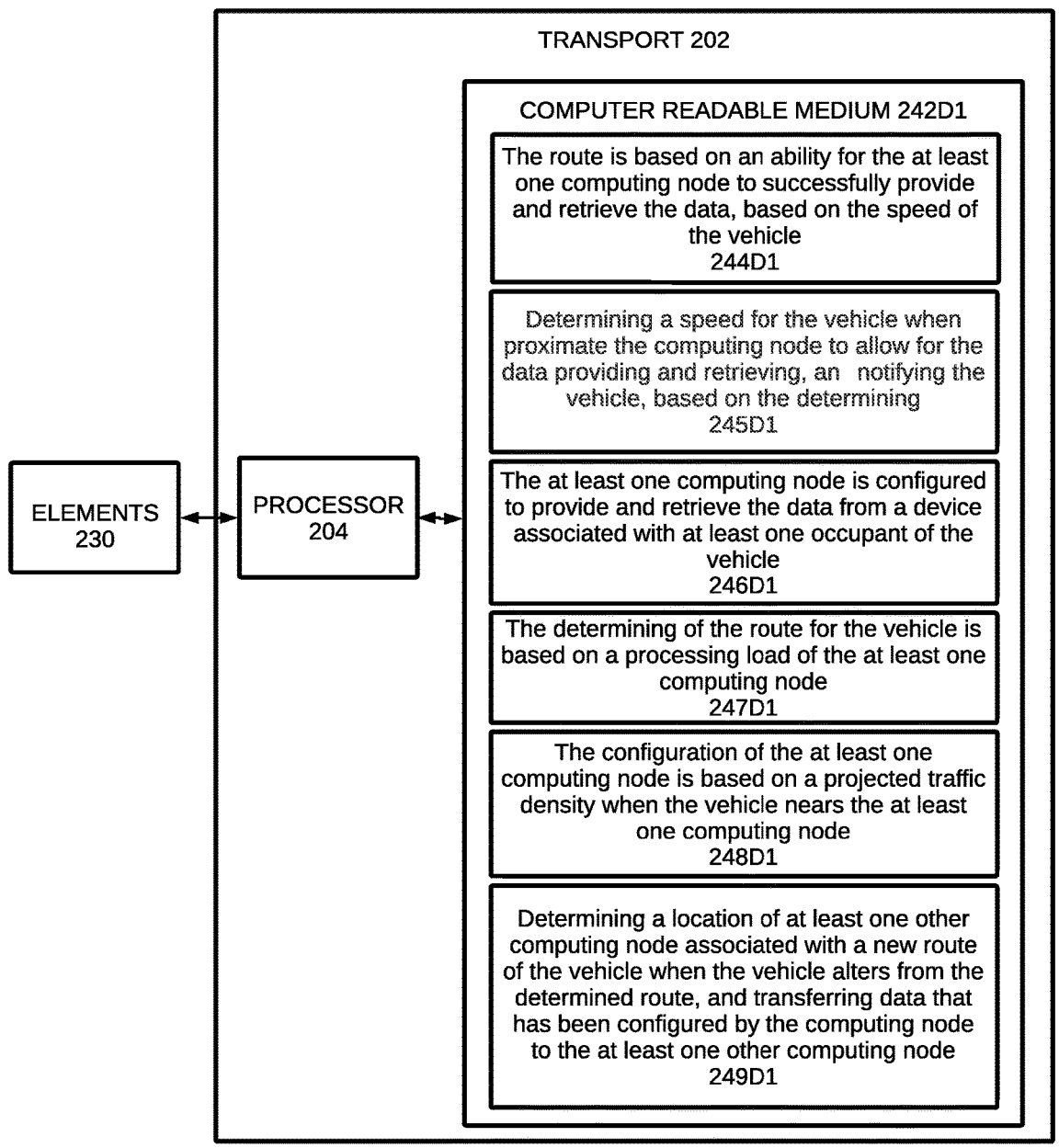
FIG. 2D1

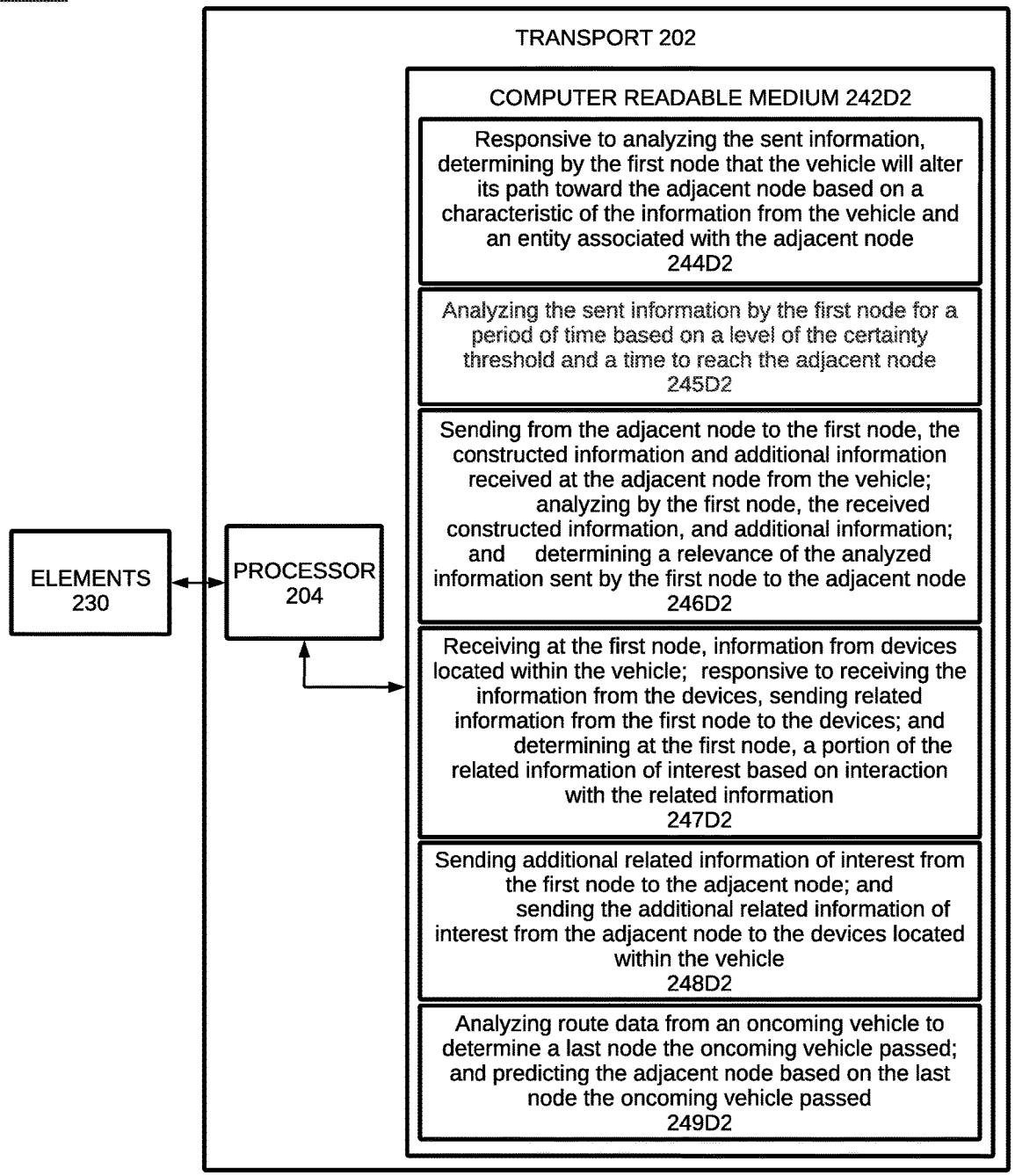
FIG. 2D2

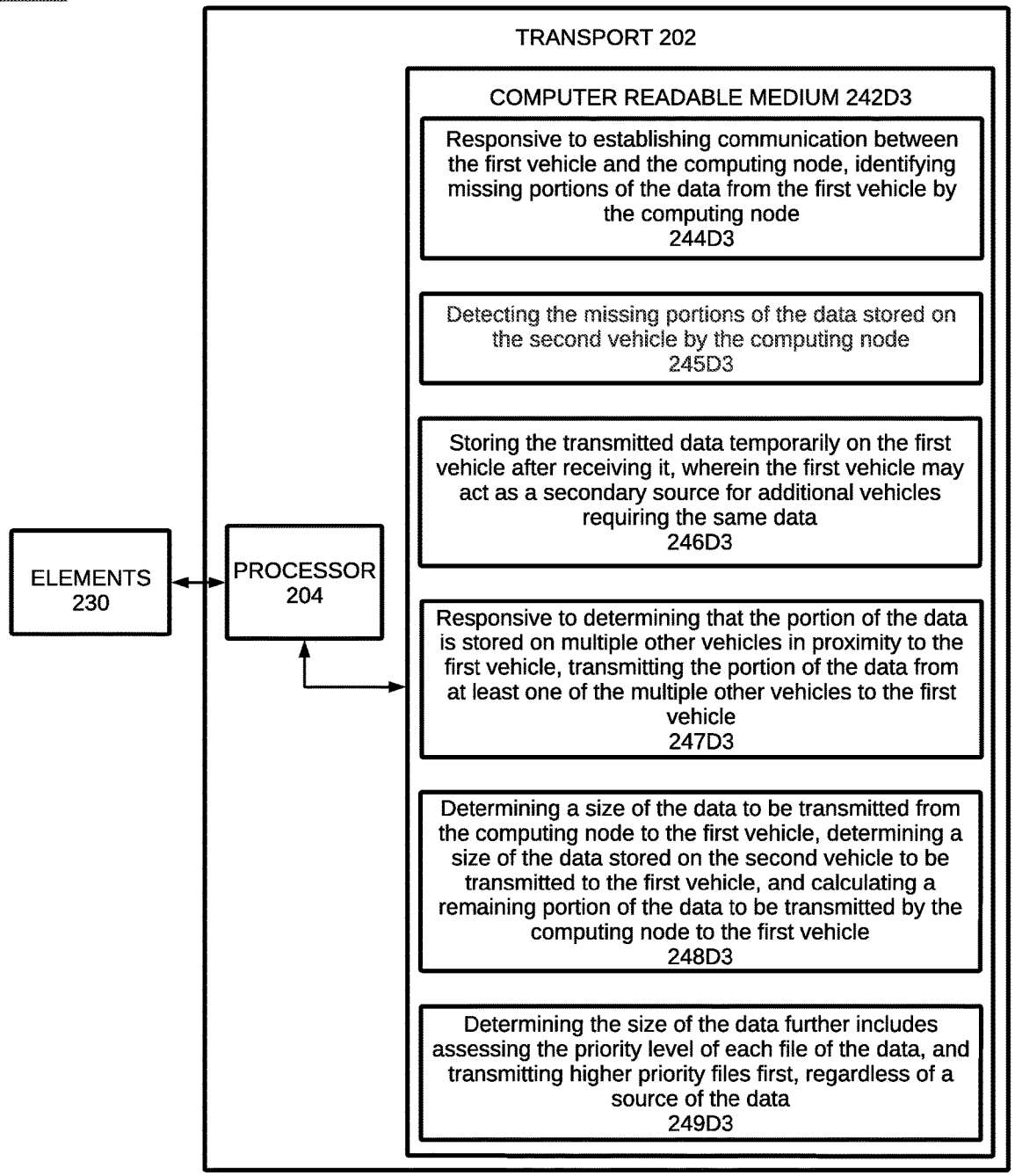
FIG. 2D3

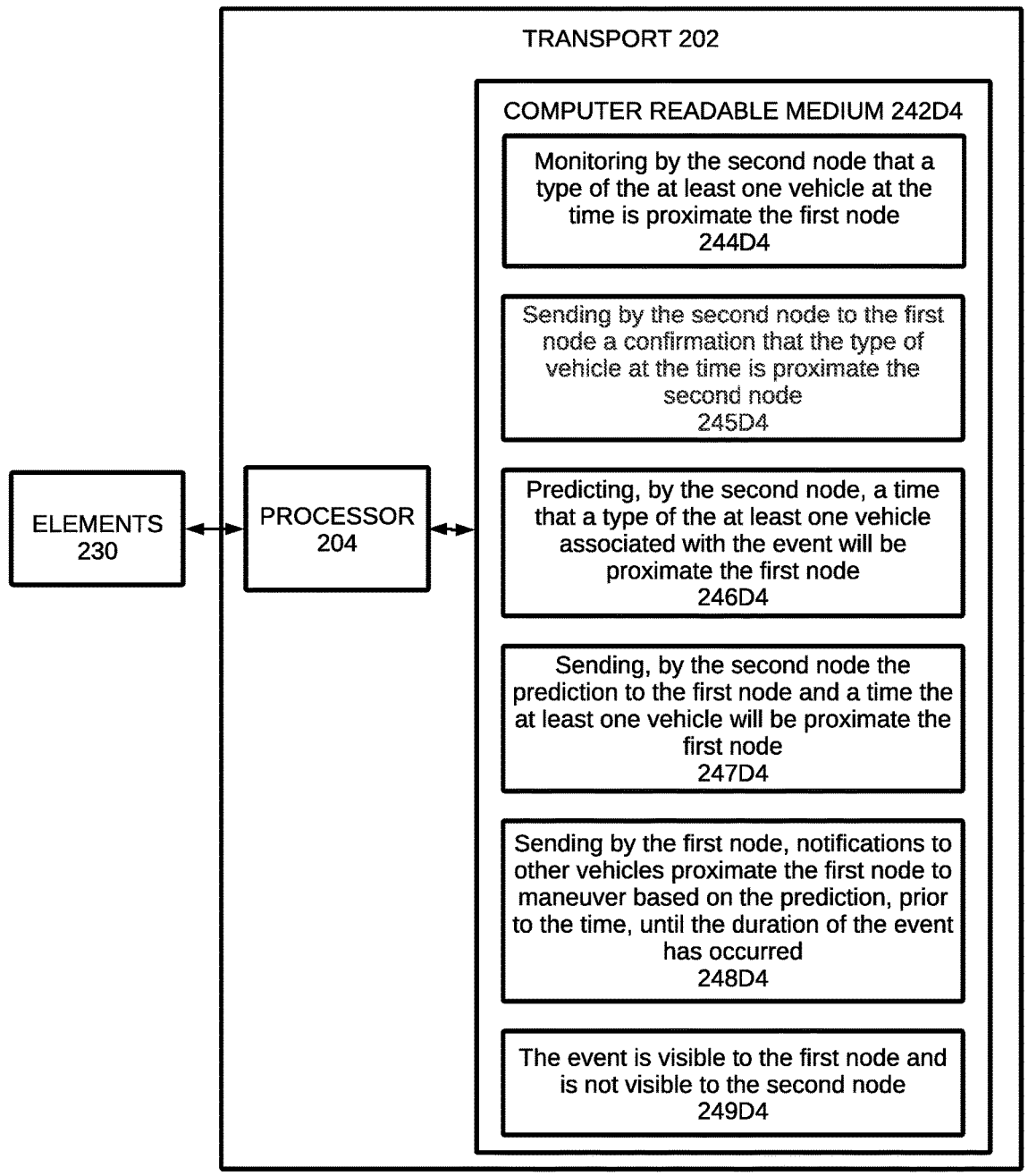
FIG. 2D4

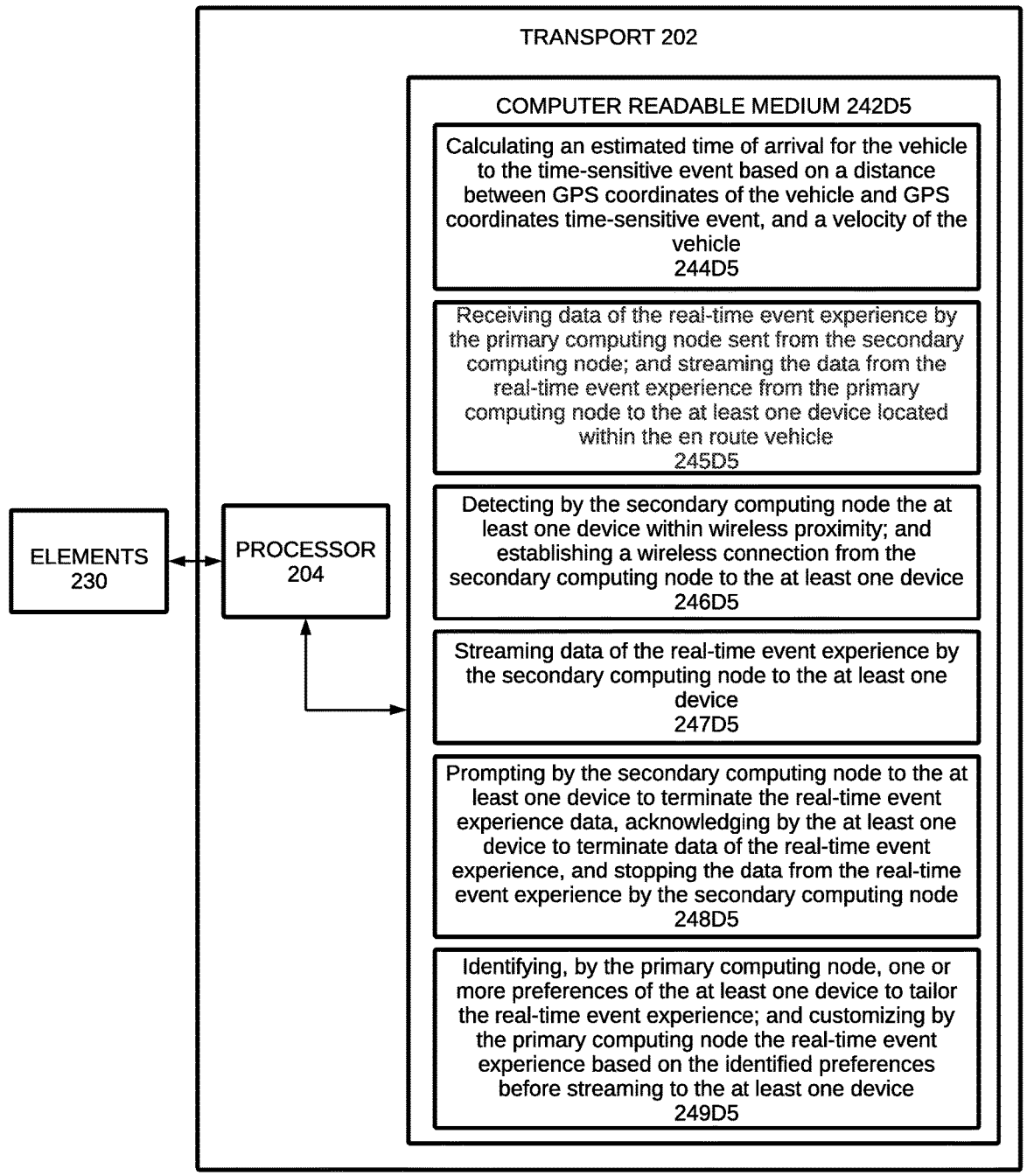
FIG. 2D5

260E1
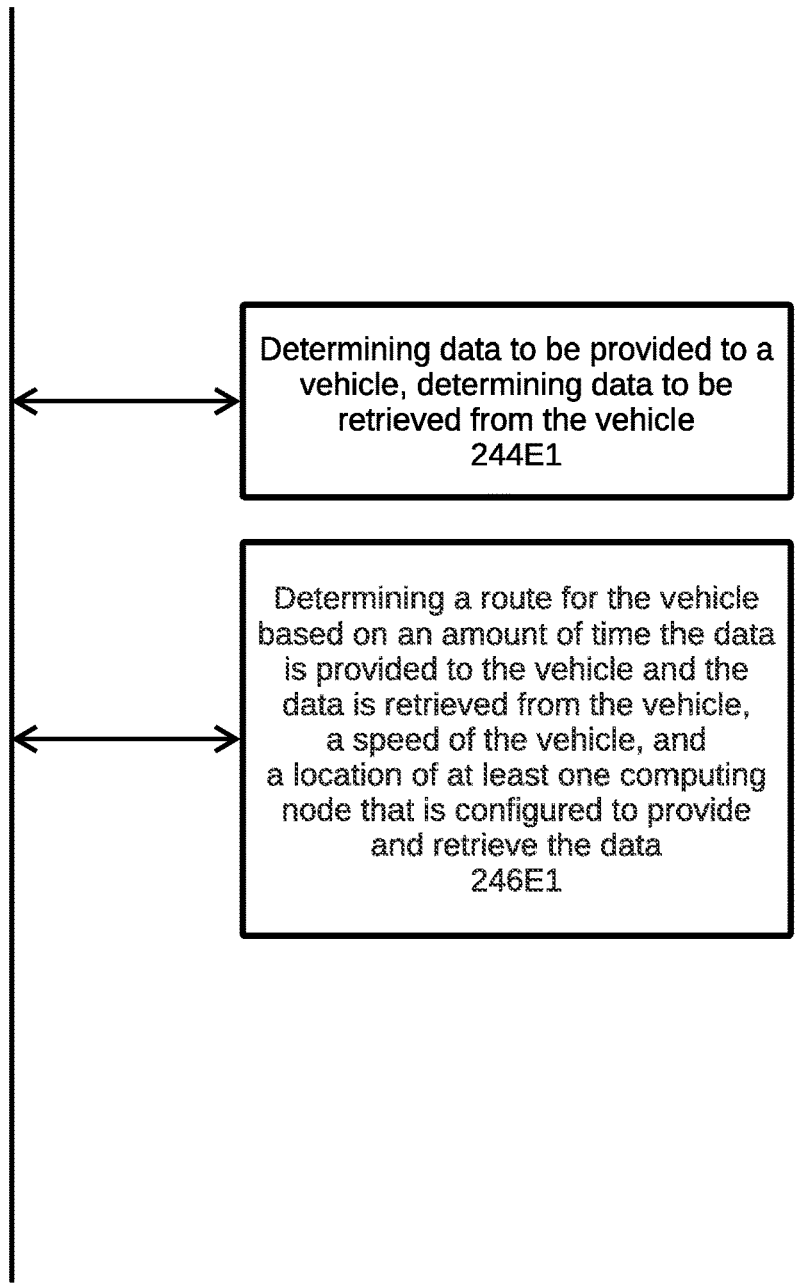
FIG. 2E1

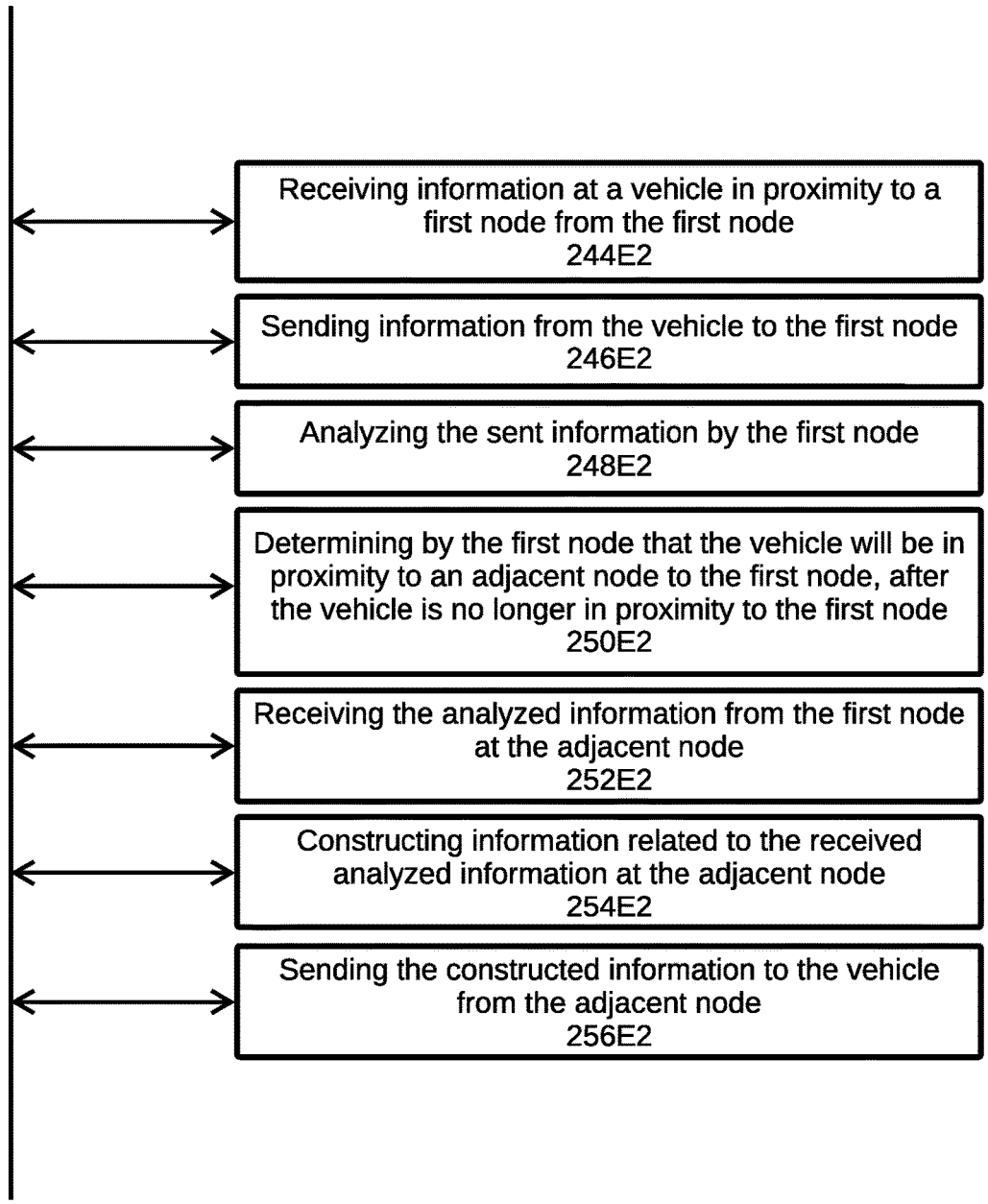
FIG. 2E2

260E3
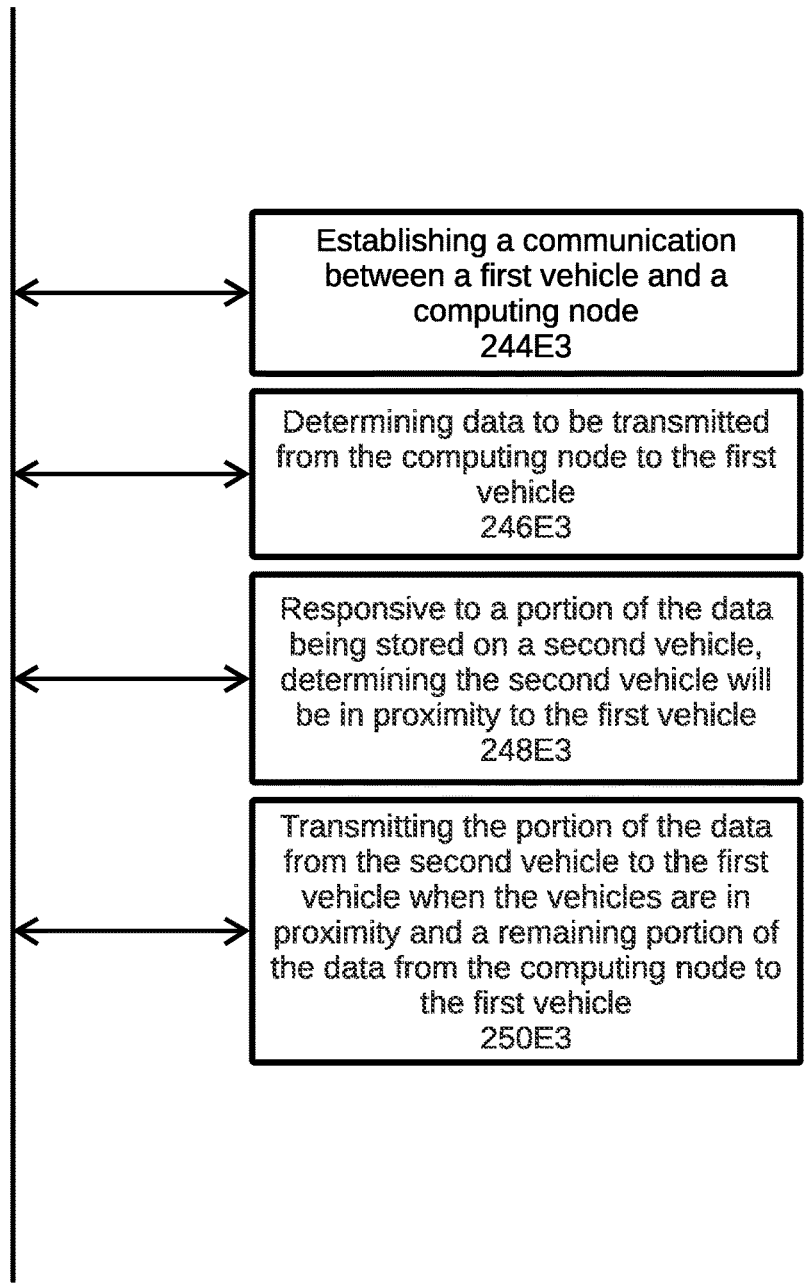
FIG. 2E3

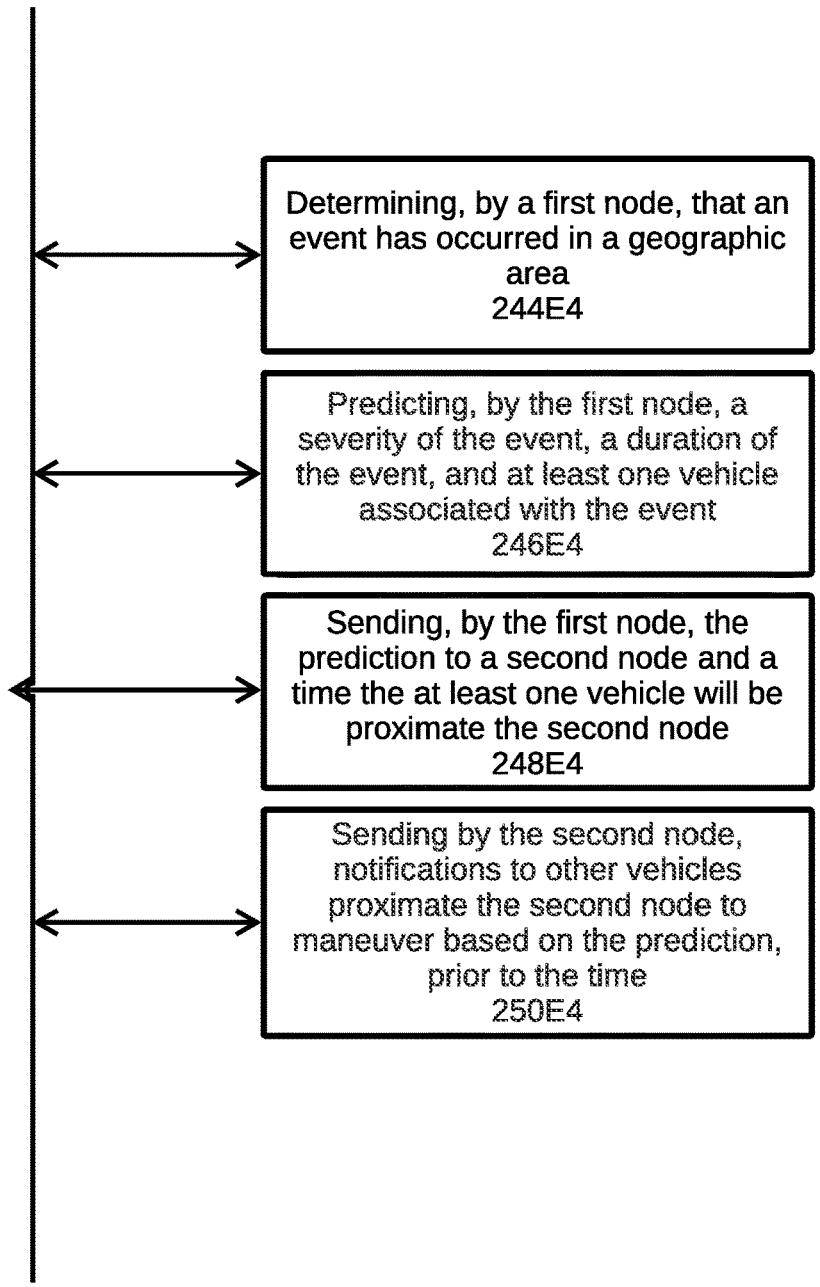
FIG. 2E4

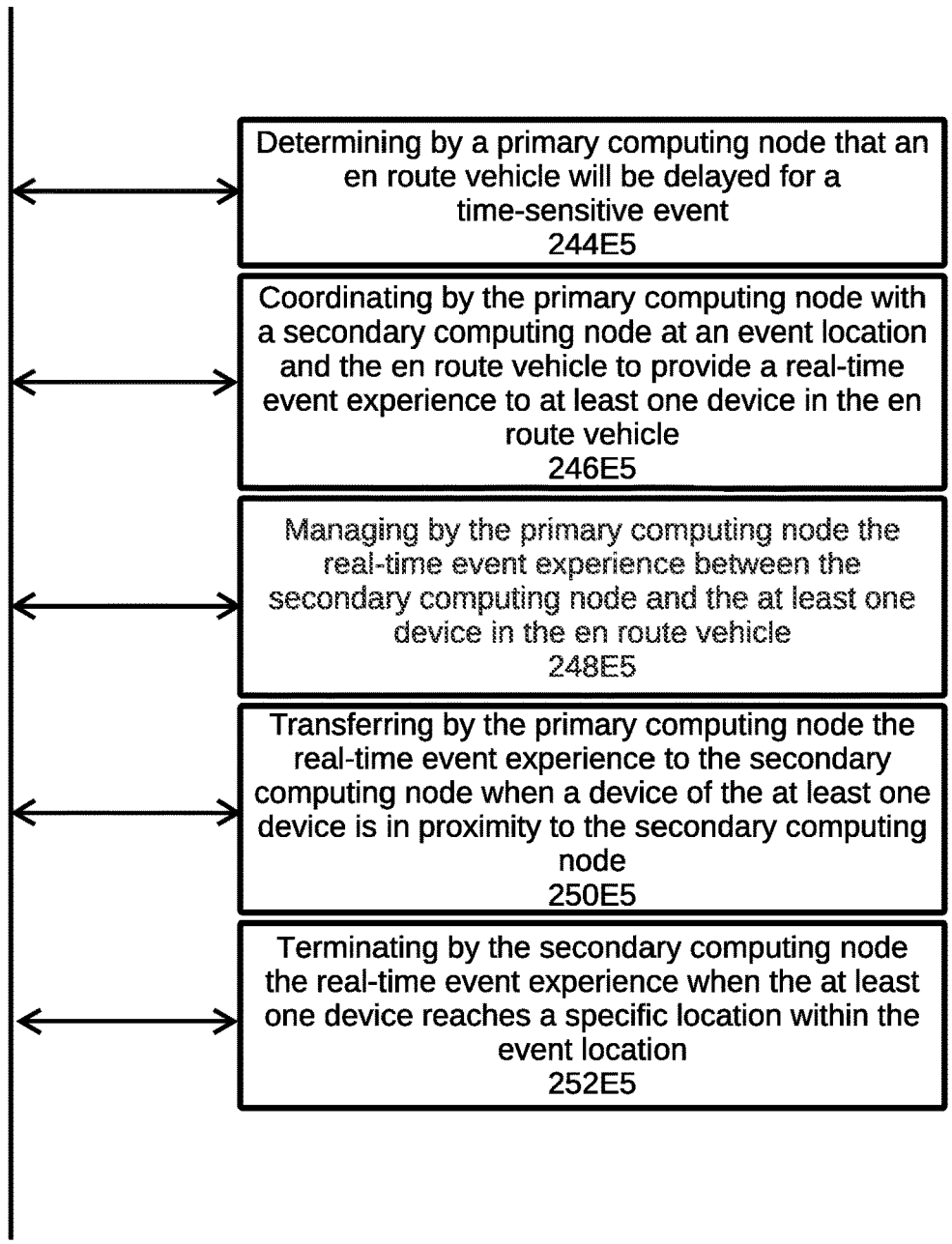
FIG. 2E5

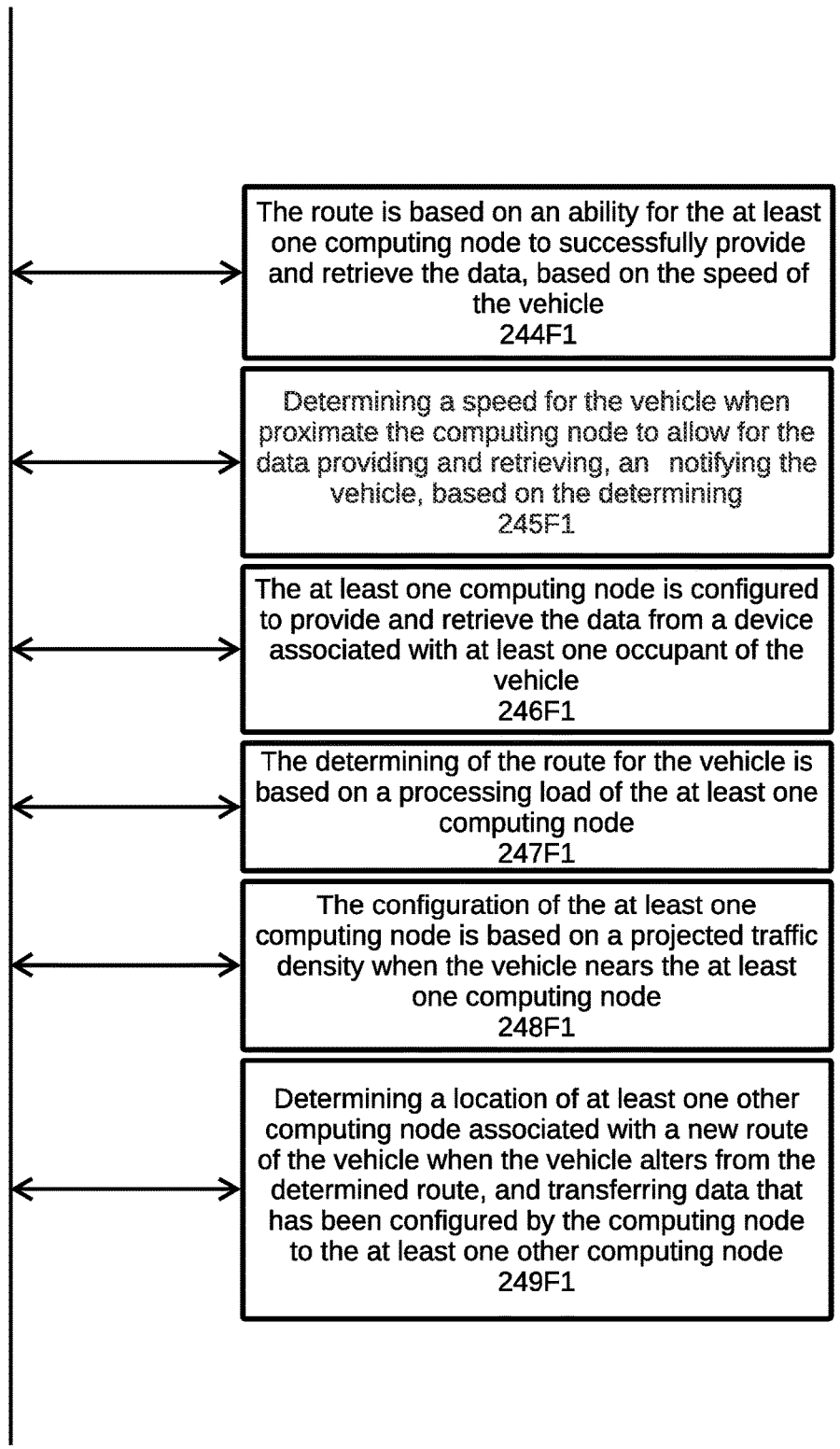
FIG. 2F1

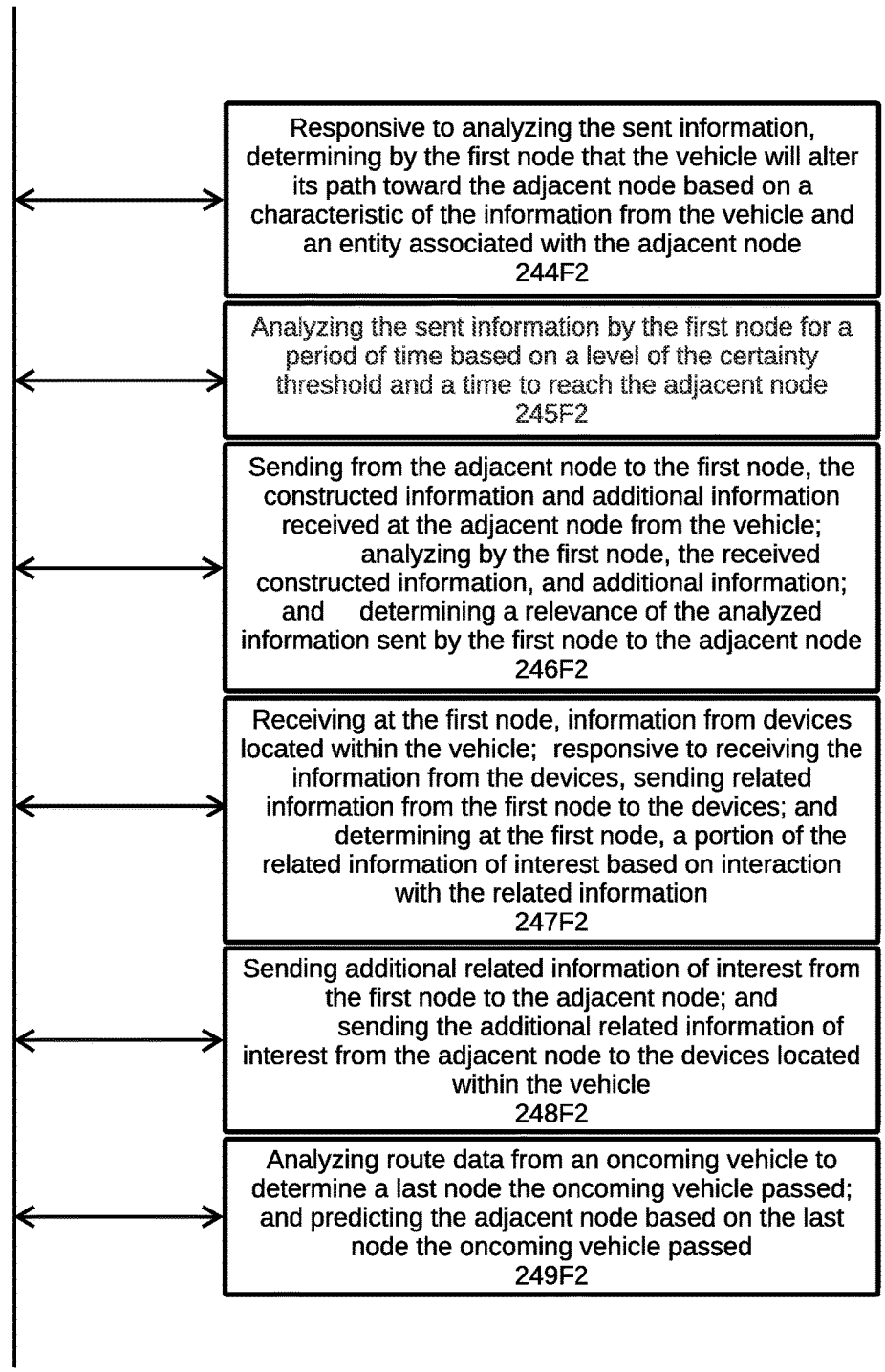
FIG. 2F2

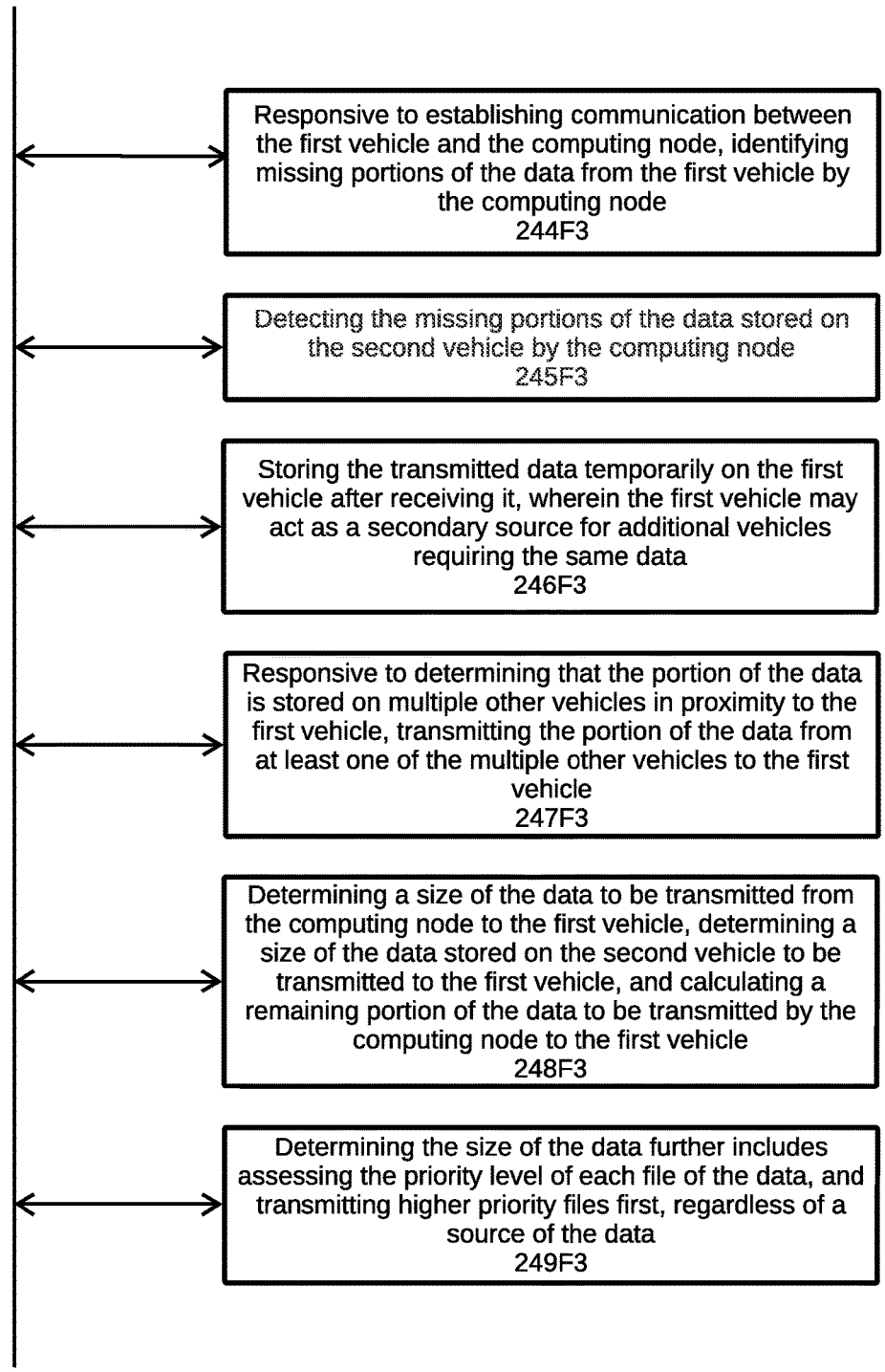
FIG. 2F3

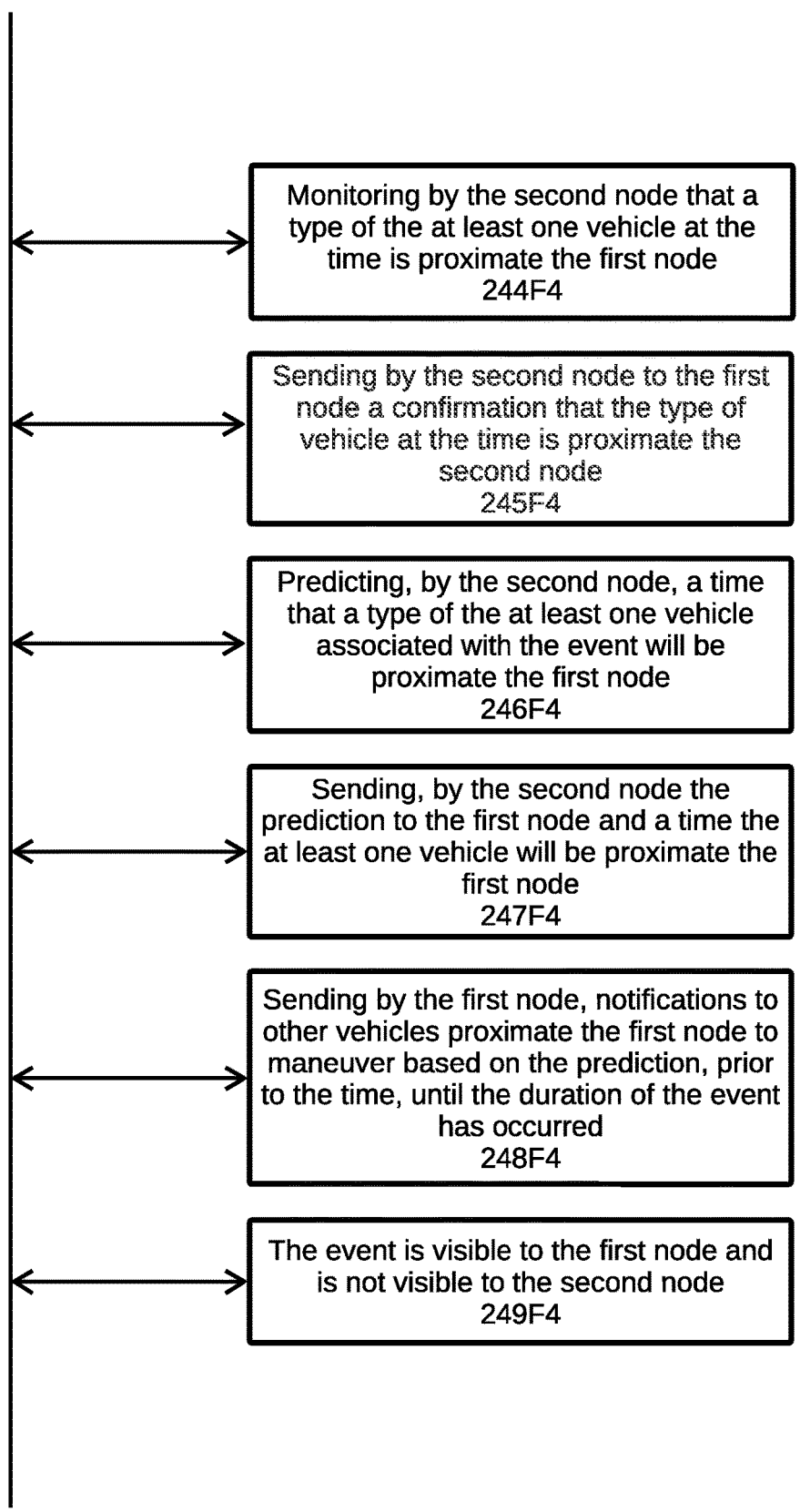
FIG. 2F4

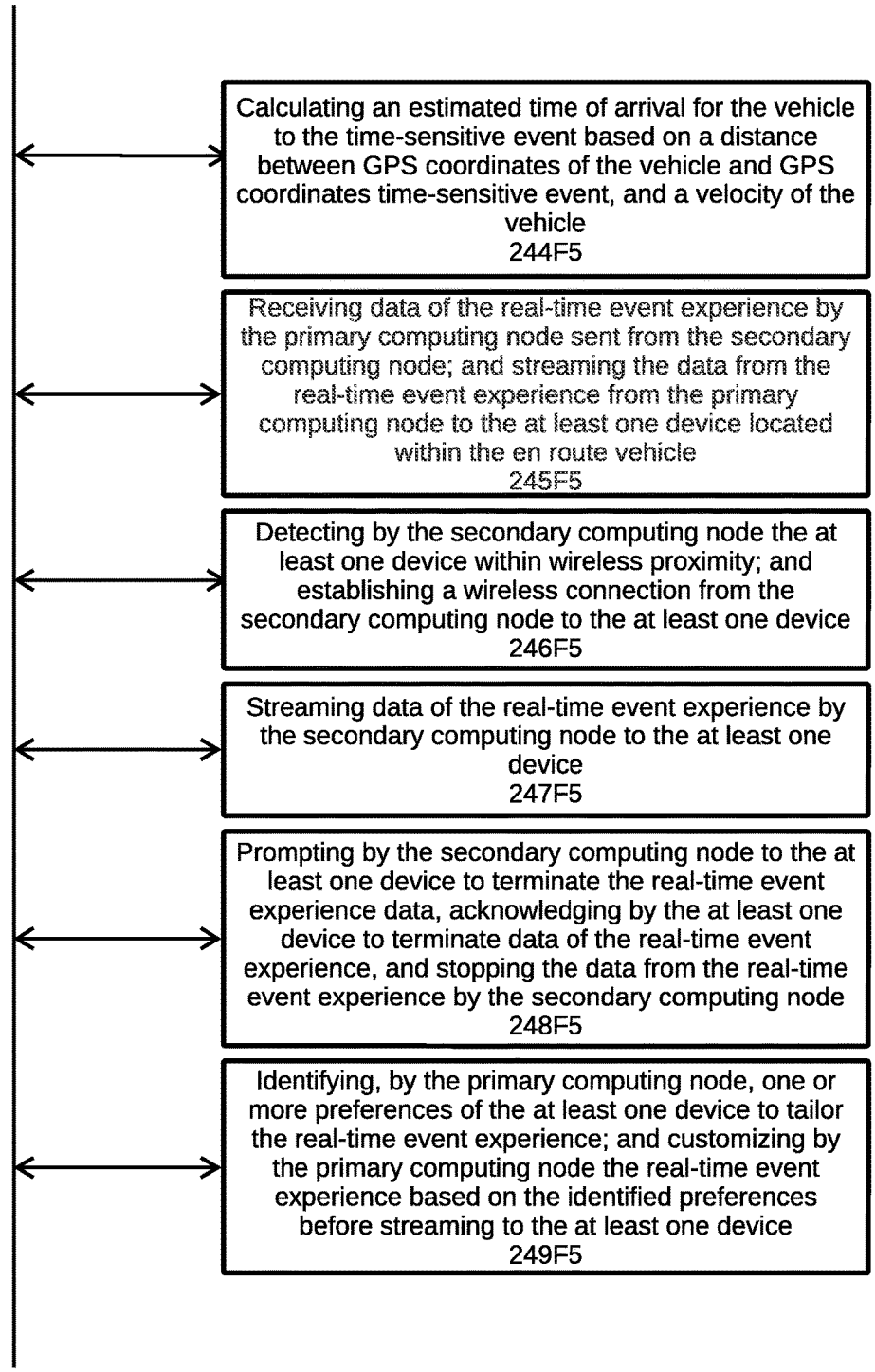
FIG. 2F5

400A

HANDOFF SEQUENCE FOR CITY NODES

BACKGROUND

Vehicles or transports, such as cars, motorcycles, trucks, planes, trains, etc., generally provide transportation needs to occupants and/or goods in a variety of ways. Functions related to vehicles may be identified and utilized by various computing devices, such as a smartphone or a computer located on and/or off the vehicle.

SUMMARY

One example embodiment provides a method that includes one or more of determining data to be provided to a vehicle, determining data to be retrieved from the vehicle, determining a route for the vehicle based on an amount of time the data is provided to the vehicle and the data is retrieved from the vehicle, a speed of the vehicle, and a location of at least one computing node that is configured to provide and retrieve the data.

Another example embodiment provides a system that includes a memory communicatively coupled to a processor, wherein the processor performs one or more of determine data to be provided to a vehicle, determine data to be retrieved from the vehicle, determine a route for the vehicle based on an amount of time the data is provided to the vehicle and the data is retrieved from the vehicle, a speed of the vehicle, and a location of at least one computing node that is configured to provide and retrieve the data.

A further example embodiment provides a computer readable storage medium comprising instructions, that when read by a processor, cause the processor to perform one or more of determining data to be provided to a vehicle, determining data to be retrieved from the vehicle, determining a route for the vehicle based on an amount of time the data is provided to the vehicle and the data is retrieved from the vehicle, a speed of the vehicle, and a location of at least one computing node that is configured to provide and retrieve the data.

A further example embodiment provides a method that includes one or more of receiving information at a vehicle in proximity to a first node from the first node, sending information from the vehicle to the first node, analyzing the sent information by the first node, determining by the first node that the vehicle will be in proximity to an adjacent node to the first node, after the vehicle is no longer in proximity to the first node, receiving the analyzed information from the first node at the adjacent node; constructing information related to the received analyzed information at the adjacent node, and sending the constructed information to the vehicle from the adjacent node.

A further example provides a system that includes a memory communicatively coupled to a processor, wherein the processor performs one or more of receives information at a vehicle in proximity to a first node from the first node, sends information from the vehicle to the first node;
  analyzes the sent information by the first node, determines by the first node that the vehicle will be in proximity to an adjacent node to the first node, after the vehicle is no longer in proximity to the first node, receives the analyzed information from the first node at the adjacent node, constructs information related to the received analyzed information at the adjacent node, and sends the constructed information to the vehicle from the adjacent node.

A further example embodiment provides a computer readable storage medium comprising instructions, that when read by a processor, cause the processor to perform one or more of receiving information at a vehicle in proximity to a first node from the first node, sending information from the vehicle to the first node, analyzing the sent information by the first node, determining by the first node that the vehicle will be in proximity to an adjacent node to the first node, after the vehicle is no longer in proximity to the first node, receiving the analyzed information from the first node at the adjacent node; constructing information related to the received analyzed information at the adjacent node, and sending the constructed information to the vehicle from the adjacent node.

A further example embodiment provides a method that includes one or more of establishing a communication between a first vehicle and a computing node, determining data to be transmitted from the computing node to the first vehicle, responsive to a portion of the data being stored on a second vehicle, determining the second vehicle will be in proximity to the first vehicle, and transmitting the portion of the data from the second vehicle to the first vehicle when the vehicles are in proximity and a remaining portion of the data from the computing node to the first vehicle.

A further example provides a system that includes a memory communicatively coupled to a processor, wherein the processor performs one or more of establishes a communication between a first vehicle and a computing node, determines data to be transmitted from the computing node to the first vehicle, responsive to a portion of the data being stored on a second vehicle, determines the second vehicle will be in proximity to the first vehicle, and transmits the portion of the data from the second vehicle to the first vehicle when the vehicles are in proximity and a remaining portion of the data from the computing node to the first vehicle.

A further example embodiment provides a computer readable storage medium comprising instructions, that when read by a processor, cause the processor to perform one or more of establishing a communication between a first vehicle and a computing node, determining data to be transmitted from the computing node to the first vehicle, responsive to a portion of the data being stored on a second vehicle, determining the second vehicle will be in proximity to the first vehicle, and transmitting the portion of the data from the second vehicle to the first vehicle when the vehicles are in proximity and a remaining portion of the data from the computing node to the first vehicle.

A further example embodiment provides a method that includes one or more of determining, by a first node, that an event has occurred in a geographic area, predicting, by the first node, a severity of the event, a duration of the event, and at least one vehicle associated with the event, sending, by the first node, the prediction to a second node and a time the at least one vehicle will be proximate the second node, sending by the second node, notifications to other vehicles proximate the second node to maneuver based on the prediction, prior to the time.

A further example provides a system that includes a memory communicatively coupled to a processor, wherein the processor performs one or more of determines, by a first node, that an event has occurred in a geographic area, predicts, by the first node, a severity of the event, a duration of the event, and at least one vehicle associated with the event, sends, by the first node, the prediction to a second node and a time the at least one vehicle will be proximate the second node, sends by the second node, notifications to other vehicles proximate the second node to maneuver based on the prediction, prior to the time.

A further example embodiment provides a computer readable storage medium comprising instructions, that when read by a processor, cause the processor to perform one or more of determining, by a first node, that an event has occurred in a geographic area, predicting, by the first node, a severity of the event, a duration of the event, and at least one vehicle associated with the event, sending, by the first node, the prediction to a second node and a time the at least one vehicle will be proximate the second node, sending by the second node, notifications to other vehicles proximate the second node to maneuver based on the prediction, prior to the time.

A further example embodiment provides a method that includes one or more of determining by a primary computing node that an en route vehicle will be delayed for a time-sensitive event, coordinating by the primary computing node with a secondary computing node at an event location and the en route vehicle to provide a real-time event experience to at least one device in the en route vehicle, managing by the primary computing node the real-time event experience between the secondary computing node and the at least one device in the en route vehicle, transferring by the primary computing node the real-time event experience to the secondary computing node when a device of the at least one device is in proximity to the secondary computing node, and terminating by the secondary computing node the real-time event experience when the at least one device reaches a specific location within the event location.

A further example provides a system that includes a memory communicatively coupled to a processor, wherein the processor performs one or more of determines by a primary computing node that an en route vehicle will be delayed for a time-sensitive event, coordinates by the primary computing node with a secondary computing node at an event location and the en route vehicle to provide a real-time event experience to at least one device in the en route vehicle, manages by the primary computing node the real-time event experience between the secondary computing node and the at least one device in the en route vehicle, transfers by the primary computing node the real-time event experience to the secondary computing node when a device of the at least one device is in proximity to the secondary computing node, and terminates by the secondary computing node the real-time event experience when the at least one device reaches a specific location within the event location.

A further example embodiment provides a computer readable storage medium comprising instructions, that when read by a processor, cause the processor to perform one or more of determining by a primary computing node that an en route vehicle will be delayed for a time-sensitive event, coordinating by the primary computing node with a secondary computing node at an event location and the en route vehicle to provide a real-time event experience to at least one device in the en route vehicle, managing by the primary computing node the real-time event experience between the secondary computing node and the at least one device in the en route vehicle, transferring by the primary computing node the real-time event experience to the secondary computing node when a device of the at least one device is in proximity to the secondary computing node, and terminating by the secondary computing node the real-time event experience when the at least one device reaches a specific location within the event location.

BRIEF DESCRIPTION OF THE DRAWINGS

FIG. 2C1 illustrates a further vehicle network diagram, according to example embodiments.

FIG. 2C2 illustrates a further transport network diagram, according to example embodiments.

FIG. 2C3 illustrates a further transport network diagram, according to example embodiments.

FIG. 2C4 illustrates a further transport network diagram, according to example embodiments.

FIG. 2C5 illustrates a further transport network diagram, according to example embodiments.

FIG. 2D1 illustrates a further transport network diagram, according to example embodiments.

FIG. 2D2 illustrates a further transport network diagram, according to example embodiments.

FIG. 2D3 illustrates a further transport network diagram, according to example embodiments.

FIG. 2D4 illustrates a further transport network diagram, according to example embodiments.

FIG. 2D5 illustrates a further transport network diagram, according to example embodiments.

FIG. 2E1 illustrates yet a further transport network diagram, according to example embodiments.

FIG. 2E2 illustrates yet a further transport network diagram, according to example embodiments.

FIG. 2E3 illustrates yet a further transport network diagram, according to example embodiments.

FIG. 2E4 illustrates yet a further transport network diagram, according to example embodiments.

FIG. 2E5 illustrates yet a further transport network diagram, according to example embodiments.

FIG. 2F1 illustrates a further flow diagram, according to example embodiments.

FIG. 2F2 illustrates a further flow diagram, according to example embodiments.

FIG. 2F3 illustrates a further flow diagram, according to example embodiments.

FIG. 2F4 illustrates a further flow diagram, according to example embodiments.

FIG. 2F5 illustrates a further flow diagram, according to example embodiments.

DETAILED DESCRIPTION

Figure 1A:
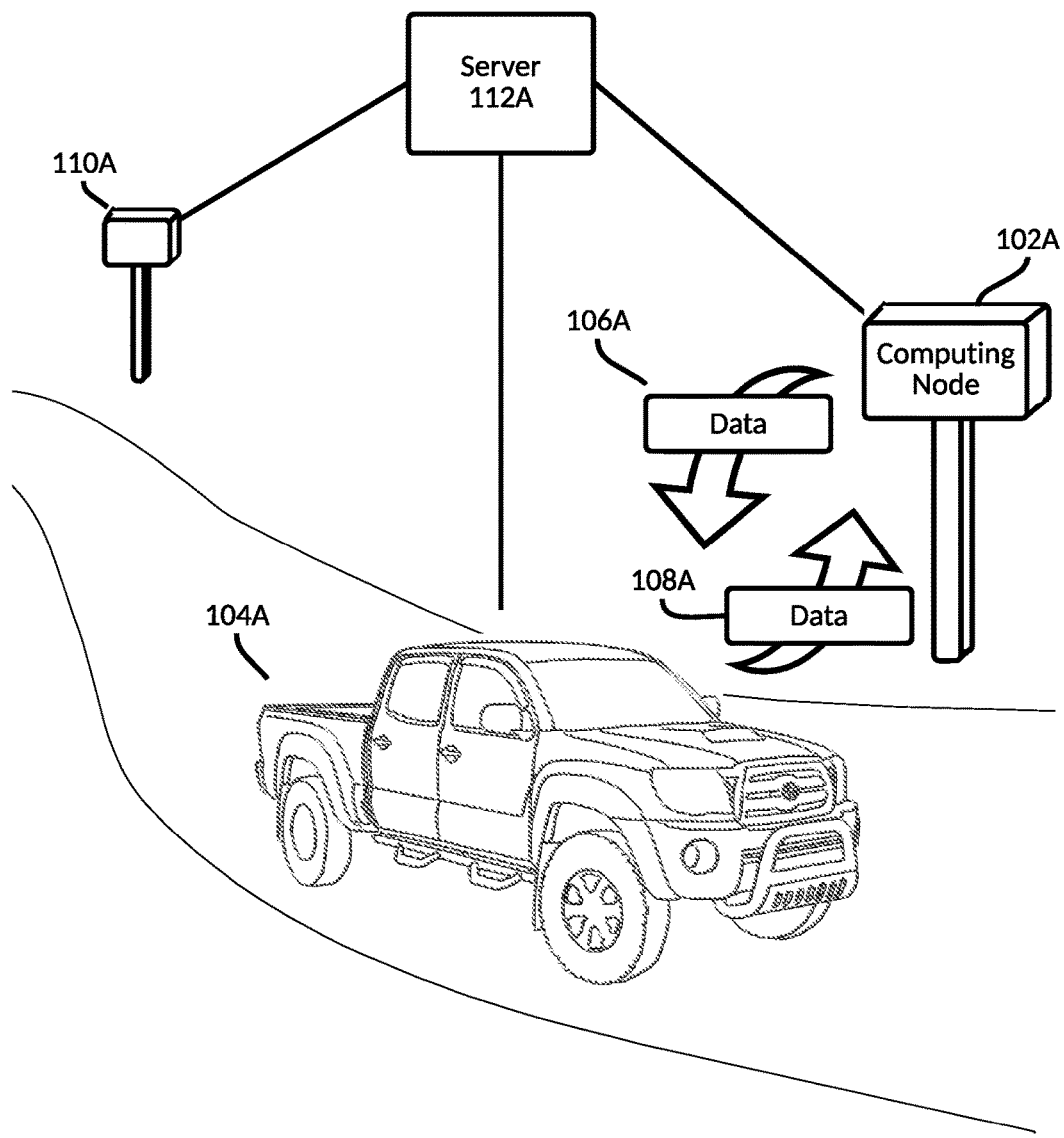
FIG. 1A illustrates an example system diagram of Route Prediction with City Nodes, according to example embodiments.

It will be readily understood that the instant components, as generally described and illustrated in the figures herein, may be arranged and designed in a wide variety of different configurations. Thus, the following detailed description of the embodiments of at least one of a method, apparatus, computer readable storage medium and system, as represented in the attached figures, is not intended to limit the scope of the application as claimed but is merely representative of selected embodiments. Multiple embodiments depicted herein are not intended to limit the scope of the solution. The computer-readable storage medium may be a non-transitory computer readable media or a non-transitory computer readable storage medium.

Communications between the vehicle(s) and certain entities, such as remote servers, other vehicles, and local computing devices (e.g., smartphones, personal computers, vehicle-embedded computers, etc.) may be sent and/or received and processed by one or more 'components' which may be hardware, firmware, software, or a combination thereof. The components may be part of any of these entities or computing devices or certain other computing devices. In one example, consensus decisions related to blockchain transactions may be performed by one or more computing devices or components (which may be any element described and/or depicted herein) associated with the vehicle(s) and one or more of the components outside or at a remote location from the vehicle(s).

The instant features, structures, or characteristics described in this specification may be combined in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one example. Thus, appearances of the phrases "example embodiments", "in some embodiments", "in other embodiments," or other similar language, throughout this specification can all refer to the same embodiment. Thus, these embodiments may work in conjunction with any of the other embodiments, may not be functionally separate, and the described features, structures, or characteristics may be combined in any suitable manner in one or more embodiments. In the diagrams, any connection between elements can permit one-way and/or two-way communication, even if the depicted connection is a one-way or two-way arrow. In the current solution, a vehicle may include one or more of cars, trucks, Internal Combustion Engine (ICE) vehicles, battery electric vehicle (BEV), e-Palettes, fuel cell bus, motorcycles, scooters, bicycles, boats, recreational vehicles, planes, drones, Unmanned Aerial Vehicle (UAV) and any object that may be used to transport people and or goods from one location to another. In the diagrams, any connection between elements can permit one-way and/or two-way communication, even if the depicted connection is a one-way or two-way arrow. In the current solution, a vehicle may include one or more of cars, trucks, walking area battery electric vehicle (BEV), e-Palette, fuel cell bus, motorcycles, scooters, bicycles, boats, recreational vehicles, planes, and any object that may be used to transport people and or goods from one location to another.

In addition, while the term "message" may have been used in the description of embodiments, other types of network data, such as, a packet, frame, datagram, etc. may also be used. Furthermore, while certain types of messages and signaling may be depicted in exemplary embodiments they are not limited to a certain type of message and signaling.

Example embodiments provide methods, systems, components, non-transitory computer readable media, devices, and/or networks, which provide at least one of a transport (also referred to as a vehicle or car herein), a data collection system, a data monitoring system, a verification system, an authorization system, and a vehicle data distribution system.

The vehicle status condition data received in the form of communication messages, such as wireless data network communications and/or wired communication messages, may be processed to identify vehicle status conditions and provide feedback on the condition and/or changes of a vehicle. In one example, a user profile may be applied to a particular vehicle to authorize a current vehicle event, service stops at service stations, to authorize subsequent vehicle rental services, and enable vehicle-to-vehicle communications.

Within the communication infrastructure, a decentralized database is a distributed storage system which includes multiple nodes that communicate with each other. A blockchain is an example of a decentralized database, which includes an append-only immutable data structure (i.e., a distributed ledger) capable of maintaining records between untrusted parties. The untrusted parties are referred to herein as peers, nodes, or peer nodes. Each peer maintains a copy of the database records, and no single peer can modify the database records without a consensus being reached among the distributed peers. For example, the peers may execute a consensus protocol to validate blockchain storage entries, group the storage entries into blocks, and build a hash chain via the blocks. This process forms the ledger by ordering the storage entries, as is necessary, for consistency. In public or permissionless blockchains, anyone can participate without a specific identity. Public blockchains can involve cryptocurrencies and use consensus-based on various protocols such as proof of work (PoW). Conversely, a permissioned blockchain database can secure interactions among a group of entities, which share a common goal, but which do not or cannot fully trust one another, such as businesses that exchange funds, goods, information, and the like. The instant solution can function in a permissioned and/or a permissionless blockchain setting.

Smart contracts are trusted distributed applications which leverage tamper-proof properties of the shared or distributed ledger (which may be in the form of a blockchain) and an underlying agreement between member nodes, which is referred to as an endorsement or endorsement policy. In general, blockchain entries are "endorsed" before being committed to the blockchain while entries, which are not endorsed are disregarded. A typical endorsement policy allows smart contract executable code to specify endorsers for an entry in the form of a set of peer nodes that are necessary for endorsement. When a client sends the entry to the peers specified in the endorsement policy, the entry is executed to validate the entry. After validation, the entries enter an ordering phase in which a consensus protocol produces an ordered sequence of endorsed entries grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node, which submits an entry-invocation to an endorser (e.g., peer), and broadcasts entry proposals to an ordering service (e.g., ordering node). Another type of node is a peer node, which can receive client submitted entries, commit the entries, and maintain a state and a copy of the ledger of blockchain entries. Peers can also have the role of an endorser. An ordering-service-node or orderer is a node running the communication service for all nodes and which implements a delivery guarantee, such as a broadcast to each of the peer nodes in the system when committing entries and modifying a world state of the blockchain. The world state can constitute the initial blockchain entry, which normally includes control and setup information.

A ledger is a sequenced, tamper-resistant record of all state transitions of a blockchain. State transitions may result from smart contract executable code invocations (i.e., entries) submitted by participating parties (e.g., client nodes, ordering nodes, endorser nodes, peer nodes, etc.). An entry may result in a set of asset key-value pairs being committed to the ledger as one or more operands, such as creates, updates, deletes, and the like. The ledger includes a blockchain (also referred to as a chain), which stores an immutable, sequenced record in blocks. The ledger also includes a state database, which maintains a current state of the blockchain. There is typically one ledger per channel. Each peer node maintains a copy of the ledger for each channel of which they are a member.

A chain is an entry log structured as hash-linked blocks, and each block contains a sequence of N entries where N is equal to or greater than one. The block header includes a hash of the blocks' entries, as well as a hash of the prior block's header. In this way, all entries on the ledger may be sequenced and cryptographically linked together. Accordingly, it is not possible to tamper with the ledger data without breaking the hash links. A hash of a most recently added blockchain block represents every entry on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain entry log. Since the current state represents the latest key values known to a channel, it is sometimes referred to as a world state. Smart contract executable code invocations execute entries against the current state data of the ledger. To make these smart contract executable code interactions efficient, the latest values of the keys may be stored in a state database. The state database may be simply an indexed view into the chain's entry log and can therefore be regenerated from the chain at any time. The state database may automatically be recovered (or generated if needed) upon peer node startup and before entries are accepted.

A blockchain is different from a traditional database in that the blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like.

Example embodiments provide a service to a particular vehicle and/or a user profile that is applied to the vehicle. For example, a user may be the owner of a vehicle or the operator of a vehicle owned by another party. The vehicle may require service at certain intervals, and the service needs may require authorization before permitting the services to be received. Also, service centers may offer services to vehicles in a nearby area based on the vehicle's current route plan and a relative level of service requirements (e.g., immediate, severe, intermediate, minor, etc.). The vehicle needs may be monitored via one or more vehicle and/or road sensors or cameras, which report sensed data to a central controller computer device in and/or apart from the vehicle.

This data is forwarded to a management server for review and action. A sensor may be located on one or more of the interior of the vehicle, the exterior of the vehicle, on a fixed object apart from the vehicle, and on another vehicle proximate the vehicle. The sensor may also be associated with the vehicle's speed, the vehicle's braking, the vehicle's acceleration, fuel levels, service needs, the gear-shifting of the vehicle, the vehicle's steering, and the like. A sensor, as described herein, may also be a device, such as a wireless device in and/or proximate to the vehicle. Also, sensor information may be used to identify whether the vehicle is operating safely and whether an occupant has engaged in any unexpected vehicle conditions, such as during a vehicle access and/or utilization period. Vehicle information collected before, during and/or after a vehicle's operation may be identified and stored in a transaction on a shared/distributed ledger, which may be generated and committed to the immutable ledger as determined by a permission granting consortium, and thus in a "decentralized" manner, such as via a blockchain membership group.

Each interested party (i.e., owner, user, company, agency, etc.) may want to limit the exposure of private information, and therefore the blockchain and its immutability can be used to manage permissions for each particular user vehicle profile. A smart contract may be used to provide compensation, quantify a user profile score/rating/review, apply vehicle event permissions, determine when service is needed, identify a collision and/or degradation event, identify a safety concern event, identify parties to the event and provide distribution to registered entities seeking access to such vehicle event data. Also, the results may be identified, and the necessary information can be shared among the registered companies and/or individuals based on a consensus approach associated with the blockchain. Such an approach could not be implemented on a traditional centralized database.

Various driving systems of the instant solution can utilize software, an array of sensors as well as machine learning functionality, light detection and ranging (Lidar) projectors, radar, ultrasonic sensors, etc. to create a map of terrain and road that a vehicle can use for navigation and other purposes. In some embodiments, GPS, maps, cameras, sensors, and the like can also be used in autonomous vehicles in place of Lidar.

The instant solution includes, in certain embodiments, authorizing a vehicle for service via an automated and quick authentication scheme. For example, driving up to a charging station or fuel pump may be performed by a vehicle operator or an autonomous vehicle and the authorization to receive charge or fuel may be performed without any delays provided the authorization is received by the service and/or charging station. A vehicle may provide a communication signal that provides an identification of a vehicle that has a currently active profile linked to an account that is authorized to accept a service, which can be later rectified by compensation. Additional measures may be used to provide further authentication, such as another identifier may be sent from the user's device wirelessly to the service center to replace or supplement the first authorization effort between the vehicle and the service center with an additional authorization effort.

Data shared and received may be stored in a database, which maintains data in one single database (e.g., database server) and generally at one particular location. This location is often a central computer, for example, a desktop central processing unit (CPU), a server CPU, or a mainframe computer. Information stored on a centralized database is typically accessible from multiple different points. A centralized database is easy to manage, maintain, and control, especially for purposes of security because of its single location. Within a centralized database, data redundancy is minimized as a single storing place of all data also implies that a given set of data only has one primary record. A blockchain may be used for storing vehicle-related data and transactions.

Any of the actions described herein may be performed by one or more processors (such as a microprocessor, a sensor, an Electronic Control Unit (ECU), a head unit, and the like), with or without memory, which may be located on-board the vehicle and/or or off-board the vehicle (such as a server, computer, mobile/wireless device, etc.). The one or more processors may communicate with other memory and/or other processors on-board or off-board other vehicles to utilize data being sent by and/or to the vehicle. The one or more processors and the other processors can send data, receive data, and utilize this data to perform one or more of the actions described or depicted herein.

FIG. 1A depicts a system diagram 100A for route prediction with computing nodes, according to example embodiments. The system may determine a destination and analyze routes to the destination, wherein the routes allow for an efficient transfer of data to and/or from the vehicle and the computing nodes. The system may communicate with the computing nodes along a selected route, instructing the computing nodes to prepare (or pre-fetch) and load data for transmission to the vehicle.

The system includes vehicle 104A, which may be a car, truck, van, train, bus, scooter, or any object used to carry people and/or goods from one location to another. Computing nodes 102A and 110A may be infrastructure-to-vehicle (I2V) devices and/or vehicle-to-infrastructure (V2I) devices that may connect to various stationary structures or can be mobile throughout an area, such as a city, that can communicate with other nodes, a server 112A, as well as vehicles (such as the vehicle), within a transmission area of the computing node. The server may be a computer communicatively coupled to the computing nodes 102A and 110A and the vehicle. It may communicate with the computing nodes 102A and 110A and the vehicle via a wired network, a wireless network, a cloud network, an Internet, an intranet, or the like.

As vehicle 104A travels near the computing nodes 102A and 110A, the vehicle may wirelessly communicate with the computing nodes, receiving 106A and/or transmitting 108A data, such as status information, updated information, changes to conditions, and environmental information, e.g., traffic, weather, road conditions, fastest routes, etc. If the vehicle changes its course and moves toward a different computing node, the system 100A may quickly adapt, determining an alternate route. The computing node and/or server 112A may select the determined alternate route in one embodiment. For example, when the server determines that the vehicle is no longer on the route but on an alternate route, the server may find other computing nodes proximate the alternate route and communicate with them accordingly. The server may determine the vehicle's location through communication between the vehicle and a server, such as a vehicle tracking server that tracks vehicles. The server and/or the computing nodes may communicate with the vehicle tracking server to obtain the vehicle's location.

Any previously made data requests to nodes along the now-defunct route are canceled ("expired"). The server and/or computing nodes 102A and 110A may obtain information from the vehicle. The information may include a current location of the vehicle, as well as the current operating functionality of the vehicle, such as speed, temperature, fluid/battery levels, and the like. When the vehicle changes its course, the server may determine computing nodes that are proximate the alternate route, communicate with the computing nodes to obtain a processing load, traffic density proximate the computing nodes, and other data that may assist in sending and receiving data to/from the vehicle.

In one embodiment, the speed of vehicle 104A, as well as the signal strength and signal quality to/from the vehicle, is a factor in determining the data sent to/from the vehicle, to/from the computing nodes, and/or to/from other devices communicatively coupled to other devices and the vehicle. If the vehicle is moving quickly, or if the signal strength/quality is below a threshold, the vehicle might exit the range of a computing node or be unable to efficiently or effectively receive and/or send data before all data has been transferred. System 100A may preload the needed data onto one or more computing nodes along a determined probable vehicle route to overcome this situation. Therefore, if the vehicle receives only a part of the data from one node, the vehicle can continue loading the remainder from the subsequent nodes without restarting the data transmission. When the vehicle communicates with a computing node, data may be transmitted from the computing node to the vehicle. When the vehicle exits the communication area of that computing node, it may arrive in a communication area of a next computing node. The computing nodes 102A and 110A may communicate with one another, where at least one message is sent between the computing nodes and may include an amount of data and/or a type of data transferred to and/or from the vehicle. For example, computing node 102A is the sending node, and computing node 110A is the receiving node. In one embodiment, the at least one message contains an identifier, wherein the identifier indicates the last portion of the sent data. The receiving computing node may continue transmitting the data by sending the last portion or the portion after the last portion after the last sent portion of the data.

The data to be delivered to vehicle 104A may relate to road conditions, weather updates, traffic situations, etc. Devices associated with occupants in the vehicle may also receive personal data, such as news, meeting schedules, appointments, etc., via devices associated with them, such as smartphones, tablets, and the like. In one embodiment, the server may communicate with other servers, such as servers containing traffic, weather, and the like. This data from the other servers may contain location-specific data. The server may determine information related to devices associated with vehicle occupants. The server may obtain this information through communication with the devices, such as wireless communication, cellular communication, and the like. For example, an application executing on the devices may send data to the server, including elements that may interest the occupants associated with the devices. The elements may be related to news previously consumed on the device, scheduling information from data related to a scheduling/calendar application on the device, etc.

The system may utilize real-time data (current location, direction of travel, time of day, etc.) and historical data (previous destinations, previous routes to the destinations, etc.) to predict the vehicle's destination and to ask for confirmation from the vehicle or its occupants through communication with devices associated with the occupants. Once confirmed, the vehicle may notify the computing nodes along the route to the destination. For example, if vehicle 104A makes two turns that match a historically frequent route, the system may request a confirmation of the destination (such as via a message sent from the server to the vehicle, received by a processor in the vehicle, and presented on a display of the vehicle. Occupants may interact with the presented data and verify or deny the information. System 100A may determine data to be delivered to the vehicle and occupants based on a confirmed destination. In one embodiment, the server may determine historical data by communication with a processor in the vehicle and/or another server, such as a server that may contain historical data, scheduling data from one or more occupants of the vehicle, contact information, historical messaging information, and the like. The historical data may have originated from a navigation system in the vehicle, where previous destinations and/or routes are found. Additional data may be obtained, including the route taken to the destination, the direction of travel, the time of the routing, and the like.

The system considers the need to reach the destination efficiently and the data needs of the vehicle and occupants. Data needs may include the type and size of the data to be received and the corresponding time to transmit that data. The vehicle's speed may be a factor that facilitates optimal data transmission between the computing nodes and the vehicle along the path to the destination. The routing may be based on the location of the nodes that receive and provide data rather than a quickest route to the destination.

Figure 1B:
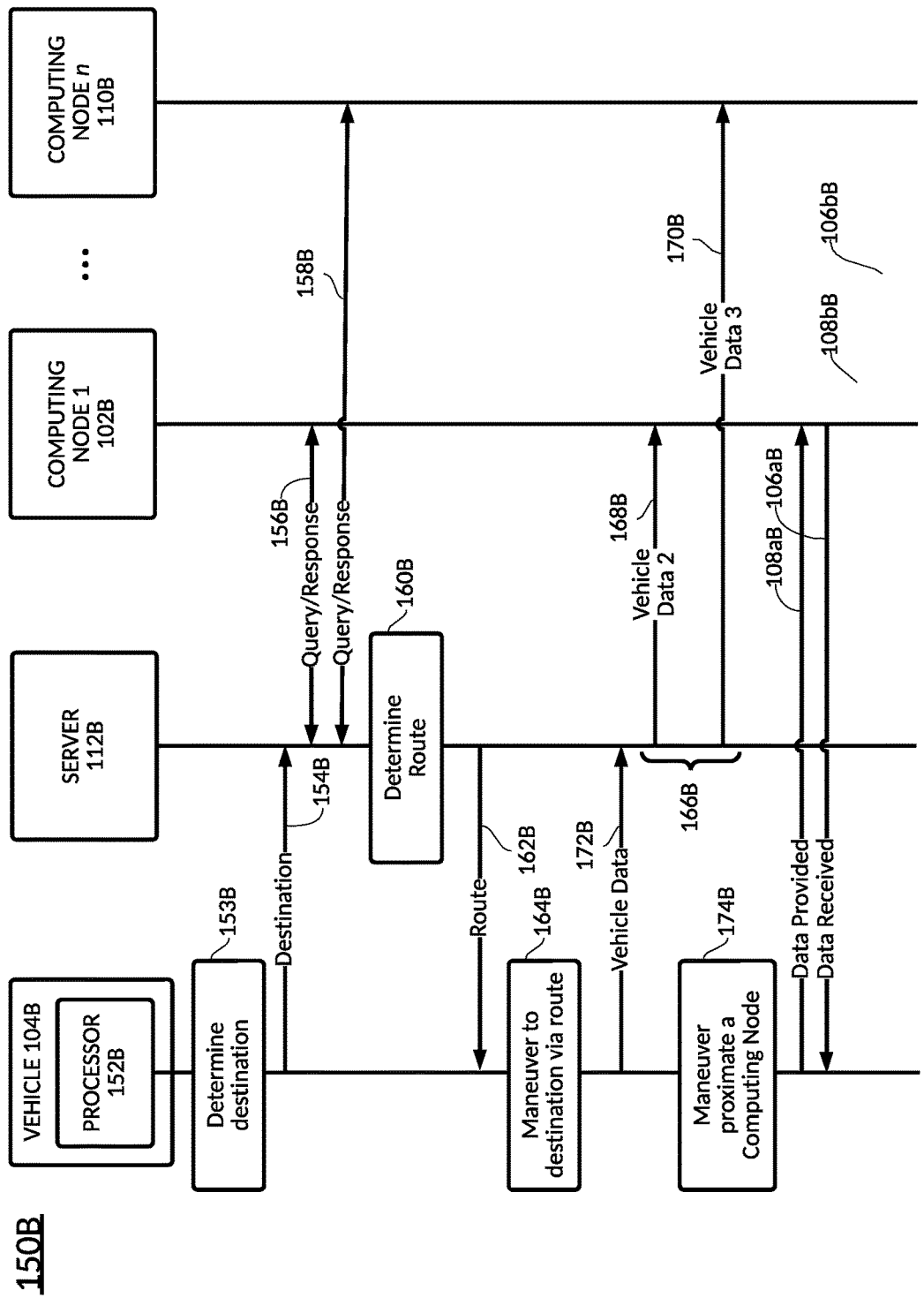
FIG. 1B illustrates an example flowchart of Route Prediction with City Nodes, according to example embodiments.

FIG. 1B illustrates a flowchart 150B according to example embodiments. Vehicle 104B contains a processor 152B and executes instructions (i.e., the instant solution) stored in memory. In one embodiment, the memory may be located on and/or off the vehicle 104B. The vehicle may be any object transporting goods and/or people from one location to another. Processor 152B may be called an Electronic Control Module ("ECM") or any processor in the vehicle. In one example, the current solution depicted herein may occur wholly or partially in processor 152B or another processor associated with the vehicle, such as an Electronic Control Unit ("ECU"), a computer in an infotainment system, a head unit of the vehicle, any device in the system (e.g., a mobile device that may be associated with one or more occupants of the vehicles), and/or a computer or server which may be located outside of the vehicle. A server 112B may be a computer containing a processor and memory and may be able to store data in memory, such as in a database. The server may be communicatively coupled to the vehicle via a network like the Internet. Computing nodes 102B and 110B may be a device with a processor and memory and may be connected to other computing nodes, such as throughout an area such as a city. Other computing nodes may also be present in the system and are not depicted herein. These computer nodes may communicate with one another and with other devices, such as devices associated with pedestrians and occupants in vehicles in the area. They may communicate with a network, such as the Internet, or any other device and/or network. The computing nodes 102B and 110B may communicate with vehicles that may either be proximate or approaching or departing the computing nodes, such as on a path of the computing nodes.

The computing node may be a single device, such as computing node 102B, or multiple devices, such as computing nodes 102B and 110B. The computing nodes may be placed within an area to provide intelligence to vehicles and/or pedestrians on a route proximate one or more computing nodes. In one embodiment, the computing node may be preloaded with data, wherein the preloading may occur before the vehicle becomes proximate the computing node.

The preloaded data may be determined as data that the vehicle may need and/or desire upon becoming proximate the computing node.

In another embodiment, the vehicle may be preloaded with data that another passing vehicle may need. The system 100B preloads the vehicle, storing the data in memory on the vehicle. When the another passing vehicle is proximate the vehicle, data is transferred to the another vehicle, from the vehicle. V2V communication may be utilized to transfer the data.

The instant solution may wholly or partially execute on a processor in server 112B, processor 152B, any of the processors associated with any computer nodes 102B and 110B, etc., and/or any other element described or depicted herein.

The instant solution may determine a route to a destination of vehicle 104B, wherein the route is based on an amount of time that data is to be provided to the vehicle and the amount of time that the data is to be retrieved from the vehicle, a speed of the vehicle, and a location of at least one computing node that is configured to provide and retrieve the data.

Vehicle 104B may determine a destination 153B. This determination may be through communication with a navigation system executing on a processor in the vehicle, such as in the head unit/infotainment system, or on a device associated with an occupant, such as via a navigation application executing on the device. The destination may be sent to server 112B via a message, such as destination message 154B. In other embodiments, the server may determine the destination, where the destination may be sent to the vehicle.

Server 112B, upon reception of a desired destination 154B, may send one or more messages to determine the status of computing nodes in the system that are proximate a vehicle path on a route to the destination, such as computing node 1 102B and computing node n 110B (wherein n can be any number that is two or more). Query messages 156B and 158B may be sent to the computing nodes, and a response is returned. The response may contain data associated with the characteristics of the computing node, such as a capacity of the respective computing node, an average amount of processing throughput for requested activities of the respective computing node, an amount of used and spare memory of the respective computing node, a predicted amount of any of the above list over a given period, and the like.

Server 112B, fully or partially executing the instant solution, may determine a route to the destination 160B based on received data 156B, 158B from the computing nodes 102B and 110B. The determined route may also be based on other data, such as data received from other computers, e.g., other servers communicatively connected to the server, such as through a network/cloud. For example, the route may include a path containing one or more computing nodes 102B and 110B, such as computing nodes proximate to the determined route. In another embodiment, one or more computing nodes may determine the route for the vehicle.

Server 112B, fully or partially executing the instant solution, may determine data to download to each computing node along the path of the vehicle to the destination and may be based on an amount of time it takes for the data to be provided to the vehicle from the computing node and for the data to be retrieved at the computing node from the vehicle. The amount of time may be the time needed to transmit data wirelessly to the vehicle (e.g., software updates, maps, etc.) and to receive data from the vehicle (e.g., sensor data or diagnostic information, etc.) The determined data sent to each computing node may also be based on a speed of the vehicle, signal interference/delay, network capacity etc., which may impact data transmission times as faster-moving vehicles may have less time in the data transmission range of each respective computing node. The determined data sent to each computing node may also be based on a location of at least one computing node configured to provide and retrieve the data. The vehicle's route may be optimized to pass within a transmission range of each respective computing node to enable efficient data transmission. For example, the vehicle is traveling at a speed of 36 mph, approaching a first computer node. The system determines that 16 seconds are needed to transmit the data to the vehicle. This amount of time may be due to the size of the data, the network congestion, or the projected network congestion. The system may determine a first portion of the data that can be transmitted to the vehicle, given the speed of the vehicle, or the projected speed when in the communication area of the first computing node. The system may split the data into multiple portions, a first portion and a remaining portion, where the first computing node can safely transfer the first portion. The system may determine a second computer node that the vehicle will become proximate to when leaving the communication area of the first computing node. The system may send the remaining portion of the data to the second computing node. The vehicle receives the first portion when proximate the first computing node and receives the remaining portion when proximate the second computing node.

In another embodiment, the data sent/received from each respective computing node may be between each respective computing node and a personal device, such as a smartphone, tablet, etc., associated with an occupant of the vehicle. The vehicle's route may also be influenced by the need to transmit data to and from the personal device in the vehicle, as well as the type and size of the data. This data might differ from the data sent to/received from the vehicle. The data sent to a personal device associated with one or more occupants of the vehicle may be, for example, multimedia content, app data, or even personalized settings or information relevant to the vehicle's route, e.g., personal destinations or preferred routes.

For example, the vehicle may need an over-the-air (OTA) software update to be delivered by computing nodes 102B and 110B. In one embodiment, the software update may be activated on the vehicle for a particular distance or time. For example, there is road construction for the next three blocks; the software update is for use during the three blocks. When the vehicle passes the road construction (e.g., the three blocks), the vehicle knows, and the update is automatically removed from the vehicle. The software update received by the computing node(s) may contain information pertaining to a distance and/or time of activation of the software update. This information may include a geolocation area of when the software update should be activated and/or a time of how long the software update should be activated. When the geolocation area has been exited and/or an amount of time is exceeded, the vehicle removes the received software update. In one embodiment, the vehicle may provide one or more updates to the proximate computing node and/or the server during the distance that the software update is active. The server may update itself with the software update (or the data) to send to a next vehicle or to an nth vehicle.

The computing nodes allow for wireless communication with proximate vehicles, and the range of the connection may be for a limited distance, such as a 1% mile range, which is different from a range of a cellular tower. Data sent and/or received from a computing node may be related to the vehicle (e.g., diagnostics, a software update) and/or devices associated with one or more occupants (e.g., contact data, data related to documents). The data related to the vehicle's occupants may be different for each occupant in the vehicle. If the communication range of a given computing node is 1% mile, then a vehicle must be within 14 mile before the computing node and 14 mile after the computing node. The range of the connection may be limited in the coverage area of the computing nodes, such as an hourglass type of range, following the road proximate to the at least two computing nodes. Server 112B may deliver data related to the software update to computing nodes 102B and 110B, understanding which computer node along the route to the destination can provide a best communication with the vehicle based on the current/projected speed or direction of the vehicle 104B. In one embodiment, the software update may be sent to multiple computer nodes along the path of the vehicle, which is also based on the current/projected speed or direction of the vehicle when proximate the computer nodes. The vehicle's speed or direction may be determined by the server based on received data. The received data may originate from communication between the server and a processor on the vehicle, such as an ECU. The received data may also originate from another server, such as a server that includes details of the location and movement of the vehicle.

The determined route 160B may be sent to vehicle 104B via a message, such as a route message 162B, received at processor 152B of the vehicle. The processor may receive this message and send it or a similar message to a processor associated with a navigation system. The navigation system may update the route to the destination that matches the determined route 160B. Vehicle 104B begins to route to destination 164B via the updated route. In one embodiment, the vehicle may play an audio version of the received message through the vehicle's speakers and/or display text in the received message on a display of the vehicle, such as a display in the infotainment system of the vehicle and/or in a heads-up display of the vehicle.

At the maneuvering of vehicle 104B to the destination, processor 152B may send one or more messages, such as Vehicle message 172B, to server 112B. This data message may include the current location of the vehicle, any data from other processors on the vehicle, e.g., other ECUs, data related to devices that may be wirelessly or directly connected to the vehicle, such as mobile devices associated with occupants of the vehicle, other data about the vehicle, an environment of the vehicle, received via sensors on the vehicle, for example, incoming and/or outgoing calls to/from connected devices to the vehicle, and other data that connected nodes 102B and 110B may need to provide to the vehicle, such as when the vehicle becomes proximate the Connected Nodes 102B and 110B. The vehicle data message 172B may be sent to the server one or more times during the vehicle's maneuvering to the destination, such as at an interval.

Server 112B may update the computing nodes 102B and 110B with data via a sent message, such as Vehicle Data 2 message 168B and Vehicle Data 3 message 170B. This data may be sent to update the computing nodes (computing node 1 102B and computing node 2 110B) with vehicle data, which may differ from the received original vehicle data message 172B. The computing nodes 102B and 110B may be updated multiple times 166B, such as on an interval determined by the server or when the server determines a need for the update. For example, as vehicle 104B maneuvers to the destination, a call may be received on a device connected to the vehicle wherein the device is associated with an occupant. Data from the call may be sent to processor 152B via vehicle devices, such as sensors, cameras, radar, microphones, etc. Processor 152B may update the server with the collected call data via a vehicle data message 172B, and the server may determine that information (e.g., the contact information of the callee) should be delivered to the computing nodes 102B and 110B, such as via messages 168B and 170B.

When vehicle 104B is proximate 174B, a computing node, such as computing node 1 102B, data is provided 108aB to the vehicle, and data is received 106aB from the vehicle. Additionally, when the vehicle is proximate computing node 2 110B, data is provided 108bB to the vehicle, and data is received 106bB from the vehicle.

In one embodiment, server 112B may notify vehicle 104B, requesting that the vehicle maintain a particular speed to effectually send and/or receive the amount of data determined to be transferred to the vehicle and/or received from the vehicle. The notification may be received by processor 152B and sent to a processor associated with a display of the vehicle, such as a display in the head unit or infotainment system of the vehicle. In another embodiment, processor 152B may send the notification to connected (wired or wireless) devices associated with vehicle occupants, such as a mobile device, where the notification is displayed. In another example, the notification may include a message such as, "To allow for data transmission, please stop at the upcoming stop light as soon as the light turns yellow." The determination of the notification may be based on an amount of data payload desired to be transferred to or received from the vehicle, the location of the computing nodes 102B and 110B, and the speed (or a prediction of the speed) of the vehicle when proximate the computing nodes. The server may receive the vehicle's speed by receiving at least one vehicle data message, 172B.

In one embodiment, the determination of route 160B for vehicle 104B is based on a processing load of the computing nodes 102B and 110B. The processing load of the computing nodes may include the current processing load as received in the Query/Response messages 156B and/or 158B. The receiving processing load of the computing nodes 102B and 110B may alter the route to the vehicle's destination. For example, suppose the processing load of computing nodes along a route is greater than a threshold. In that case, the server may determine that an alternate path may allow a greater ability for the system to transmit and/or receive determined data to the vehicle and determine that the alternate path would be more beneficial. The server may send the alternate route to the vehicle, such as in a route message 162B sent to the vehicle.

In one embodiment, the configuration of the at least one computing node is based on a projected traffic density when the vehicle nears the at least one computing node. The computing node may receive data from server 112B, based on information in response to query messages 156B and 158B to the computing nodes. This data may include current and historical information related to the amount of traffic proximate the computing node and nearby computing nodes. In another embodiment, the traffic density may be obtained by the server by communication with other servers, such as servers containing traffic data in an area, wherein the amount of traffic may be determined within a given time point or time frame.

The embodiments disclosed herein may exist in conjunction with any other embodiments and are not intended to be functionally separate.

The instant solution allows computing nodes in an area such as a city (referred to herein as a computing node network) to share the results of computations and data gathering with other computer nodes in the area. As a vehicle travels through the area, the vehicle will enter and exit coverage areas of proximate computer nodes connecting with the computer nodes. The connected computer node may perform a CPU-intensive calculation and derive a result. This result may be forwarded (or preloaded) to a projected next computer node, allowing the projected next computer node to avoid having to perform the same CPU-intensive calculation.

A computing node is a device containing a processor and memory that may be connected to non-moving structures throughout a city that can communicate with other computing nodes, servers, and vehicles within the computing node's coverage area. In some embodiments, computing nodes may include vehicle-to-infrastructure (V2I) communication and/or infrastructure-to-vehicle (I2V) communication. In one example, computing nodes may be spread out throughout an area, such as a city, with the computer nodes spaced apart to provide comprehensive coverage. The computing nodes may communicate with other adjacent computing nodes in some embodiments. They may relay messages to other computing nodes, allowing for messages to be passed along a vehicle pathway, for example. In some embodiments, the computing nodes may communicate with servers and moving and parked vehicles. The computing nodes may communicate with devices associated with occupants in the vehicles, such as mobile devices, laptops, tablets, wearable devices, and the like.

In one embodiment, results from computations performed by a computing node (such as those requiring CPU-intensive processing) may be propagated or preloaded to other computing nodes needing to present the results to entities, such as vehicles, servers, and/or other computing nodes. This propagation raises the efficiency of the computer node network, requiring fewer computing nodes to perform CPU-intensive computations across the computing node network.

Figure 1C:
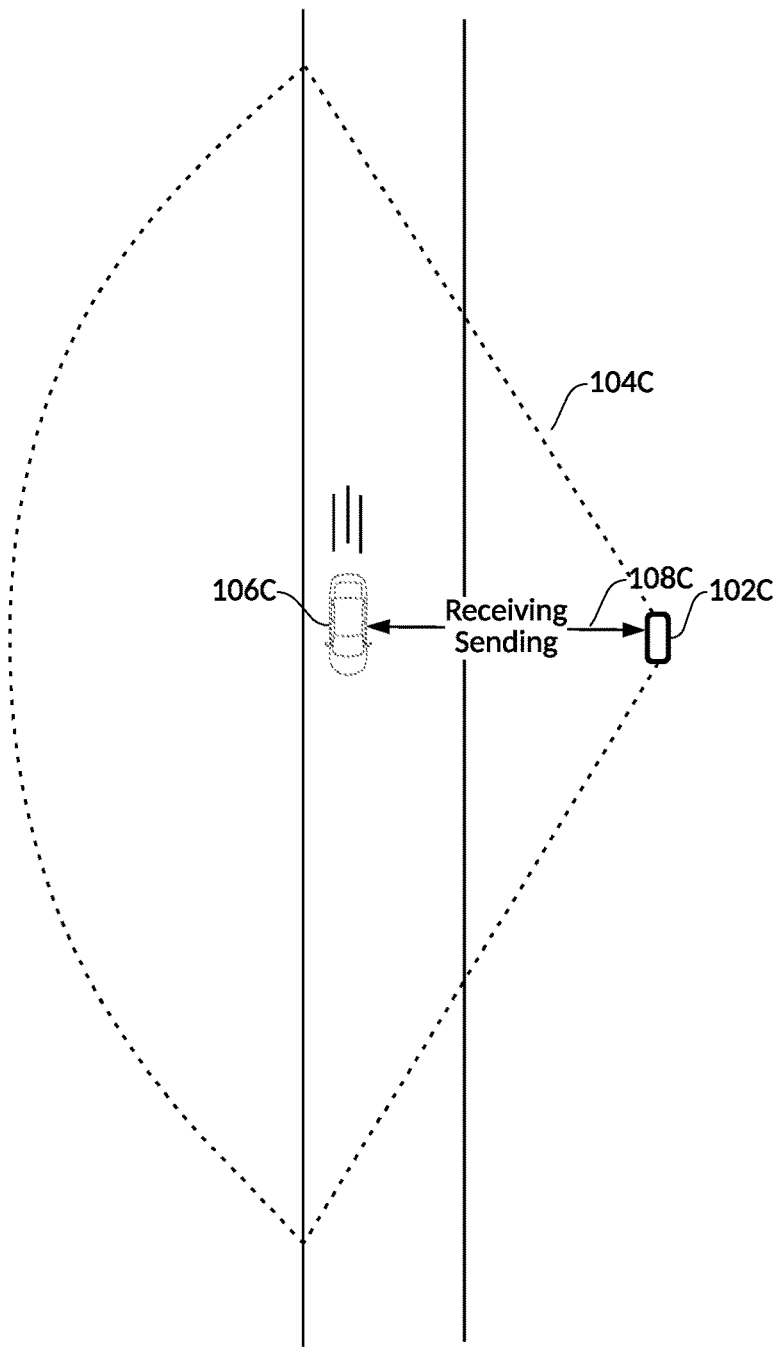
FIG. 1C illustrates an example system diagram of Density Design for City Nodes, according to example embodiments.

FIG. 1C illustrates a computing node environment 100C, including a computing node 102C with a coverage area 104C where a vehicle, such as vehicle 106C, may communicate with the computing node. The computing node 102C and the vehicle 106C may perform processes described herein according to example embodiments. Referring to FIG. 1C, the computing node 102C may be placed proximate a road, allowing communication with vehicles within the coverage area 104C. When the vehicle 106C enters the coverage area 104C of the computing node 102C, a connection is established between the vehicle 106C and the computing node 102C based on proximity. This connection could be facilitated by Vehicle-to-Infrastructure (V2I) communication systems, which utilize wireless communication protocols (e.g., 5G, LTE, Wi-Fi) to establish the connection. Once this connection is established, an exchange of data may occur 108C. The computing node 102C may send data 108C to the vehicle 106C, such as local traffic conditions, weather updates, parking information, charging station availability, etc. Similarly, the vehicle 106C may send data 108C to the computing node 102C, such as the vehicle's 106C current location, speed, destination, and other data. Data from the vehicle may originate from sensors and/or processors on the vehicle 106C, such as Electronic Control Units (ECUs), cameras, radar, lidar, microphones, etc. This data exchange may allow the computing node 102C to understand the vehicle's 106C current state and intent.

Figure 1D:
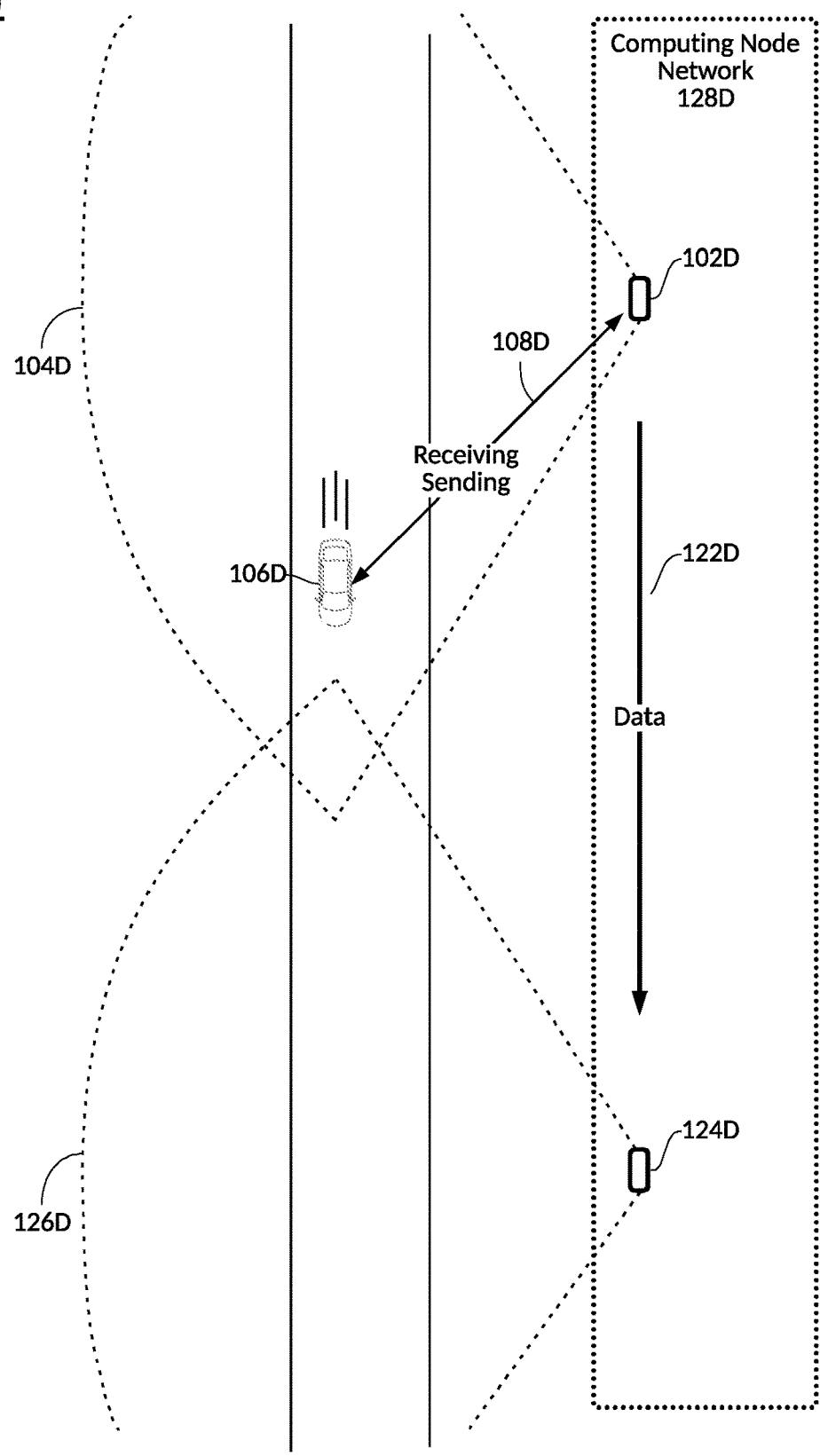
FIG. 1D illustrates another example system diagram of Density Design for City Nodes, according to example embodiments.

FIG. 1D illustrates another computing node environment 120D, including a computing node 102D with a coverage area 104D and computing node 124D with a coverage area 126D. Computing nodes 102D and 124D may be part of a computing node network 128D. Vehicle 106D may communicate with the computing nodes 102D and 124D. The computing nodes 102D and 124D and the vehicle 106D may perform processes described herein according to example embodiments. Referring to FIG. 1D, the vehicle communicates with computing node 102D, sending and receiving data 108D. Based on the data received from the vehicle (e.g., speed, direction, destination, GPS location, and historical routes), computing node 102D may predict that the vehicle is likely to enter the coverage area 126D of the adjacent computing node 124D, part of the computing node network 128D. This prediction can be based on the processing in computing node 102D, using factors like road layouts, traffic patterns, and the vehicle's current trajectory. Upon this prediction, computing node 102D sends data 122D computed for the vehicle to the adjacent node 124D before the vehicle enters the coverage area 126D of computing node 124D, referred to herein as preloading the computing node. The data 122D sent to the adjacent node 124D may include data that results from a level of processing greater than a threshold, and/or data that results from CPU-intensive computations relevant to the vehicle. Data 122D received at computing node 124D may prevent the need for computing node 124D to repeat the same or similar computations. In one embodiment, computing node 102D may determine data 122D to send to computing node 124D based on updated traffic, updated diagnostics, and updated over-the-air OTA software update, based specifically on the location of computing node 124D. For example, a CPU-intensive computation may be an analysis of sensor data received from vehicle 106D, such as an analysis of route data given a traffic condition, a weather condition, a road condition, and the like.

Figure 1E:
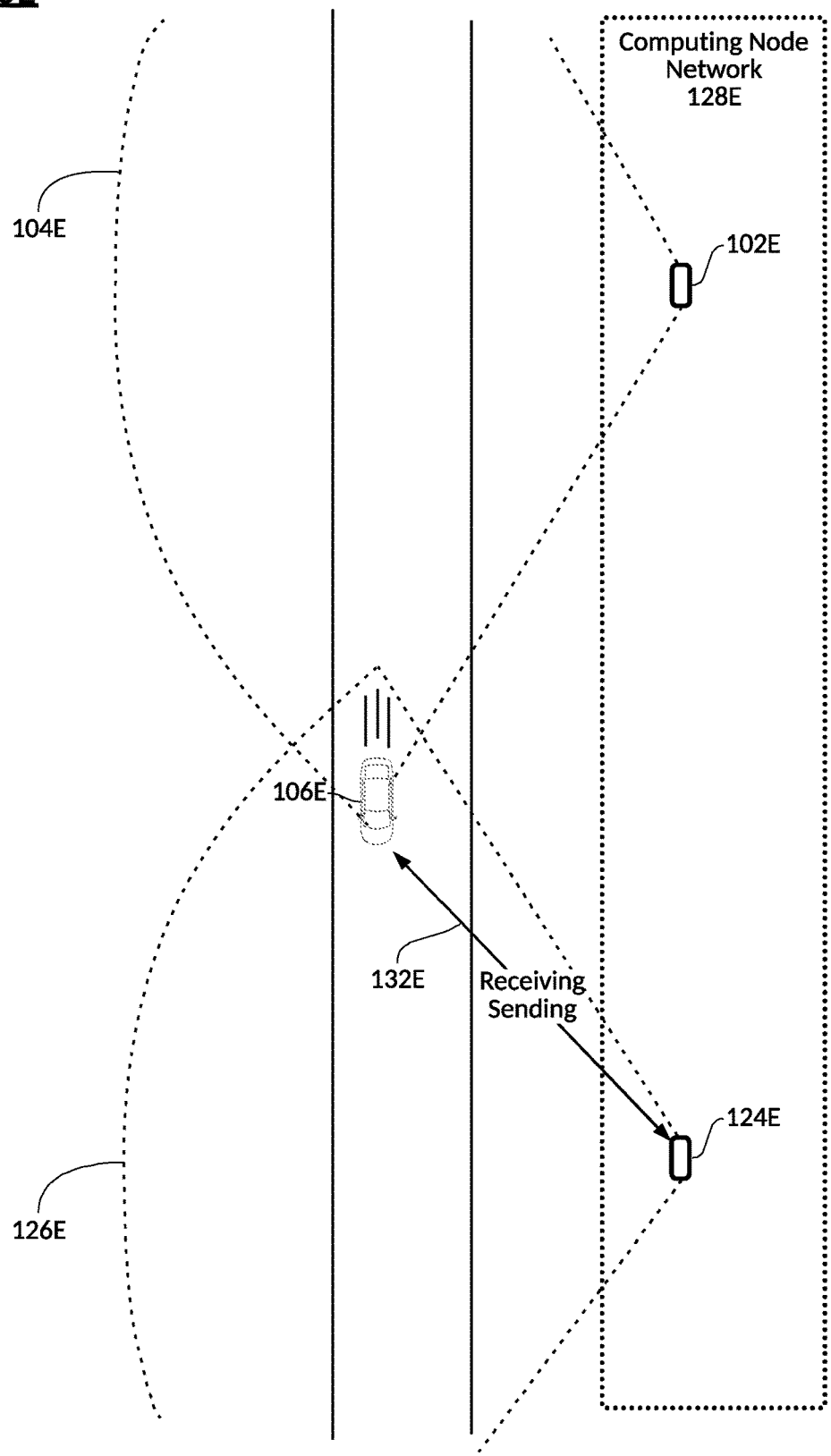
FIG. 1E illustrates a further example system diagram of Density Design for City Nodes, according to example embodiments.

FIG. 1E illustrates yet another computing node environment 130E, including a computing node 102E with a coverage area 104E and computing node 124E with a coverage area 126E. Vehicle 106E may communicate with computing nodes 102E and 124E. The computing nodes 102E and 124E and vehicle 106E may perform processes described herein according to example embodiments. Referring to FIG. 1E, vehicle 106E enters coverage area 126E of computing node 124E. Computing node 124E, having preloaded data from computing node 102E, communicates with vehicle 106E more efficiently than vehicle 106E initially entering the coverage area 126E. Computing node 124E may include revisions to the data initially sent by computing node 102E and new data that computing node 124E has computed or collected from communication 132E with vehicle 106E.

The preloading of computer nodes throughout the computer node network 128E may continue as vehicle 106E travels through the area, each time efficiently exchanging information based on the vehicle's predicted path and the computations performed by previously connected nodes. This continuous communication flow enhances real-time data dissemination and avoids computational redundancies.

In one embodiment, before vehicle 106E enters coverage area 126E of computing node 124E, computing node 102E analyzes information received 108E from vehicle 106E and updates the information. This updated information is sent 122E to computing node 124E. Computing node 124E updates the received data 122E and provides this updated information to vehicle 106E. The updated information is not sent by computing node 102E when vehicle 106E has not left coverage area 104E of computing node 102E but is sent to vehicle 106E only when vehicle 106E has entered coverage area 126E of computing node 124E. Additionally, computing node 102E does not send the updated information to other computing nodes in the computing node network 128E, but only to the computing node 124E, as computing node 124E is the computing node that will be proximate vehicle 106E, based on its current path through the area.

In another embodiment, computer nodes 102E and 124E may provide and receive data from vehicle 106E and/or devices associated with occupants in the vehicle. The computer nodes may receive data from one or more sensors on vehicle 106E, other processors on vehicle 106E such as one or more ECUs, and/or from the devices associated with occupants of vehicle 106E, wherein the data from the devices may indicate preferences of the delivery of received data at vehicle 106E. Computer nodes may send data such as vehicle-related diagnostics, traffic, and OTA data to vehicle 106E, as well as content (e.g., audio, video, multimedia, etc.) to the devices related to their preferences.

In another embodiment, computing node 102E may gather updated information before knowing which node will be the next adjacent node. For data determined to be content for wireless devices, computing node 102E can send the updates as soon as they are received. However, for vehicle 106E updates, such as traffic and diagnostics, computing node 102E may defer sending the updates to the vehicle until the next node is determined. For example, computing 102E determines the vehicle 106E will need a charge, but system 130E does not yet know the next computing node. When the next computer node 124E is determined, computing node 102E transmits that data to computing node 124E and uses that data, along with additional data, such as a nearest and least expensive charging station, and sends that data to the vehicle when entering the coverage area 126E.

In another embodiment, the system 130E may not yet determine the adjacent computing node based on the direction of vehicle 106E and alternate routes that are possible. The system 130E can analyze oncoming vehicle traffic to predict the next adjacent node. For example, the system detects another vehicle is approaching vehicle 106E and computing node 102E analyzes route data from the another vehicle to determine that the another vehicle last passed another computing node. Computer node 102E now predicts, based on vehicle's 106E rate and direction of travel, that it is headed in the direction that the another vehicle came from, so it may determine the another computing node should be the next adjacent node.

Figure 1F:
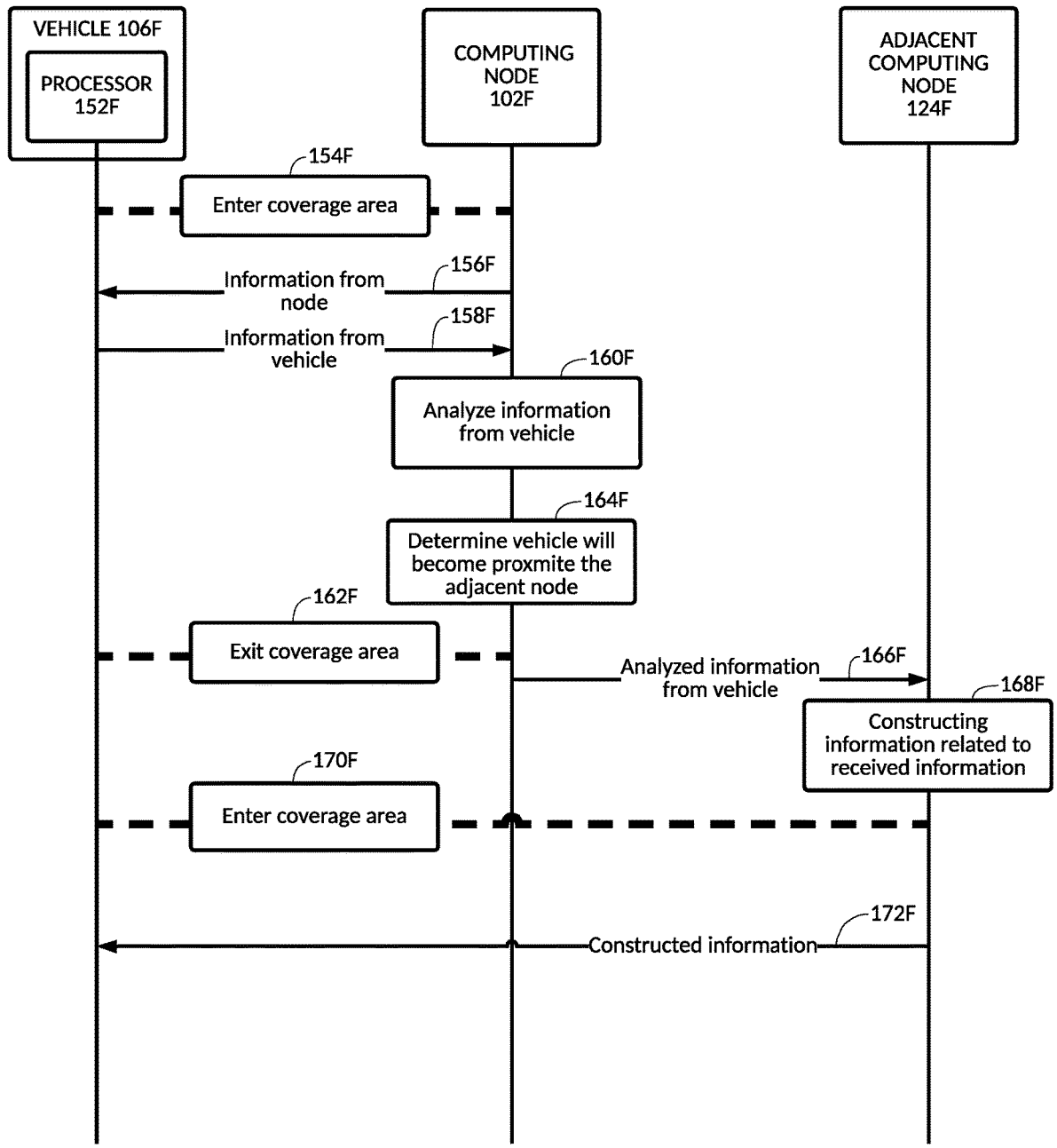
FIG. 1F illustrates an example flowchart of Density Design for City Nodes, according to example embodiments.

FIG. 1F illustrates a flowchart of a computing node environment 150F, which includes a vehicle 106F with a processor 152F, a computing node 102F, and an adjacent computing node 124F. Referring to FIG. 1F, vehicle 106F enters a coverage area 154F of computing node 102F. Communication occurs between vehicle processor 152F and computing node 102F. Information is received 156F by processor 152F, from computing node 102F, and information is received 158F by computing node 102F, from processor 152F. Received information, by computing node 102F, is analyzed 160F. Computing node 102F determines, based on at least a location, speed, and direction of vehicle 106F, that vehicle 106F will exit the coverage area of computing node 102F and enter 164F, a coverage area of the adjacent computing node 124F. Determining that vehicle 106F will exit a current coverage area and enter an adjacent computer node's coverage area is based on a certainty threshold wherein the determination is performed after vehicle 106F is no longer proximate computing node 102F. Computing node 102F sends 166F the previously analyzed information 160F to adjacent computing node 124F. Adjacent computing node 124F constructs 168F information related to the received information from vehicle 106F. Vehicle 106F enters 170F coverage area of adjacent node 124F. Adjacent computing node 124F sends 172F the constructed information 168F to vehicle 106F.

In one embodiment, a server (not depicted) is communicatively coupled to each computing node in the computing node network. The server may communicate with each of the computing nodes in the network and may provide data to each computing node, such as a distance between the nodes, a location where communication may be initiated with a vehicle traveling along a road for each computing node, a distance of communication with a vehicle traveling along the road for each computing node, a location of where communication may end for a vehicle traveling along the road for each computing node, etc.

In one example, a certainty threshold of 50% or higher means computing node 102F is sure that vehicle 106F will enter a coverage area 126F of the adjacent node 124F. A certainty threshold below 50% means it is not certain that vehicle 106F will enter the coverage area. When a certainty percentage is low (e.g., below 50%), additional feedback is needed, and computing node 102F may not act but wait for additional information. If the certainty threshold is 20%, but a level of severity is high enough (e.g., data expected to be sent or received from the vehicle is determined to have a level of importance greater than a threshold), computing node 102F will attempt to analyze information received by vehicle 106F and determine that the vehicle will become proximate an adjacent node.

In one embodiment, the information from vehicle 106F could be sensor readings from the vehicle and/or health data from devices associated with vehicle occupants, such as smartwatches, mobile phones, other wearable devices, etc. When vehicle 106F enters coverage area 126F of computing node 124F, computer node 124F may send an acknowledgment message to a previously communicating computing node, such as computing node 102F, indicating that communication with vehicle 106F has been transferred to computing node 124F. While awaiting an acknowledgment message, computing node 102F may continue to determine data to send to vehicle 106F until a determined time when vehicle 106F should enter coverage area 126F and/or until the adjacent computing node receives a time of acknowledgment of communication with vehicle 106F. Computing node 102F may obtain the determined time by data received by a server (referred to herein as a computing node server), which communicates with all computer nodes in the computer node network, for example. The data may include details of the location of the coverage area of each computing node in the computing node network. In another embodiment, each computing node in the computing node network may contain details of both the location of the coverage area of its coverage area 104F, the location of where communication may initiate and/or end with a vehicle 106F traveling along a road proximate the computing node, and similar information for adjacent computer nodes to the computing node.

Until computing node 102F receives an acknowledgment that communication with vehicle 106F has been transferred to computing node 124F, computing node 102F may send additional data to adjacent computing node 124F that is to be sent to vehicle 106F when the vehicle enters the coverage area 126F of the adjacent node 124F. In one embodiment, the additional data may be sent to the computing node server. The computing node server may broadcast the additional data and any data related to the vehicle to all computer nodes in the computer node network.

In one example, an ability of vehicle 106F to leave a location (e.g., a service/repair center, hospital, urgent care facility, etc.) may be based on analysis of a computing node 102F proximate the vehicle at the location. The vehicle may receive a notification from the proximate computing node, which indicates a recommendation to remain at that location. The analysis may be based on data received by the computing node 102F. For example, at a repair center, sensors on the vehicle may include an issue with the vehicle, such as a low tire pressure or a faulty component on the vehicle, which may be ascertained by data from an ECU or other processor on the vehicle. This data may be sent to the vehicle processor 152F then sent to the computing node 102F, such as via message 158F. The computing node 102F may continue to notify the vehicle until data from the vehicle indicates that the issue or faulty component has been repaired.

In another example, data received by the vehicle at the computing node 102F may include medical-related data, such as an elevated heart rate, a low heart rate, improper blood pressure, and the like. The computing node 102F may receive this data from vehicle data, such as data from wearable devices associated with occupants on the vehicle. This medical-related data may be directly sent to the computing node 102F or to the vehicle processor 152F, then forwarded to the computing node 102F. Computing node 102F may analyze the received medical-related data and perform analysis on the received data to take one or more actions. These actions may include altering or recommending a path of the vehicle to a destination, such as a path that offers a slower vehicle speed, a path with a higher safety rating, and the like. In another embodiment, depending on the received medical-related data, computing node 102F may determine a severity rating of the received data, such as a rating between 1 and 10, for example. If the determined severity rating is above a threshold, such as 7, additional actions may be taken by the computing node 102F and/or the computing node network.

In one embodiment, the information sent to computing node 102F is analyzed for a period based on a level of the certainty threshold and a time to reach adjacent node 124F. The amount of time to reach the adjacent node may also be the amount to reach a coverage area of the adjacent node 124F. This amount of time is determined by each computing node in the computer node network, knowing its geographical location and the geographical location of each adjacent node to it, as well as the geographical location of the respective coverage areas of each computing node. Computing node 102F also knows the vehicle's speed by receiving one or more messages 158F from processor 152F. The amount of time is then calculated to determine, given the current speed of vehicle 106F, when it will enter the coverage area of the adjacent node.

In one embodiment, constructed information, as determined by adjacent computing node 124F and sent to vehicle processor 152F, may be sent to computing node 102F or the previous computing node. Additional information 166F received at the adjacent computing node 124F may also be sent in the constructed information message 172F to one or more of the vehicle processor 152F and computing node 102F. Computing node 102F may analyze the received constructed information message data and determine the relevance of the analyzed information compared to the previously sent 166F to the adjacent computing node 124F. For example, adjacent computing node 124F, when it constructs information 168F, may remove or disregard the analyzed information 166F received from computing node 102F. A tiebreaker is needed if there is a disagreement between the received analyzed information 166F and the constructed information 168F by the adjacent node. In one example, computing node 1 informs 156F processor 152F to route to a particular hospital and see a particular doctor. Adjacent computing node 124F, through the constructed information 168F, to route to another hospital and see another doctor. The occupant's medical condition has changed between proximate computing node 102F and adjacent computing node 124F. Thus, the tiebreaker may be based on the latest analyzed data.

In one embodiment, information from devices located within the vehicle is received 158F at computing node 102F. Responsive to receiving the information from the devices, related information is sent from computing node 102F to the devices. A portion of the related information of interest is determined at computing node 102F based on interaction with the related information. For example, computing node 102F may determine an interest level of the data by the interaction with the sent information. The interest level may be determined by whether a link was clicked on the device. Suppose the interest level of the information is above a threshold. In that case, this information may be included in the data sent 166F to adjacent computing node 124F, where the adjacent node may continue to compile further information due to the level of interest being greater than a threshold. When vehicle 106F enters the coverage area of adjacent computing node 124F, it may send the further compiled information to the device in vehicle 106F.

In one embodiment, route data 158F from an oncoming vehicle is analyzed to determine a last node the oncoming vehicle passed. The computing node proximate vehicle 106F may predict the next adjacent node based on the last node the oncoming vehicle has passed. Vehicle 106F may analyze the route data. The oncoming vehicle is now within range of a computing node, such as computing node 102F. Vehicle 106F may inform computing node 102F, the last node it passed. Computing node 102F could use that as proof to determine what the adjacent computing node 124F will be.

Figure 1G:
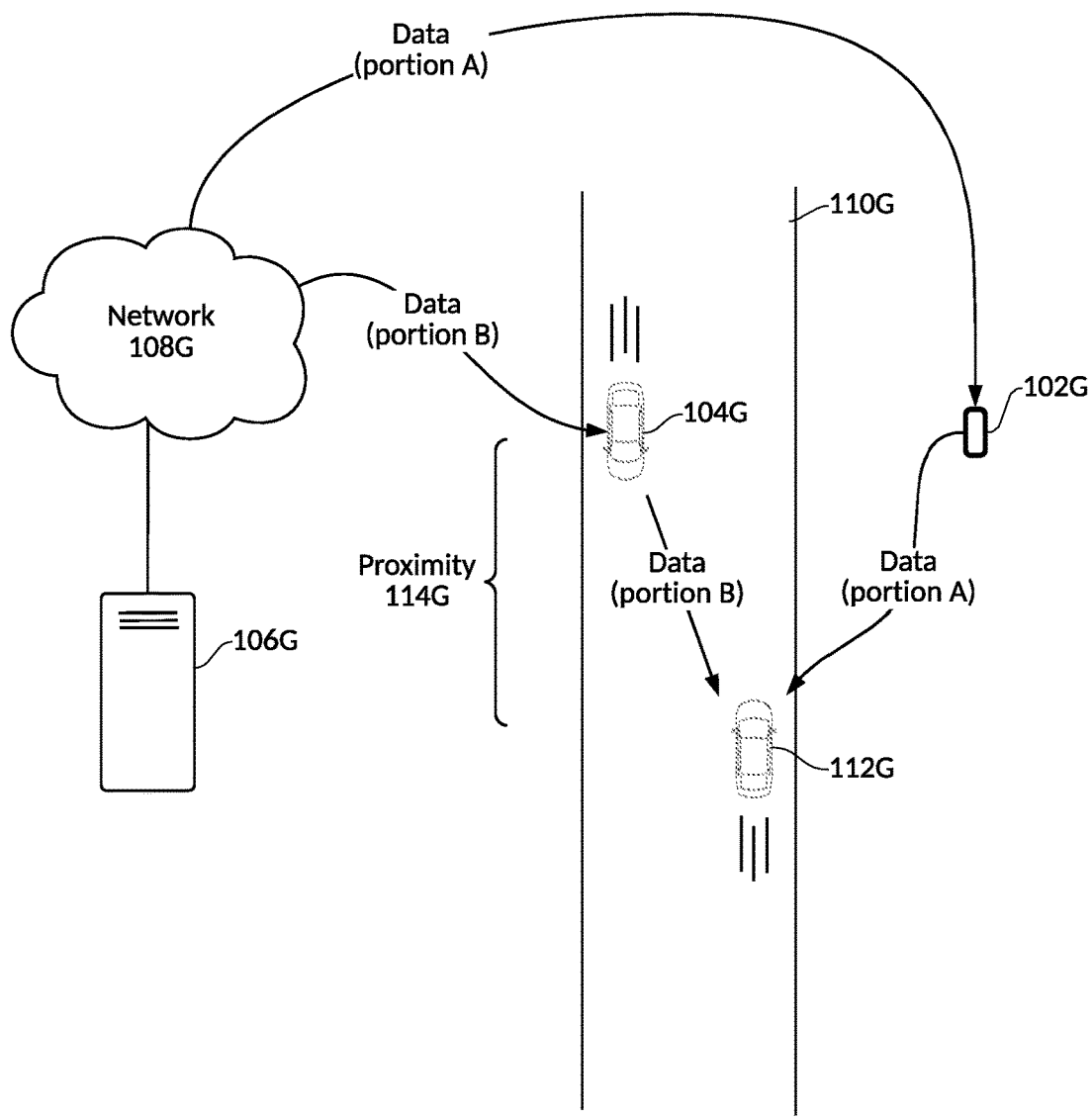
FIG. 1G illustrates an example system diagram of Handoff Sequence for City Nodes, according to example embodiments.

FIG. 1G illustrates diagram 100G according to example embodiments. A server 106G contains a Central Processing Unit (CPU) that may include one or more high-performance multi-core processors to handle multiple requests simultaneously. The server may also contain storage, such as multiple solid-state and/or hard disk drives, which may be in a RAID configuration for redundancy and speed. A network interface card may be in the server, allowing rapid data transfer and redundancy. The server may include a database management system to store and manage data. The network 108G allows communication between the computer nodes and vehicles in the system 100G. The network may include routers and switches to direct traffic, firewalls to filter and monitor traffic, and access points for wireless communication. Vehicles 112G and 104G may include an onboard computer responsible for processing and storing data, sensors such as GPS for location, accelerometers, LIDAR/RADAR, and/or cameras to capture environment data as well as capture data in the cabin of the vehicles. The vehicles may also include a network interface for dedicated short-range communication (DSRC) modules for vehicle-to-vehicle (V2V and vehicle-to-infrastructure (V2I) communication. A computer node 102G may contain a processor, memory, and storage and may be placed proximate a road 110G. In one example, computer nodes may be placed throughout an area, such as a city, and communicate with one another and the server 106G directly and/or through the network 108G.

In one embodiment, a communication link is established between vehicle 112G and first node 102G, which involves setting up a wireless connection between the two entities, such as Wi-Fi, cellular, DSRC, or the like. The purpose of this communication link is to facilitate data exchange. After the communication is established, the computing node determines what data needs to be transmitted to the vehicle. This data could be any information, such as updates, instructions, or content. Proximity detection may be used to establish communication, wherein the computing node 102G knows the relative position of vehicle 112G. The vehicle may transmit its location to computing node 102G, server 106G, and or another proximate computing node, wherein the another proximate computing node may communicate with computing node 102G.

Proximity can be defined in different ways. It could be based on geographic proximity, meaning vehicle 102G is physically close to computing node 102G. Proximity may also refer to a communication range of computing node 102G, such as vehicle 112G is close enough to establish a wireless connection for data transfer, even when they are not physically proximate. Proximity detection in this context involves the first vehicle, the first node, and a second vehicle. The method needs to be aware of these entities' relative positions and movements to determine when they are near each other. The method may detect proximity by real-time monitoring of the positions or communication statuses of the vehicle(s) involved, which may involve GPS data, vehicle-to-vehicle (V2V) communication, or other technologies that allow for tracking their locations and communication capabilities.

Data to be transmitted from computing node 102G to vehicle 112G is determined. One or more of vehicle 112G and computing node 102G may determine this determination. The relevance of the information to be delivered to vehicle 112G is a factor in determining the data to be delivered. The relevance may depend on the location of vehicle 112G, the need of the vehicle, and/or data needed for an application executing on the vehicle and/or the computing node. Data pertaining to the vehicle's safety aspect may be sent to the vehicle from the computing node before other data in one embodiment. This prioritization ensures that the most crucial data is promptly transferred. Data may be segmented based on the size of the data to be delivered. This segmentation may cause a portion of the data to be sent to vehicle 112G from computing node 102G and another portion from another computing node, such as the next computing node that becomes proximate the vehicle as the vehicle travels down the road 110G. Data compression may reduce the data size while retaining the essential information to allow for efficient data transfer between the computing node and the vehicle. In one embodiment, the computing node may perform checks to ensure data integrity, which may include verifying that the data has not been corrupted or tampered with during data storage or retrieval, such as from server 106G. The checks for data integrity may include checksums and/or cryptographic hashing and/or another type of data integrity validation. Depending on the communication technology used, the first node may need to determine the appropriate communication protocol for data transmission. For example, it might use HTTP, MQTT, or custom protocols tailored to the specific application. Data determination may be used for security in the data transmission to ensure that sensitive data is transmitted securely using encryption and authentication mechanisms.

The computing node 102G retains access to real-time or near-real-time data about the positions and movements of both vehicle 112G and vehicle 104G. This information can be obtained through various means, such as GPS (Global Positioning System) data, sensors, or vehicle-to-vehicle (V2V) communication. Computing node 102G may use geospatial data to track the trajectories of both vehicles. This data could include maps, road networks, and information about traffic conditions, speed limits, and road closures. By analyzing this data, the computing node 102G may make predictions about the future paths of the vehicles. Information about the speed and direction of travel of both vehicle 112G and vehicle 104G is crucial. By knowing their current speeds and directions, computing node 102G can estimate when and where they are likely to intersect or come into proximity.

In one embodiment, the computing node 102G may also consider the communication range and capabilities of both vehicles. When computing node 102G determines the effective communication range of each vehicle's transceiver (e.g., Wi-Fi or cellular), it can estimate when the vehicles will be within range of each other for data transmission. The computing node 102G may also execute predictive models to forecast the vehicles' future positions and interactions. These predictive models may consider historical data, traffic patterns, and machine-learning techniques to make more accurate predictions. The computing node 102G may determine the estimated time for vehicle 104G to reach a position where it can communicate effectively with vehicle 112G. This determination may involve predicting when they will be close enough for reliable data transfer. The prediction of the communication ability for vehicles 112G and 104G is not considered static. Therefore, data that includes the moving location, speed, direction, etc., of both vehicles is received at computing node 102G, where the prediction is adjusted based on the received data of both vehicles.

In one embodiment, computing node 102G may have thresholds and/or triggers to determine when the proximity condition is met. For example, it might decide that if vehicle 104G is predicted to be within 100G meters of vehicle 112G within the next 2 minutes, this condition triggers data transmission. To reduce the risk of false positives, computing node 102G may employ confirmation mechanisms, which could involve verifying the predictions through additional sensor data or communication tests from one or both of vehicles 104G and 112G to ensure that vehicle 104G is within proximity.

Vehicle 104G transfers a portion of the data to vehicle 112G when the vehicles are proximate, and another portion (such as the remaining portion) of the data is transferred from computing node 102G to vehicle 112G. Vehicle 104G may act as a data relay or intermediate data transfer and may be aware of the data held for vehicle 112G using data registration, synchronization, and communication with computing node 102G, as further described herein. When vehicle 104G approaches vehicle 112G and the proximity condition is met (as determined by computing node 102G), it receives a signal or trigger to initiate data transmission. This signal or trigger may originate via vehicle 104G and/or be triggered by computing node 102G, sending a message to vehicle 104G. The trigger may include information about which portion of the data should be transmitted. Vehicle 104G determines which portion of the data it holds is relevant to vehicle 112G's current needs and may be based on metadata, request-specific information, or predefined rules. For instance, if vehicle 112G requests weather updates, vehicle 104G may prioritize transmitting weather-related data. After selecting the relevant data portion, vehicle 104G initiates a data transmission process with vehicle 112G, which may involve establishing a secure communication link and sending the selected data portion.

In one embodiment, computing node 102G maintains an inventory of the data it intends to transmit to vehicle 112G. This inventory includes information about the data segments, priority levels, and status of the data sent to vehicle 112G. When computing node 102G determines that vehicle 104G is proximate vehicle 112G (as further detailed herein) and can facilitate data transmission, it initiates a trigger to both vehicle 104G and vehicle 112G. This trigger instructs vehicle 104G to transmit its portion of the data and computing node 102G to start the data transmission process. Computing node 102G may determine a remaining portion of the data that needs to be transmitted to vehicle 112G, which may be based on the data inventory, considering what has already been transmitted by vehicle 104G. Computing node 102G may ensure that no data is duplicated or omitted. The data sent to vehicle 112G from vehicle 104G and computing node 102G may be sent simultaneously in one embodiment, wherein the first portion is sent to vehicle 112G, and a remaining portion is sent from computing node 102G. This simultaneous transmission of data may allow the complete data to be sent to vehicle 112G in a timely manner. The synchronization may involve acknowledgments sent from vehicle 112G to one or more of vehicle 104G and computing node 102G, wherein the acknowledgments validate that the sent data has been received. These acknowledgments may be utilized by computing node 102G to synchronously send data to vehicle 112G.

Figure 1H:
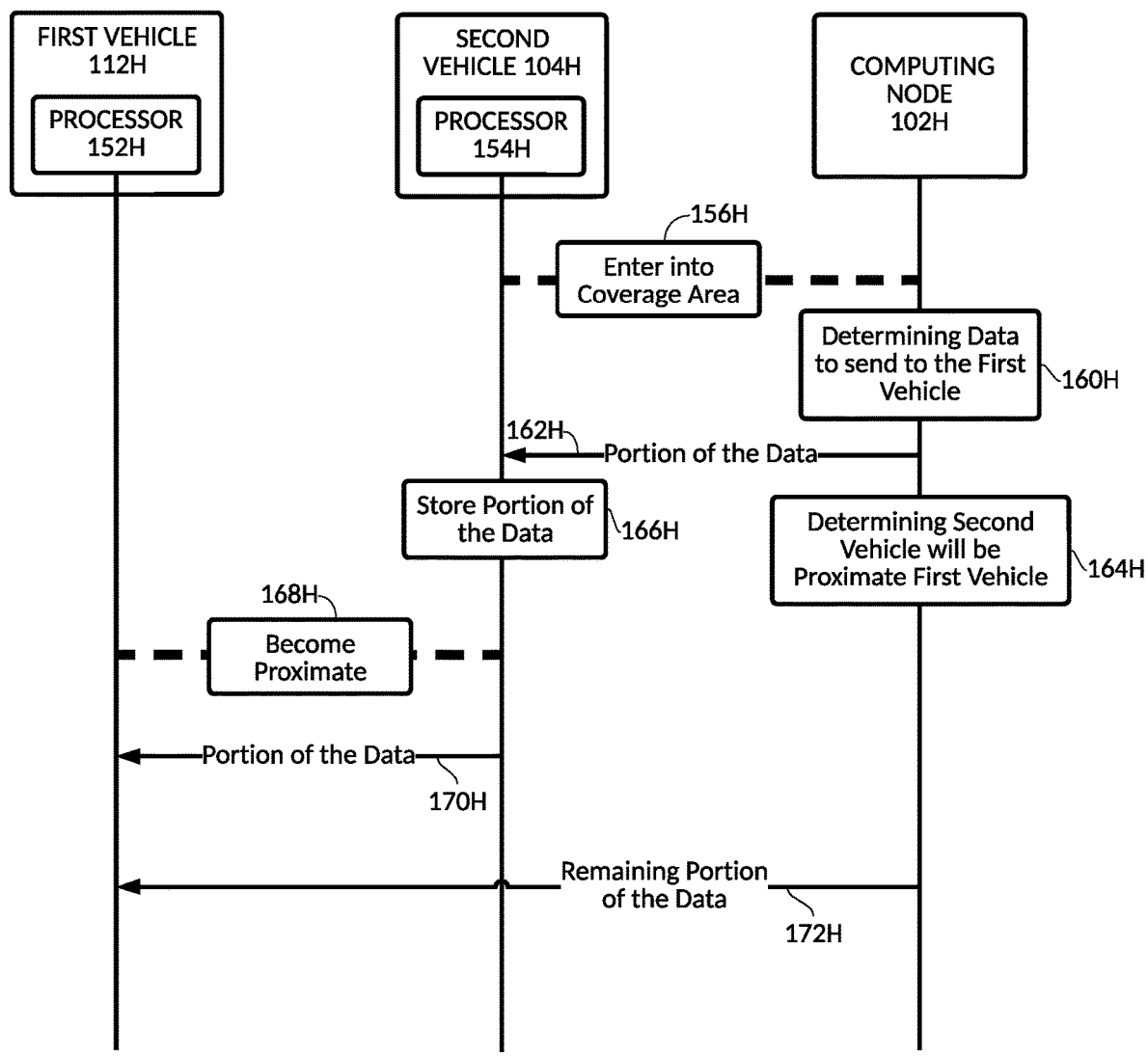
FIG. 1H illustrates an example flowchart of Handoff Sequence for City Nodes, according to example embodiments.

FIG. 1H illustrates a flowchart 150H, according to example embodiments. A first vehicle 112H contains a vehicle processor 152H, and a second vehicle 104H contains a vehicle processor 154H. Vehicle processors 152H and 154H may include a central vehicle processor, such as an Electronic Control Module (ECM). It may be communicably coupled to one or more other vehicle processors, including one or more processors associated with performing methods of the present application, such as sensors. Vehicle processors 152H and 154H may also be communicably coupled to the processor(s) of other vehicles, servers, and the like. In one embodiment, a vehicle processor may transmit and receive messages through wireless communications interfaces to and from computing node 102H, another vehicle, and/or occupant device(s), such as mobile devices associated with vehicle occupants. In another embodiment, a vehicle processor may transmit and receive messages through wired communications interfaces (e.g., through a wired communication interface associated with a charging station connected to the vehicle, through a wired charging interface such as a universal serial bus (USB) connection for an occupant device, and the like) to and from another vehicle and/or other processors. Vehicle processors 152H and 154H may have one or more associated memory devices for storing applications and data. They can be interconnected by various wired or wireless communications pathways, such as a Controller Area Network (CAN) bus or different wireless technologies known in the art. A computing node 102H may be a computer containing a processor and memory, as further described herein.

The second vehicle 104H may enter a coverage area 156H of computing node 102H. Computing node 102H may be aware of the speed and direction of vehicles 112H and 104H and that they will become proximate to each other at a future time. Computing node 102H may also be aware of data that first vehicle 112H needs, either through a previous request by first vehicle 112H or by server 106G FIG. 1G determining data that first vehicle 112H needs. Computing node 102H determines data 160H to send to first vehicle 112H, which may include all the data for first vehicle 112H or a portion of the data. The data to send to first vehicle 112H by computing node 102H may be all the data for first vehicle 112H or a portion to send to first vehicle 112H. When a portion of the data to send to first vehicle 112H is determined by computing node 102H, the remaining portion will be sent to first vehicle 112H by second vehicle 104H when they are proximate to one another. Computing node 102H may send the data portion to second vehicle 104H. Processor 154H of second vehicle 104H receives the data and stores the portion of the data 166H in a memory associated with one or more of processor 154H and the second vehicle 104H.

First vehicle 112H and second vehicle 104H become proximate 168H to each other. Processor 154H of vehicle 104H sends the stored portion of data 170H to vehicle 112H, and computing node 102H sends the remaining portion of the data 172H to vehicle 112H. The remaining portion of the data 172H may be sent to vehicle 112H by another computing node other than computing node 102H. Server 106G FIG. 1G may determine another computing node in the system of computing nodes wherein first vehicle 112H may become proximate, based on a direction and speed of vehicle 112H.

In one embodiment, when communication is established between first vehicle 112H or second vehicle 104H and computing node 102H, computing node 102H may identify missing portions of the data from the vehicle by computing node 102H. Processor 152H in first vehicle 112H or processor 154H in vehicle 104H may automatically establish a communication link with computing node 102H, such as when either of the vehicles enters the coverage area of computing node 102H. Responsive to the establishment of the communication, vehicle 112H or vehicle 104H sends a snapshot or hash of its current data set to computing node 102H. The current data set may be the portion of data that needs to be received from the system. Computing node 102H may compare the received snapshot/hash of data with the data set in memory associated with computing node 102H. Using comparative functionality, such as via a database management system, the computing node 102H identifies discrepancies between the received snapshot and its latest dataset. These discrepancies highlight the missing data portions on the vehicle. Responsive to the missing data being determined, the computing node 102H sends the vehicle(s) a message containing the determined missing data. The vehicle may then request to retrieve the missing data from one or more computing node 102H and other vehicles.

In one embodiment, the missing portions of data stored on second vehicle 104H are detected by computing node 102H. Computing node 102H may keep an index or registry of where all portions of the data are located. Whenever data is stored or transmitted, this index is updated. If a portion of the data is known to be stored on second vehicle 104H, computing node 102H references this index. In one embodiment, second vehicle 104H may periodically inform computing nodes in the system about the stored data, which can be done as a routine broadcast or in response to queries from the node. When first vehicle 112H requests data, computing node 102H may send a preliminary request or inquiry to vehicles proximate the computing node 102H, which may include second vehicle 104H, asking if they have portions of the requested data. Vehicles with relevant data would then respond, allowing computing node 102H to determine the best source for each data portion. Each portion of data residing on the vehicles and/or the computing nodes may contain a version or timestamp. By comparing these versions or timestamps, computing nodes, and vehicles can determine which portions of the data they possess and which versions are the most current. Through distributed databases, where data consistency and location transparency are maintained, the computing nodes and/or the vehicles in the system maintain a partial or full ledger of where the data is stored across the system.

In one embodiment, the transmitted data is temporarily stored on first vehicle 112H, responsive to receiving it. First vehicle 112H may be a secondary source for additional vehicles requiring the same data. For example, first vehicle 112H communicates with a computing node (or another vehicle) to request specific data. Once the request is acknowledged, the data is transmitted to first vehicle 112H. First vehicle 112H receives the data, and a data management system within the vehicle processes it. After processing the received data, the data is stored in a temporary storage location within the vehicle, such as in a memory cache or a dedicated data storage system. This storage is governed by policies determining how long data is retained, when it's overwritten, or when it's removed based on criteria like storage space, data relevance, or data age. Other vehicles, upon requiring the same data, will send out requests either directly to known vehicles or through a server, such as server 106G FIG. 1G. First vehicle, having the desired data, can respond to these requests. Upon confirmation, first vehicle 112H may transmit the stored data to the requesting vehicle. In certain embodiments, proximity requirements are established, wherein the vehicles must be proximate to one another before transmitting the data. To ensure efficient storage use and maintain the relevance of stored data, first vehicle 112H may implement policies to determine when stored data should be removed or replaced. Criteria for removal could include time since data was last accessed, storage space availability, priority or relevance of the data, or specific commands from the vehicle user or system. When data changes over time or newer versions become available, first vehicle 112H may require an update to its stored data. This may be accomplished through a periodic synchronization with the network (e.g., a proximate computing node) or by receiving updates from other vehicles. First vehicle 112H may implement cryptographic methods for data validation (like checksums or hashes) to maintain data integrity and security. Encryption can be used to ensure that transmitted data remains confidential and secure from unauthorized access or tampering.

In one embodiment, responsive to determining that the data is stored on multiple other vehicles in proximity to first vehicle 112H, the data is transmitted from at least one of the multiple other vehicles to first vehicle 112H. For example, first vehicle 112H requests specific data to a computing node 102H or broadcast to other nearby vehicles. The computing node 102H or the vehicle's communication system may determine which nearby vehicles possess the required data, which can be accomplished by maintaining an updated log of which vehicles have recently downloaded specific data or by receiving affirmative responses from vehicles that possess the required data. The system may realize that more than one vehicle in proximity to the first vehicle holds the desired data. This could be determined from the logs, multiple vehicle responses, or even real-time data synchronization between vehicles. Instead of downloading the data from just one vehicle, the system can utilize multiple vehicles to transfer the data more quickly or reliably. The data might be broken down into smaller data portions or packets. Different portions of data can then be sourced from different vehicles. In one embodiment, the same portion of data might be sourced from multiple vehicles simultaneously to ensure data redundancy and resilience against transfer errors.

First vehicle 112H may establish a data transfer link with the selected vehicles, where the selected vehicles begin transmitting the respective portions of the desired data to first vehicle 112H. This can occur simultaneously, sequentially, or based on optimal networking conditions. As the first vehicle receives the portions of data from multiple sources, it may begin reassembling these portions to reconstruct the complete data. Error-checking mechanisms, such as checksums or cryptographic hashes, can be employed to ensure that the data has been received correctly and in its entirety. Once all the required data portions have been received and reassembled, the data transfer is marked as complete. When there are missing or erroneous data portions, first vehicle 112H can request retransmission from the same or different vehicles. First vehicle may send acknowledgment signals to the transmitting vehicles, indicating the successful receipt of data.

In one embodiment, first vehicle 112H requests a specific portion of data. The system determines which vehicles among a plurality of vehicles (which may be proximate first vehicle 112H) have the entire or parts of the desired data. Through either centralized analysis or distributed checks, the system assesses which of the identified donor vehicles will be in proximity to first vehicle 112H. The proximity can be based on current locations, trajectories, speed, or predicted routes. The desired data portion is divided into distinct segments. This division could be based on size, data type, or network efficiency. The system decides which segments will be sourced from which donor vehicles. This decision could be influenced by one or more of the donor vehicle's data segments, the donor vehicles' data transfer capabilities or speeds, and/or the predicted duration of proximity between the donor vehicles and first vehicle 112H. First vehicle 112H may establish data transfer links with the chosen donor vehicles. Each donor vehicle may transmit its assigned data segment(s) to first vehicle 112H. First vehicle 112H may receive data segments from multiple donor vehicles, possibly simultaneously or in a sequenced manner. As each segment is received, first vehicle 112H starts assembling or combining these segments to reconstruct the complete desired data portion. Error-checking mechanisms can be used to ensure data integrity for each segment. Once the data is reassembled, it is stored in first vehicle 112H's storage system. First vehicle 112H can then utilize or implement the combined data portion as required (e.g., navigation, entertainment, software updates, or any other functionality). After a successful data transfer, first vehicle 112H can send acknowledgment signals to the donor vehicles. If any segment is missing or erroneous, the system can decide whether to request a retransmission from the same donor vehicle, opt for a different donor vehicle, or even retrieve it from computing node 102H.

In one embodiment, a size of the data to be transmitted is determined from the first node to the first vehicle. A size of the data stored on the second vehicle to be transmitted to the first vehicle is determined, and a remaining portion of the data to be transmitted by the first node to the first vehicle is calculated. When first vehicle 112H requests data or when the computing node 102H decides to send some data to first vehicle 112H (for instance, a software update), the size of this data can be calculated. This size can be determined in bytes, kilobytes, megabytes, etc., hereafter referred to as the size_node. For example, a software update might be 500 MB, so the size_node=500. A portion of the data might be stored on second vehicle 104H due to previous transmissions or updates. The size of this data portion on second vehicle 104H can be ascertained when it communicates with computing node 102H or directly with first vehicle 112H. The second vehicle may be referred to as size_2ndVehicle. Assume second vehicle 104H might already have 300 MB of the software update, so size_2ndVehicle=300. To determine how much data computing node 102H still needs to transmit to first vehicle 112H, subtract the size of the data stored on the second vehicle from the total size of the data to be transmitted, or remaining_size=size_node=size_2ndVehicle, or remaining_size=500−300=200, or 200 MB needs to be transmitted. Hence, computing node 102H would still need to transmit 200 MB of the data to first vehicle 112H after receiving the 300 MB from second vehicle 104H. In one embodiment, determining the files and size of the data further includes assessing the priority level of each file, and transmitting higher priority files first, regardless of the source of the data.

In one embodiment, after establishing communication with first vehicle 112H and determining the data size to be transmitted, the system may ascertain how much of this data is stored on second vehicle 104H. The difference between these values would provide the remaining portion of data that computing node 102H needs to transmit to first vehicle 112H. The system might prioritize the transmission based on the fastest available source. If second vehicle 104H can transfer its portion faster than computing node 102H due to proximity or a stronger wireless connection, it may initiate the transmission. Computing node 102H may then wait for second vehicle's 104H transmission to complete before sending the remaining portion of the data to avoid data collision or confusion. Alternatively, computing node 102H may send its data in tandem when simultaneous transmission is possible, ensuring no overlap with the data sent from second vehicle 104H. The data packets may be tagged or sequenced to ensure proper reassembly at first vehicle 112H. Once the total data size on computing node 102H and the size of the portion on second vehicle 104H are known, the system can also compute how much of the data stored on second vehicle 104H is yet to be transmitted to first vehicle 112H. The system may establish a transmission protocol between second vehicle 104H and first vehicle 112H. This could involve handshaking, establishing secure connections, or setting transmission rates. Second vehicle 104H may initiate the data transfer of its portion to the first vehicle. During this time, the first node could monitor the transfer, ready to transmit when there are transmission errors, a drop in connection, or if second vehicle 104H goes out of proximity. If any of these occur, computing node 102H may compensate by sending the remaining data. After receiving the data from second vehicle 104H, first vehicle 112H may send an acknowledgment, after which computing node 102H could start its transmission when more data is left to send. If second vehicle 112H can only send a portion of its stored data (due to constraints like limited connection time or bandwidth), then computing node 102H may adjust its transmission to send the remainder of the data.

The present invention relates to the management and optimization of urban infrastructure, particularly in the context of smart cities, using a dynamic network of specialized and non-specialized computing nodes, which may refer to herein as city nodes.

The non-specialized nodes are computational units may be strategically dispersed and interconnected to form a cohesive grid designed to undertake various general computing functions. In contrast, specialized nodes, while bearing similarities to non-specialized nodes, may be uniquely integrated with artificial intelligence (AI) mechanisms. These AI mechanisms may enable the specialized nodes to discern patterns, facilitating their evolution towards specialization in certain tasks, such as, but not limited to, traffic management or public safety. Key functions of specialized nodes encompass pattern recognition, predictive analytics, adaptive learning, resource optimization, anomaly identification, and autonomous decision-making.

Some instances of specialized nodes may include traffic management nodes that may be positioned at high-traffic areas or historically dangerous crossways. These nodes may excel in scrutinizing and predicting traffic behaviors or assist in traffic flow by the modulation of traffic signal timings. Specialized nodes may be used to recognize emergencies, such as vehicular collisions swiftly. These nodes may instantaneously alert relevant emergency departments or provide real-time cautionary signals to vehicles regarding potential hazards like adverse road conditions or the presence of pedestrians and cyclists. In yet another use of specialized nodes, parking and navigation assistance may provide real-time parking availability and relay this data to approaching vehicles or provide instantaneous data to vehicle navigation systems, facilitating efficient vehicular rerouting.

The specialization trajectory of these nodes is inherently non-uniform, largely influenced by the nature of the data they garner and the distinct needs of their geographical positioning. A salient feature of the present invention is the nodes' capability to broadcast their specialized functionalities to their peers within the network. This engenders a dynamic ecosystem wherein each node derives insights not solely from its intrinsic data but also from its counterparts' accrued experiences and specialties. Based on real-time demands and data, nodes are designed to establish intelligent connections to the most appropriate resources, such as satellites, centralized servers, or other nodes. Parameters like the time of day, current traffic conditions, priority rankings, and volume of requests play pivotal roles in dictating these connections. There's a synergistic collaboration between specialized and non-specialized nodes. A scenario might arise wherein a non-specialized node, possessing only generalized data, might solicit specialized data from its specialized counterpart, which, in response, collates the requisite information and disseminates it back to the non-specialized node.

Figure 1I:
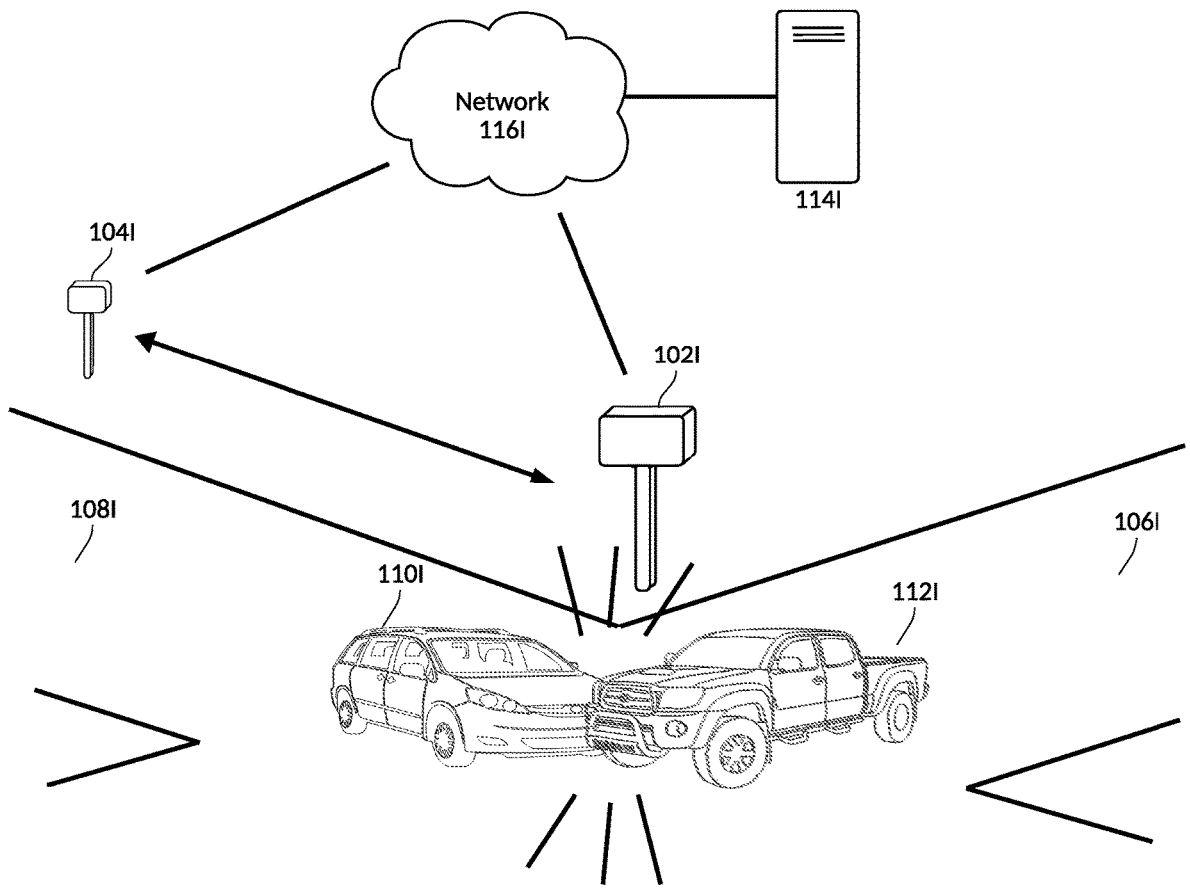
FIG. 1I illustrates an example system diagram of Specialized and Self-Learning Nodes, according to example embodiments.

FIG. 1I is a diagram 100I depicting an implementation of specialized and self-learning nodes, according to example embodiments. In one embodiment, two nodes, 102I and 104I, are presented in a geographic area. These nodes communicate with one another through either wired or wireless means. Node 102I is a specialized computing node placed proximate to an intersection, whereas node 104I is a non-specialized computing node and may be part of a network of nodes placed in the area. The nodes 102I and 104I may also communicate with a central processor or server 114I, wherein the server may be connected to a cloud or network, such as the Internet. The instant solution may fully or partially execute in a processor associated with the server 114I, nodes 102I and 104I, vehicles 110I and 112I, and/or any other processor mentioned herein. An event occurred where vehicle 110I, traveling on road 108I, collided with vehicle 112I, traveling on road 106I. The collision may be detected by the specialized computing node 102I. Node 102I may contain sensors that detect events, such as microphones, cameras, lidar, etc. Node 102I may analyze the event using received data from the sensors. For example, microphone sensors may record the event's sound, which may assist node 102I in determining a severity of the event. Image analysis performed by node 102I and/or server 114I on obtained data at node 102I, such as via camera sensors. The data may be sent to server 114I for analysis and/or other nodes 104I. In one embodiment, multiple processors (such as node 102I and server 114I) may analyze data from node 102I, wherein the analysis results are compared, and a consensus is formed on the detailed nature of the event. Another aspect of the event may be determined by node 102I, such as how long it will last. This may be based on historical data that is in memory in node 102I and/or memory in other nodes 104I, memory in server 114I, and/or memory in other computers in communication with the mentioned elements through network 116I.

One or more of the node 102I and the server 114I may identify at least one vehicle that may be affected by or associated with the event. The at least one affected vehicle may be another vehicle on roads 108I, 106I, or any other proximate road to the event. The at least one affected vehicle may be determined by node 102I, node 104I, and/or server 114I. The at least one affected vehicle may include a vehicle that must slow or stop or otherwise alter a normal traffic speed, a vehicle that may interact with an emergency vehicle upcoming to the event, and the like. Node 102I may communicate with node 104I data that node 102I may utilize to assist in the management of the event, such as informing vehicles proximate node 104I of the event and informing vehicles of upcoming emergency vehicles heading towards the event. Node 104I may be a node that is on the same road 108I leading up to the event, for example. Additional predictive data may be determined by node 102I, such as which nodes are in a location where emergency vehicles may be located when heading towards the event and communicate with those nodes the predictive data pertaining to the event. Upon receiving this information, node 104I may preemptively send out warnings or notifications to other vehicles proximate its location. The purpose of these notifications may be to instruct those vehicles to maneuver based on the received predictions before the predicted time when the vehicle(s) will be close to node 104I, effectively proactively managing vehicle movements or behaviors responsive to detected events.

As an example, a busy intersection is depicted where road 108I and road 106I intersect. A node 102I has been located proximate the intersection, which is used to monitor the traffic. Another node 104I is also located proximate the road 108I. A significant vehicle collision occurs at the intersection between vehicle 110I and vehicle 112I, where one of the vehicles begins to smoke. Node 102I detects the collision, and sensors (cameras, vibration sensors, or any other form of technology that can witness or detect such events) detect the collision and the rising smoke on the node. Node 102I determines the event's severity (the collision) and analyzes obtained data from the sensors. The analysis predicts that police will be dispatched and take about 3 minutes to arrive, an ambulance will be dispatched and will take approximately 4 minutes, and a fire truck will also be dispatched, taking around 4.5 minutes to reach the scene. This may be determined by historical data and/or analysis of the obtained data by one or more of node 102I and server 114I. Node 102I may also know that most of the traffic at the intersection comes from the direction of node 104I (on road 108I) since node 104I is located proximate the road containing most traffic to the intersection. It may also determine that emergency services, including the police station and fire department, would arrive at the intersection via road 108I. Hence, any emergency vehicle dispatched will pass by node 104I before reaching the intersection.

Node 102I sends the determined predictive data to node 104I, wherein the predictive data may include the arrival of a police car in about 3 minutes, an ambulance in about 4 minutes, and a fire truck in about 4.5 minutes. Node 104I, using the received predictive data, may notify other vehicles on road 108I about incoming emergency vehicles. This notification may be sent to the other vehicles, received by a processor in the other vehicles, and displayed on one or more of a display on the vehicle, such as a head unit, or may be displayed on a mobile device associated with one or more of the occupants of the other vehicles. The notification may be sent 30 seconds before the expected arrival of a police car, 60 seconds before the expected arrival of an ambulance, and 45 seconds before the expected arrival of a fire truck, for example. As each of these predicted times approaches, node 104I may send notifications to the other vehicles on road 108I. These notifications may also be received by electronic road signs, direct messages to smart vehicles, or via a mobile app that occupants in the area utilize. The notifications may instruct the occupants to clear a lane for the emergency vehicles, consider taking a detour to avoid the event, etc.

In one embodiment, node 102I employs integrated AI to discern characteristics of the event upon detecting that an event has occurred. The AI harnesses a blend of sensors and historical data, analyzing the real-time data to recognize patterns that reflect past occurrences. The AI uses pattern recognition to empower it to deduce the severity and probable duration of the unfolding event. Node 102I may determine vehicles that may be directly and indirectly associated with the event or on a trajectory where they may be affected by it. Depending on data stored in the node or data obtained from other sources, such as other computers or servers, the AI can differentiate between the types of vehicles, such as tow trucks, emergency vehicles, and the like, and anticipate their potential response patterns to the event. The AI draws from parameters like the vehicle's current speed, location, and probable route to determine the potential response time. The AI applies predefined time buffers according to each vehicle type to ensure a margin for outside variables, including traffic conditions and the vehicle's urgency. Node 102I may communicate with node 104I, which may execute its own AI, where various sensors and communication (such as V2X) allow it to predict other vehicles' approaches. Node 104I may proactively communicate with a vehicle, assimilating data from diverse sources to validate and/or recalibrate the prediction, such as the prediction received in communication with node 102I.

When discrepancies are introduced, such as an ambulance rerouting due to unforeseen obstacles, node 104I's AI may immediately detect the discrepancy and act accordingly. In addition to altering a predetermined predictability, the modification may be communicated with node 102I, allowing for a feedback loop to ensure both nodes maintain up-to-date situational awareness.

The AI may also store logs as a scenario unfolds, allowing for a detailed record of events to augment the AI's learning. This allows the node(s) to refine its predictive capabilities for future scenarios.

Figure 1J:
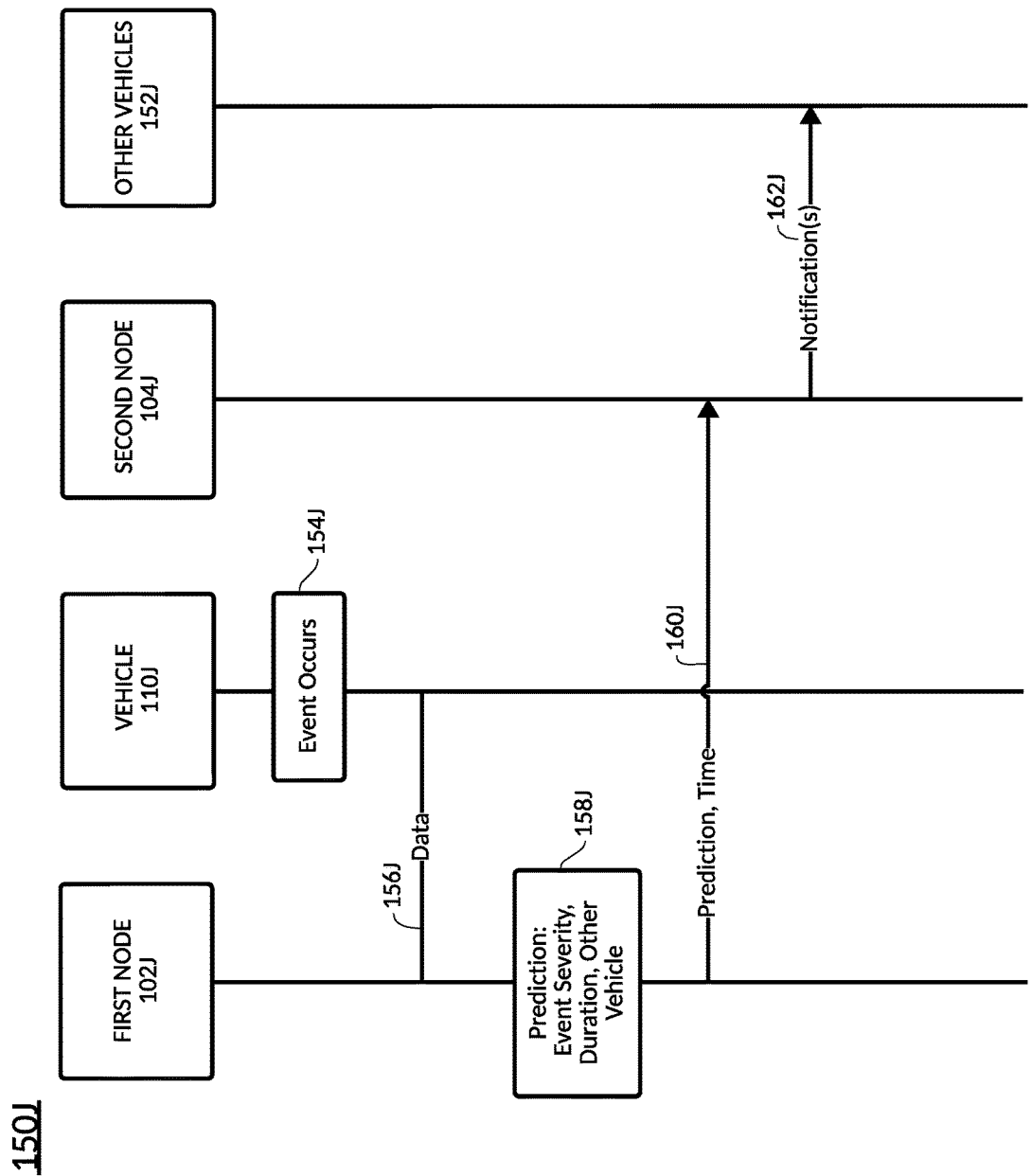
FIG. 1J illustrates an example flowchart of Specialized and Self-Learning Nodes, according to example embodiments.

FIG. 1J is a flowchart 150J describing an implementation of specialized and self-learning nodes according to example embodiments. A first node 102J is depicted as a specialized node performing functionality such as AI, data analysis, predictive analysis, and the like. A second node 104J is a non-specialized node that is part of a network of nodes that may be dispersed through an area, such as a city. Vehicle 110J is a vehicle involved in an event, such as a collision or any other event that may disrupt traffic. Other vehicles 152J are vehicles that may be affected by the event. An event occurs 154J that is detected by first node 102J. Data may be sent between first node 102J and vehicle 110J, including sensor data in vehicle 110J. The received data 156J may assist node 102J in determining details of the event 154J. First node 102J determines the event's severity, the event's predicted duration, and a prediction of other vehicles that may be affected by the event 158J. First node 102J determines another node, second node 104J, that may be proximate to the other vehicles 152J or proximate where the other vehicles may become proximate in a time. First node 102J sends a message 160J to second node 104J, wherein the message includes the determined prediction, the time of duration of the event, and other data pertaining to both the event and the predicted impact on the other vehicles 152J, as well as other data further described herein. Second node 104J receives the message 160J and sends one or more notifications 162J to the other vehicles predicted to be impacted by the event 154J. The data in the notifications may be received by the vehicle and/or devices (such as mobile devices) associated with occupants of the other vehicles 152J.

In one embodiment, first node 102J, situated strategically, can detect and communicate with proximate vehicles. The second node 104J has monitoring capabilities that allow it to track vehicle types and their proximity to other nodes, especially the first node 102J. As vehicles approach the vicinity of the first node 102J, the node interacts with the vehicles' onboard communication systems to identify the vehicle type, be it a car, truck, emergency vehicle, etc. The first node 102J could utilize a combination of sensors (e.g., infrared sensors, ultrasonic sensors, or cameras) and communication protocols (e.g., Vehicle-to-Everything, V2X) to determine the proximity of the identified vehicle. Once the vehicle is determined to be within a predefined proximity range of the first node 102J, this information, along with the vehicle type, is sent to the second node 104J. Upon identifying a vehicle's proximity and type, the first node 102J packages this information in a structured data format and transmits it to the second node 104J, using a secure communication protocol. The transmitted data could include vehicle ID, vehicle type, exact distance from the first node 102J, direction of movement, and anticipated path if available. The second node 104J, upon receiving the data, updates its monitoring system to reflect the vehicle's type and proximity to the first node 102J. The second node 104J continuously receives updates about the vehicle's movement. If the vehicle moves out of the predefined proximity range or if its type changes (e.g., due to a classification update or error), the second node 104J's monitoring system will dynamically reflect these changes. If necessary, the second node 104J can generate alerts or notifications based on predefined criteria, such as when an emergency vehicle is proximate to the first node 102J, prompting specific actions in the infrastructure. The second node 104J, based on its broader overview and data from other nodes or systems, might send feedback to the first node 102J. For example, if the second node 104J determines that a particular vehicle type should be rerouted due to traffic conditions or hazards, it can relay this information to the first node 102J, which can then communicate directly with the vehicle.

In one embodiment, the first node 102J determines an event has occurred in its geographic vicinity, as further described herein. Utilizing its integrated AI and pattern recognition capabilities, it predicts the severity and duration of the event and identifies at least one vehicle that might be associated with the event. The first node 102J also calculates when the identified vehicle will be in proximity to the second node 104J. Based on the type of vehicle, a predefined time buffer is set (e.g., police car: 30 seconds, ambulance: 60 seconds, fire truck: 45 seconds). The first node 102J then sends this prediction and timing information to the second node 104J. This transmission might include details like event location, severity, duration, vehicle type, and its expected time of proximity to the second node 104J. The second node 104J, leveraging its monitoring capabilities, keeps track of the type of the predicted vehicle as it approaches its vicinity. This might involve actively scanning for vehicles, communicating with onboard vehicle systems, or receiving broadcasts from vehicles indicating their type and location. The second node 104J may use various sensors, communication protocols (e.g., V2X communications), and data from other sources to ensure accurate monitoring. Once the second node 104J confirms that the predicted type of vehicle is indeed in its vicinity and recognizes this proximity against the timing prediction made by the first node 102J, the second node 104J sends a confirmation back to the first node 102J. This confirmation message could be a simple acknowledgment, such as "Vehicle type confirmed in proximity," or a more detailed report including the vehicle's exact location, speed, direction, or any deviations from the expected behavior. Upon receiving this confirmation, the first node 102J could log the data, make further predictions or decisions based on this data, or communicate with other nodes or systems as necessary. If the vehicle's movement doesn't align with the original prediction (e.g., an ambulance takes a different route due to unforeseen circumstances), the second node 104J can update its monitoring status and communicate these changes to the first node 102J. This feedback loop ensures that both nodes understand the situation accurately and respond dynamically to changes. Through the above steps, the system can act preemptively, ensuring that other vehicles near the second node 104J are notified and can take necessary actions based on the type of approaching emergency vehicle. This enhances both safety and traffic flow efficiency in the urban environment.

In one embodiment, the second node 104J is equipped with visual sensors (like cameras or infrared detectors) and audio sensors (like microphones with noise filtering capabilities). These sensors allow the node to identify emergency vehicles visually and detect characteristic sirens or other unique sounds emitted by these vehicles, using sound recognition algorithms to specifically recognize and distinguish the sounds of different emergency vehicles. The algorithms can be based on neural networks or machine learning models trained on various emergency vehicle sound signatures. As the siren or noise level increases, the node can predict the vehicle's approach even before getting a visual confirmation. Continuously monitor and analyze the sounds and visuals in its vicinity. When a sound pattern matches an emergency vehicle's, the node starts a timer and initiates a visual scan to obtain visual confirmation of the approaching vehicle. Based on the recognized sound, the second node 104J can send preemptive notifications to vehicles nearby. This is beneficial since sound detection can provide an early warning even before the vehicle is visually detected. Notifications can include details like the type of approaching emergency vehicle, its estimated arrival time, and suggested maneuvers for surrounding vehicles. Upon visual confirmation, the second node 104J refines its predictions regarding the time it will take for the emergency vehicle to pass through its vicinity and then relays this information back to the first node 102J. This visual confirmation further validates the sound detection, increasing the system's overall reliability. As the emergency vehicle approaches the second node 104J and eventually passes it, the second node 104J sends real-time updates to the first node 102J. This includes the type of vehicle, its speed, the exact time it passed the second node 104J, and any observed deviations from expected behavior. These updates help the first node 102J validate its initial predictions and make necessary adjustments in traffic management and vehicle rerouting to clear the path for the emergency vehicle. With the updates from the second node 104J, the first node 102J can proactively initiate traffic management protocols. This could involve changing traffic light timings, sending notifications to vehicles in their vicinity to clear specific lanes, or providing alternate route suggestions to non-emergency vehicles. After the event, the first node 102J can compare its initial predictions with the data received from the second node 104J. Any deviations can be analyzed to refine future predictions. The second node 104J can also use this event data to fine-tune its sound recognition algorithms, improving its early detection capabilities.

In one embodiment, the second node 104J receives the prediction made by the first node 102J regarding the event's severity, the event's duration, the type of vehicle associated with the event, and the time that the vehicle is expected to be near the second node 104J. The second node 104J, utilizing its sensory and monitoring capabilities, actively tracks the progress of the identified vehicle as it approaches and eventually passes through the vicinity of the second node 104J. Parameters monitored could include the vehicle's speed, direction, any stops or deviations it makes, and any other relevant behavioral data. Using the tracked data and any known information about the route between the second node 104J and the first node 102J (e.g., distance, typical traffic conditions, road conditions), the second node 104J calculates an estimated time of arrival (ETA) for when the identified vehicle will be in proximity to the first node 102J. Algorithms for ETA calculations can factor in the vehicle's current speed, expected route, any potential traffic slowdowns or disruptions, and the nature of the emergency vehicle (some might move faster due to priority on roads). The second node 104J can also access external databases or systems for real-time traffic conditions, ongoing roadwork or obstructions, and even real-time feeds from other nodes or traffic monitoring systems. This additional data can refine the accuracy of the predicted ETA. Once the ETA prediction is made, the second node 104J sends this information back to the first node 102J. This prediction might include details such as the anticipated time of proximity, any observed changes in the vehicle's behavior or route, and any factors that influenced the prediction (like traffic conditions). If, during its monitoring, the second node 104J observes any deviations from the expected behavior of the vehicle or any significant changes in route conditions, it can dynamically adjust its ETA prediction and communicate updated data to the first node 102J. This continuous feedback ensures that the first node 102J remains well-informed and can prepare for the vehicle's arrival.

In one embodiment, the second node 104J will have calculated an estimated arrival time for the vehicle's proximity to the first node 102J. The second node 104J compiles this prediction, including the type of vehicle, its status (speed, direction, any deviations), and any influencing factors that contributed to the prediction. The prediction data is packaged into a standardized format suitable for transmission, which could be a structured data packet with relevant meta-information for clarity and easy parsing by the receiving node. Data integrity and accuracy are crucial, so error-checking mechanisms might be integrated into the data packet. Given the importance and sensitivity of the data, the second node 104J establishes a secure communication link with the first node 102J, which could involve encryption and other cybersecurity measures to ensure the data is transmitted without tampering or interception. The second node 104J sends the packaged prediction data over the secure communication link to the first node 102J. The transmission may include timestamps to help the first node 102J contextualize the prediction in real time. Upon receiving the prediction data, the first node 102J may send an acknowledgment signal to confirm receipt, ensuring the second node 104J knows its prediction has been successfully communicated and can be acted upon. In case of any significant changes or deviations in the behavior of the identified vehicle after the initial prediction is sent, the second node 104J can continuously monitor and send updates to the first node 102J, ensuring that the first node 102J has the most current and accurate information on which to base its traffic management decisions. Both nodes may keep logs of these predictions and communications for future reference, analysis, and to enhance the accuracy of future predictions. This data can also be beneficial for post-event analysis and refining prediction algorithms.

In one embodiment, the second node 104J should predict which emergency vehicles will arrive at the first node 102J and in what order, based on their real-time observations and known behaviors of such vehicles. The second node 104J employs its sensors (cameras, microphones, or other relevant sensors) to track approaching emergency vehicles in real-time. It records details like the type of vehicle (police car, fire truck, ambulance), speed, direction, lane occupation, and any accompanying signals (like sirens or flashing lights). The node accesses stored behavioral data for different emergency vehicles, including average speeds, acceleration capabilities, known detour patterns, and priority behaviors (e.g., a police car's capability and likelihood to overtake other vehicles). The second node 104J processes the real-time data in conjunction with the known behavioral data using a dynamic prediction algorithm. This algorithm considers factors like current speeds and positions of the vehicles, historical data on each vehicle type's behavior, potential detours or disruptions on the route ahead, and the distance between the second node 104J and the first node 102J. Based on the processed data, the second node 104J predicts the order in which the emergency vehicles will reach the first node 102J. It may rank vehicles based on their estimated arrival time at the first node 102J, factoring in their current behaviors and known patterns. The second node 104J continuously monitors the emergency vehicles as they proceed toward the first node 102J. If it detects significant changes (like a police car suddenly accelerating or a fire truck taking an unexpected detour), it can dynamically update its predictions. Like previous implementations, the second node 104J packages the prediction data and sends it securely to the first node 102J to ensure the first node 102J is informed and can adjust its traffic management strategies accordingly. The data sent includes details about each vehicle, its predicted time of arrival, and any factors influencing the prediction. If the first node 102J requires clarification or further data, it can request the second node 104J for updates. Similarly, if the second node 104J detects significant changes post-prediction, it can send updates to the first node 102J. This ongoing communication ensures both nodes are aligned in their actions.

In one embodiment, based on the prediction received from the second node 104J, as previously described, the first node 102J sends out notifications 162J to vehicles 152J close to it, instructing them to maneuver or adjust their course or actions. The timing of this notification 162J may depend on the type of the approaching emergency vehicle, with different vehicle types having specific predefined notification lead times. The first node 102J may continue this notification process until the predicted event's duration is over. As previously described, the first node 102J may receive the prediction from the second node 104J. It then decodes the data to ascertain the type of emergency vehicle approaching, its predicted arrival time, and the event's duration. The first node 102J may reference a predefined table or database that matches vehicle types to their respective notification lead times. For instance, police car: 30 seconds before arrival, ambulance: 60 seconds before arrival, fire truck: 45 seconds before arrival. The first node 102J may use its sensors, cameras, or networked data feeds to detect vehicles currently proximate to it. Based on the decoded prediction and the identified notification lead time, the first node 102J calculates when it should start sending out notifications. As the predefined lead time approaches, the first node 102J sends notifications to the identified proximate vehicles. These notifications may instruct the vehicles to make specific maneuvers or adjustments in anticipation of the approaching emergency vehicle(s). The first node 102J may continuously monitor the situation, using real-time data feeds and any updates it might receive from the second node 104J. If any changes occur in the event's predicted duration or if a new prediction is received, the first node 102J adjusts its notifications accordingly. The first node 102J keeps track of the event's predicted duration. Once the duration of the event has elapsed (i.e., the emergency vehicle has passed the first node 102J and moved beyond the affected area), the first node 102J stops sending the maneuver notifications to the proximate vehicles. After the event concludes, the first node 102J may optionally collect feedback from the vehicles it had notified. This feedback can be about the effectiveness of the notifications, any issues faced, or suggestions for improvement. This feedback loop can be used to refine and improve the system's responsiveness in future events.

In one embodiment, once the first node 102J receives the second node 104J's predicted information, it can determine when to detour traffic or clear lanes for the arrival of the emergency vehicles. "Prior to the time" will vary based on the predicted order in which the vehicles will arrive, as further described herein.

In one embodiment, the first node 102J has visibility of the accident, and other nodes (second node 104J) do not, initiating the first node 102J to predict the accident severity, what emergency vehicles might be dispatched, and approximately how long they historically take to arrive at the scene of the accident.

Figure 1K:
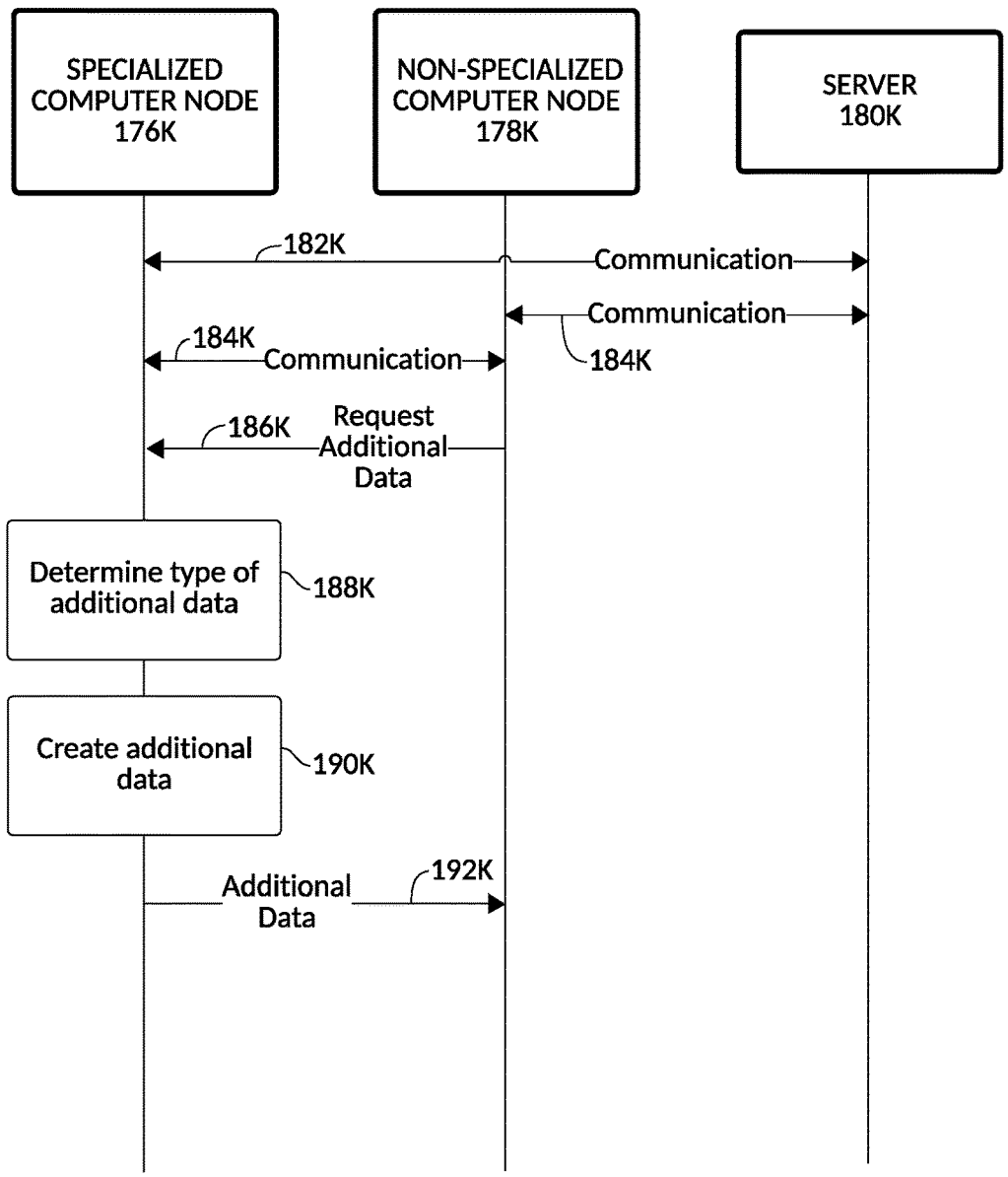
FIG. 1K illustrates another example flowchart of Specialized and Self-Learning Nodes, according to example embodiments.

FIG. 1K is a diagram 175K describing an implementation of specialized and self-learning nodes, according to example embodiments. A specialized computer node 176K is designed to perform specific tasks or generate specific data types. This node may perform monitoring of a specific location for a specific purpose. A non-specialized computer node 178K is a generic computing node without specific data processing capabilities or tasks. The specialized 176K and non-specialized 178K nodes may be placed throughout an area, such as a city. The specialized 176K and non-specialized 178K nodes are equipped with communication interfaces, such as wireless communication modules or wired connections, to transmit and receive data. These nodes communicate 182K and 184K with a central system (or server 180K) or directly to each other. After communicating with server 180K, the non-specialized computing node 178K might identify that additional data is required. For example, if the non-specialized 178K node receives temperature data from the specialized node 176K but needs additional humidity data, it can request 186K this additional data. The request may be formatted as a specific protocol message or API call. Upon receiving the request, the specialized computing node interprets the request to determine the type of additional data needed 188K, involving parsing the request message, analyzing headers, or consulting an internal lookup table, which may be stored in the specialized computer node 176K and/or the server 180K. The specialized node 176K may create or generate the additional data based on the determination involving performing computations, querying sensors, or accessing databases, which may be in the server 180K. For example, if humidity data is requested, the specialized node may read values from a sensor. Once the additional data has been generated, the specialized node 176K will package this data for transmission 190K, involving formatting the data into a structured message, adding metadata, or compressing the data. The specialized node 176K sends this data back 192K to the non-specialized node 178K via a communication link. When the specialized node 176K cannot generate the requested data, an error message may be returned in response to the request message 186K. When nodes 176K and 178K are transmitting sensitive or critical information, encryption, and secure communication methods may be employed. To ensure data integrity, checksums or other verification methods may be utilized. In one embodiment, the system may employ caching or other data storage solutions to prevent the specialized node 176K from repeatedly generating the same data.

City Nodes can communicate with vehicles and secondary nodes (including vehicles, drones, robots, and mobile devices). A city node communicating with an en-route vehicle may determine that the vehicle will be late for a time-sensitive event (e.g., a sporting event). The city node may coordinate with secondary nodes at the event location and the en route vehicle to provide occupants with a real-time event experience while en route. The city node may instruct the secondary node to manage the real-time event experience directly with the vehicle for the duration the vehicle is en route, which may consist of streaming content from the secondary node to the primary node and the infotainment system in the en route vehicle (or to user devices in the vehicle). Content continues to stream to the vehicle as it arrives and navigates to a parking spot. Once parked, the secondary node could start streaming through the primary node directly to user devices as those users make their way to their seats. Once in seats, the city node may terminate the real-time event experience.

Figure 1L:
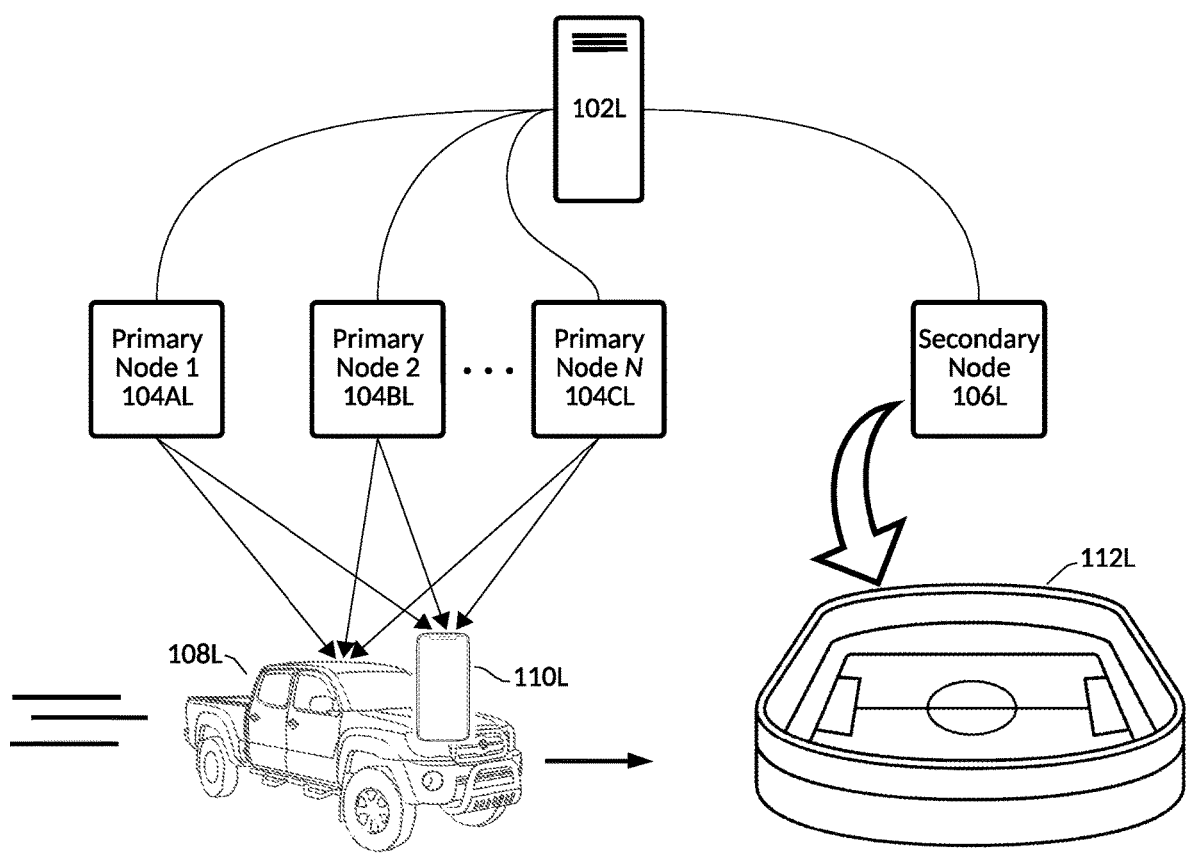
FIG. 1L illustrates an example system diagram of In Route Intelligence for City Nodes, according to example embodiments.

FIG. 1L illustrates a diagram 100L of en route intelligence for city nodes, according to example embodiments. A server 102L is a central computer that interconnects the various nodes in the system 100L. The server 102L may include one or more computers communicably coupled to the nodes 104L and 106L. Server 102L may include one or more processors and memory devices for storing applications and data. Server 102L may be communicably coupled to a network or cloud in one embodiment. In one example, server 102L may be part of a centralized traffic system or a city management system. Server 102L employs a connectivity framework that can receive data from multiple sources, including the nodes 104L and 106L, and external data sources, such as other computers/servers that may be communicated via a network. The received data may be from traffic cameras, road sensors, public transport timings, and satellite imagery. Server 102L may include an integration with processors in a vehicle, such as a vehicle's navigation systems, allowing for real-time data on vehicle locations, speed, and estimated arrival time.

Primary nodes 104AL, 104BL, and 104CL may be part of a city node network where the nodes are placed throughout an area, such as a city. These nodes may include any number of nodes that may be spread out in the area. These nodes may be placed on proximate roads throughout the area and directly communicate with proximate vehicles and occupant devices in the vehicles, such as mobile devices, tablets, and the like. The primary nodes also communicate with server 102L.

Secondary node 106L may be one or more computing nodes located in buildings in the area, such as event venues or any building where events may occur. The secondary nodes are dynamic components with streaming capabilities and may be optimized for real-time data relay. They may receive data from cameras in the building that capture an ongoing event. Integration with robotic proxies may also be provided for more interactive venues like museums, allowing for video and/or audio transmission capabilities.

Primary node 104L may, through analysis of data inputs, real-time analytics, and predictive functionality, determine that vehicle 108L will be late to an event, such as an event at location 112L. In one embodiment, primary node 104L has access to real-time traffic conditions of the area, which may originate from traffic cameras, sensors embedded in roads, and/or data from other computers/servers associated with traffic management authorities. This access allows the primary node 104L to constantly gauge traffic flow and identify anomalies, such as sudden congestion, accidents, or road closures. Primary node 104L may also communicate with vehicle 108L, such as a vehicle processor and/or a processor associated with the navigation system in the vehicle. This communication may allow primary node 104L to be aware of the vehicle's 108L real-time location, speed, destination, expected time of arrival, and route. Using predictive functionality and machine learning (ML) in primary node 104L, analysis of historical traffic data may allow the node to predict how traffic conditions might evolve. For example, a minor congestion at 4:30 pm might escalate into a major gridlock by 6 pm, based on accessed data containing historical patterns in the area. Primary node 104L may juxtapose the real-time location and route of the vehicle 108L with the current traffic conditions and the predictive insights to make an informed assessment. When primary node 104L deduces that the evolving traffic conditions will cause the vehicle's 108L ETA to surpass the event's start time, it would determine that the vehicle is likely to be late. Furthermore, primary node 104L may integrate with applications and data in vehicle 108L and/or devices 110L associated with occupants of the vehicle 108L, such as mobile devices. These applications may include ticketing apps, calendar and/or scheduling apps, etc. In one embodiment, primary node 104L may factor in buffer times, where parking, walking to the event from a parking spot, and other pre-event formalities. When the revised estimated arrival time plus the buffer times breach the event start time, it may determine that the vehicle will be late for the event.

Upon a determination that the vehicle will arrive late for the event, the primary node 104L communicates with the secondary node 106L at the event location 112L via a protocol, such as an Internet Protocol (IP) or WebRTC, allowing instantaneous exchanges without perceivable lag. Quality of Service (QoS) parameters ensure that the data packets related to the real-time event experience have priority, reducing the risk of delays, buffering, or dropped connections. Both the primary node 104L and the secondary node 106L may choose the best available communication channel, switching between them as necessary to maintain optimal performance. When available, the transfer of data between the nodes utilizes a high-speed network (e.g., 5G) due to the low latency and high bandwidth and the support of rapid and uninterrupted data exchange between the nodes. End-to-end encryption protocols may be employed to ensure that the data exchanged between the primary 104L and secondary 106L nodes remain confidential and free from potential eavesdropping or interference. Service discovery protocols, such as DNS-based service discovery, may allow the primary node 104L to identify the appropriate secondary node 106L at the event location without prior manual configuration.

The primary computing node 108L manages the real-time event experience between the secondary computing node 106L and the at least one occupant in the en-route vehicle 108L. The primary node 104L may fetch user preferences stored in the primary node 104L and/or the server 102L. The primary node 104L determines the proper occupant of vehicle 108L to deliver the content when more than one occupant occupies the vehicle 108L. For example, in a music festival setting, the content may be delivered to the device associated with the user that has previously shown interest. For example, the historical data may be accessed by stored data in the server 102L. Based on the available bandwidth and the capabilities of the en route vehicle's display systems or occupants' mobile devices, the node might dynamically adjust the resolution or bitrate of the stream, ensuring a balance between quality and uninterrupted streaming. In collaboration with cellular networks, the primary node may employ advanced handover techniques to ensure that as the vehicle 108L switches between cellular towers, the streaming experience remains seamless.

Advanced handover techniques include methodologies to ensure a seamless transition of communication sessions as mobile devices switch between network cells or access points to minimize disruptions. These advanced handover techniques preemptively identify potential issues and transfer the active session to the new base station without dropping the connection. These advanced handover techniques include one or more of soft handovers, fast-based station switching, predictive handovers, context-aware handovers, and load-balancing handovers. In soft handovers, a device simultaneously connects to multiple base stations. As the device moves, it gradually shifts its primary connection from one station to the next, ensuring no abrupt cutoff. For fast-based station switching, instead of waiting for a device's connection to degrade below a usable threshold before initiating a handover, the network constantly evaluates the best base station for the device and switches rapidly when a better option becomes available. For predictive handovers, the device's speed and historical handover points are used to predict the future movement of the device. The handover process is then initiated in anticipation of this movement, ensuring a smooth transition. For context-aware handovers, additional information, such as user behavior, application requirements, and device capabilities, are utilized to decide the best timing and target for handovers. For instance, a high-definition video stream might necessitate a handover decision different from a simple voice call. Finally, for load-balancing handovers, the network's load is considered beyond depending only on the device's movement. When a particular base station is congested, even stationary devices might be handed over to neighboring, less-loaded cells to ensure consistent service quality. As the vehicle approaches the event venue, the primary node's 104L role shifts to ensure a smooth transition. It synchronizes with the secondary node 106L to prepare for the handoff. As the user's device comes in proximity to the secondary node 106L, the real-time experience transitions from being delivered through wide-area networks to more localized solutions, perhaps Wi-Fi or direct device-to-device communication, wherein the live event stream is sent to the occupant's device.

Artificial Intelligence (AI) and Machine Learning (ML) are utilized by one or more of the primary node 104L and the secondary node 106L transforming the dynamism and adaptability of the nodes. In the context of the invention, the AI and ML roles are pivotal in ensuring the fluidity and precision of the overall experience.

For the Primary Computing Node, AI and ML play a crucial role in understanding and predicting urban mobility patterns. With the enormous amount of data that a city's traffic system generates—from vehicle counts, speeds, and routes to accident reports and weather conditions, ML functionality is trained to forecast potential traffic congestion or slowdowns. Such predictive analytics allows the primary node 104L to not only react to real-time conditions but also to anticipate them, providing early warnings to users about potential delays. Furthermore, powered by AI, adaptive routing provides occupants with the most efficient routes based on these predictions, ensuring the least delay possible. AI could also be used for efficient resource allocation, ensuring that bandwidth and communication channels are optimally utilized for the best user experience.

Transitioning to the Secondary Computing Node 106L at event location 112L, AI may be utilized to deliver content. For example, suppose there are multiple ongoing activities at a venue, like different performances at a music festival. In that case, ML analyzes user preferences (maybe through past event attendance, app preferences, or ticket type) to decide which performance to stream to that user's device, ensuring a personalized and tailored experience. In another embodiment, robotic proxies powered by AI and ML for navigation and interaction at interactive venues may be utilized to allow a rich remote experience. A robot, for instance, at a museum could be trained to recognize and interpret exhibits, answer queries, or even identify areas of interest based on crowd density or the specific interests of the attendees it represents.

Moreover, as attendees approach the venue, the secondary node 206, equipped with ML, can recognize patterns in user behavior. It might determine, for instance, how long a user typically takes from parking to reaching their seat, optimizing the streaming duration accordingly.

When the device 110L of the at least one occupant reaches a specific location within the event location 112L, the secondary node 106L terminates the real-time event experience. The secondary node 106L may track the location of the device and terminate the connection when it is determined that the device is near the final location within the venue 112L.

The instant solution may fully or partially execute in server 102L, nodes 104L and 106L, vehicle 108L, occupant device 110L, and/or any other processor mentioned herein.

In one embodiment, the city node interacts with an en route vehicle and mobile devices located within the en route vehicle to provide the real-time event experience on either or both the vehicle and the mobile devices simultaneously. This interaction allows occupants to continue the real-time event experience on a mobile device once the vehicle has reached the event destination, from the parking location to the event venue. For example, occupants en route to a sporting event can experience the event on a display within the vehicle while traveling to the destination. Once they arrive and park, they can continue to experience the event on mobile devices as they walk from the parking facility to their event seats.

In another embodiment, a city node interacts with an en-route vehicle and a robotic secondary node at a destination location. The robotic secondary node is a proxy for the remote vehicle occupants and can provide real-time interaction at the destination location. For example, the en-route vehicle occupants are late for their museum reservations. The city node can dispatch a robot at the museum that can interact with the vehicle occupants to provide an interactive experience while they are en route. The robot can respond to requests from the vehicle occupants to navigate to areas of the museum, stream audio and video of exhibits, and ask questions of museum historians on behalf of the vehicle occupants. The robot would continue to provide this real-time experience until the vehicle occupants arrive at the museum. In one embodiment, the event node can be physically or dynamically moved, such that the view being sent is the same or similar view that the person will see when sitting at the location.

In another example, the instant solution can assist reservations, such as at a restaurant. Data is presented to a device associated with the person. The data may include a simulation of the view a person may experience when entering the restaurant, sitting down, talking with a server, viewing a menu, etc. The data may be presented in a virtual reality (VR) environment in one embodiment. The presented data may be adjusted according to an amount of time until arriving at the location.

In one embodiment, the estimated arrival time is calculated for the vehicle to arrive at the time-sensitive event based on the distance between the vehicle's GPS coordinates, a time-sensitive event's GPS coordinates, and a vehicle's velocity. The primary node 104L estimates its arrival time to determine if the en-route vehicle will make it to the event on time. This calculation is driven by comparing the vehicle's current GPS coordinates with the event destinations. The primary node may continuously receive or fetch the vehicle's GPS coordinates via a connected system, such as the navigation system executing in the vehicle 108L or a mobile application running on an occupant's device 110L. In tandem with positional data, the primary node also monitors the vehicle's velocity, an essential factor for ETA calculations. The velocity can either be directly transmitted from the vehicle's telematics system or inferred based on the change in GPS coordinates over time. With the distance from the event and the current velocity in hand, the primary node 104L performs the ETA calculation, which considers real-time traffic conditions, historical data about the route, and potential obstacles or disruptions. If the computed ETA suggests a likely delay, the primary node coordinates with the secondary node 106L to provide the real-time event experience to the vehicle's occupants.

In one embodiment, data from the real-time event experience is received by the primary node 104L and sent from the secondary node 106L. This data is streamed from the primary node 104L to one or more devices within the en-route vehicle. Upon determining that the en route vehicle will likely be delayed for the time-sensitive event, the primary node 104L triggers a coordination process with the secondary node 106L situated at the event location. The secondary node is tasked with capturing or accessing the live feed or real-time updates of the ongoing event, such as through integration with the event's AV (audiovisual) system, cameras, or other data sources available at the event venue. Once the secondary node has obtained the requisite data of the real-time event experience, it initiates a transmission process, sending this data to the primary node 104L. The transmission employs a variety of protocols and methods, emphasizing secure and fast data transfer mechanisms. Protocols such as RTP (Real-time Transport Protocol) or adaptive streaming techniques are considered to ensure that the experience is relayed without significant latency and adjusts to varying network conditions. Upon receipt of this data, the primary node 104L then undertakes the role of a relay or distributor. It streams the real-time event experience to one or more devices in the en-route vehicle. This streaming can be facilitated using mobile data networks, satellite communication, or any other available communication channels to maintain a stable connection with the moving vehicle. Throughout this process, the primary node 104L employs buffering, error correction, and adaptive bitrate streaming techniques to ensure data recipients receive a seamless, uninterrupted experience despite potential network fluctuations or other transmission challenges. The primary node 104L may send the data to one or more of the vehicle 108L and/or devices 110L associated with occupants in the vehicle.

In one embodiment, one or more devices from the en-route vehicle are detected within wireless proximity by the secondary node 106L. A wireless connection is established from the secondary node 106L to the one or more devices 110L. When the en route vehicle approaches the event location, devices within the vehicle will enter a defined wireless proximity range of the secondary node 106L. This proximity range can be predefined based on the effective range of the chosen wireless communication protocol (e.g., Wi-Fi, Bluetooth, NFC, or any other suitable wireless communication technology). Once one or more devices from the en-route vehicle are detected, the secondary node 106L establishes a wireless connection, which involves exchanging security keys, handshakes, or any other necessary authentication and authorization procedures to ensure a secure and reliable connection. The purpose of this connection is to facilitate a more direct and possibly higher bandwidth communication channel between the secondary node 106L and the devices, allowing for a better quality of the real-time event experience stream or any other interactive functionalities.

In one embodiment, data of the real-time event experience is streamed by the secondary node 106L to the one or more devices 110L. Following the successful establishment of a wireless connection between the secondary node 106L and the detected devices 110L within the en route vehicle, the secondary node 106L fetches or accesses the live feed or real-time data of the ongoing event obtained from integrated cameras, audiovisual systems, or other data capturing mechanisms present at the event venue. The secondary node packages this data into a suitable format for streaming. Techniques such as adaptive bitrate streaming are employed to adjust the quality of the stream based on the device's capabilities and the strength of the wireless connection. The secondary node initiates the streaming process, transmitting the live feed to the connected devices 110L. The streaming may not necessarily replace the one from the primary node 104L immediately. There may be a brief overlap where both nodes stream simultaneously, ensuring no interruption in the experience for the vehicle's occupants. Furthermore, the secondary node might be equipped with feedback mechanisms to monitor the quality of the stream, which aids in dynamically adjusting the bitrate, resolving potential issues, or even switching to alternative streaming methods if necessary.

In one embodiment, one or more devices 110L are prompted by the secondary node 106L to terminate the real-time event experience data when the devices are located at the destination or event. As the en route vehicle nears the event location and occupants prepare to attend physically, the primary node 104L terminates any streaming to the vehicle 108L and establishes (or continues) the transmission on the device(s) associated with the occupants of the vehicle, wherein the secondary node 106L manages the streaming. As the device(s) enter the event or when the device 110L is determined to be in a determined location (e.g., where the predefined seat is located), the streaming is terminated. To manage this transition, the secondary node 106L detects when the devices are within a specific location or zone that would suggest the users are about to enter, have already entered the event venue, or are in the location of the seat at the event. This could be based on geofencing technologies, proximity sensors, or other location detection methods. Upon detecting a device entering this specific zone, the secondary node 106L would end the real-time stream to that device. In one embodiment, the secondary node may send a prompt or notification to the device in question, informing the user about the impending termination of the stream. This prompt ensures the user is aware and is not caught off-guard by the sudden stoppage of the event experience. Once the notification is sent, the secondary node 106L awaits an acknowledgment from the device. This acknowledgment could be automatic, based on predefined user settings, or manually initiated by the user after receiving the prompt. After receiving the acknowledgment, the secondary node 106L will cease streaming the real-time event experience to that device. The secondary node 106L may manage multiple devices simultaneously, meaning the termination process could be at different stages for different devices, depending on the location and preferences of each device or user.

In one embodiment, one or more preferences of the at least one occupant are identified by the primary node 104L in the en route vehicle for tailoring the real-time event experience. The real-time event experience is customized by the primary node 104L, based on the identified preferences before streaming to the at least one occupant in the en-route vehicle. The primary node 104L's capabilities are not just limited to managing and coordinating real-time event streams; it may also personalize the content by accessing a database or storage mechanism where user preferences are recorded. These preferences might be explicitly set by the users through an app or interface or implicitly derived over time through patterns of usage, previous event interactions, or AI-driven behavioral analysis. Upon determining that the en route vehicle will be delayed and a real-time event experience is necessary, the primary node 104L fetches the preferences associated with the vehicle's occupants. These preferences might dictate certain visual or audio settings, a preference for certain camera angles or perspectives, specific types of commentary, or features like subtitles or language translations. Based on the settings, the primary node 104L curates and tailors the real-time event feed. When the primary node 104L is equipped with AI capabilities, it may dynamically modify the feed in real-time based on the preferences. For example, the AI may switch the audio to that feed if a user prefers a certain commentator. Alternatively, the feed could prioritize showing the activities that align most with the user's interests for large events with multiple simultaneous activities or performances. The primary node 104L initiates the streaming of the tailored real-time event experience to the occupants, ensuring they receive a version of the event most aligned with their tastes and preferences.

Figure 1M:
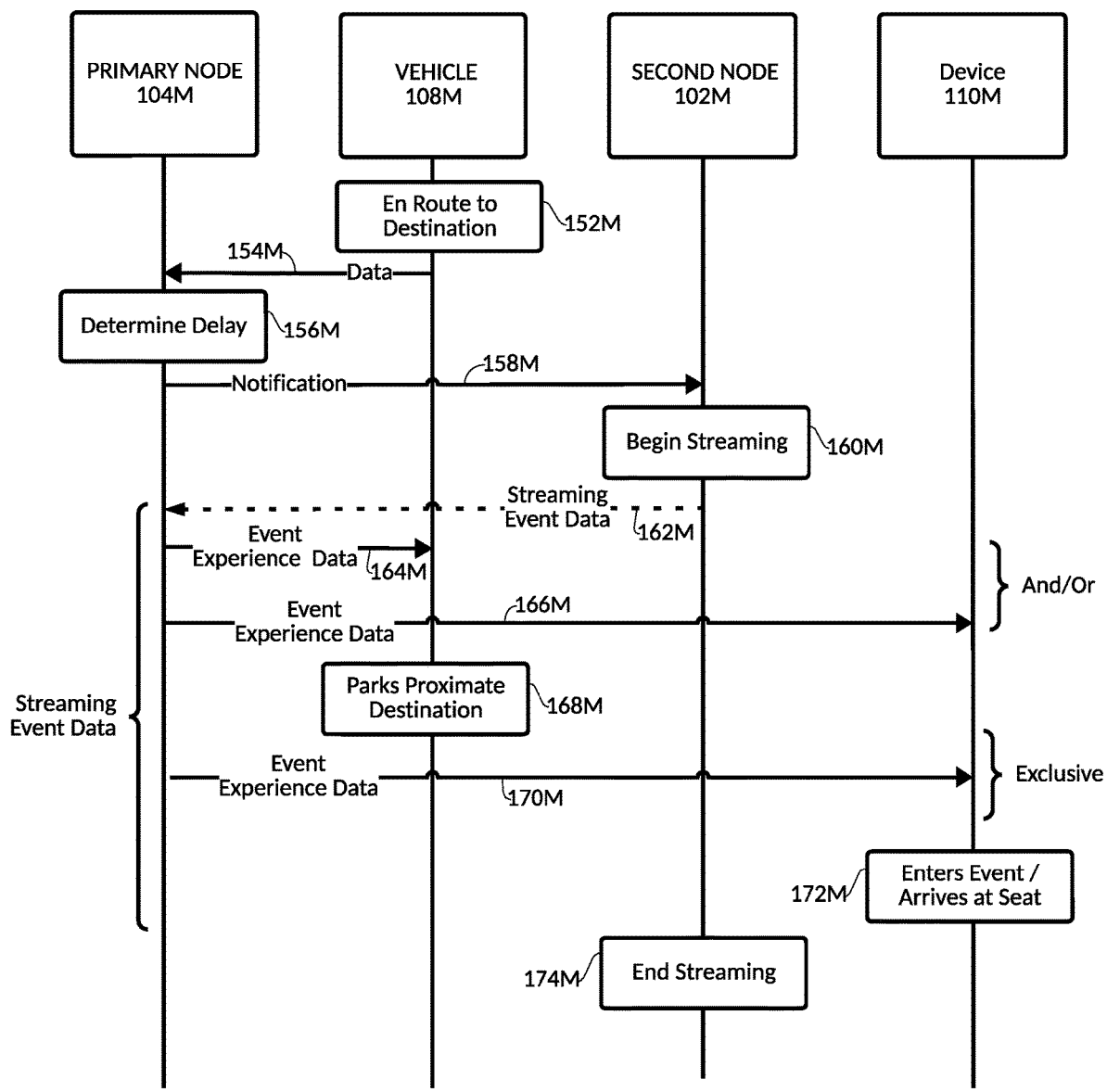
FIG. 1M illustrates an example flowchart of In Route Intelligence for City Nodes, according to example embodiments.

FIG. 1M illustrates a flowchart 150M of en route intelligence for city nodes, according to example embodiments. Vehicle 108M is en route to a destination 152M. A processor in vehicle 108M communicates 154M with primary node 104M as vehicle 108M maneuvers to the destination. The primary node 104M, equipped with sophisticated functionality described herein and connected to various traffic and GPS databases, monitors the progress of the en route vehicle 108M. By accessing real-time traffic conditions, road closures, and the vehicle's current speed and trajectory, the primary node 104M may assess the likelihood of the vehicle 108M arriving late to its destination. Connectivity to the vehicle might be facilitated via in-car systems, such as integrated GPS or connected vehicle platforms. Once a potential delay is detected 156M, the primary node 104M sends a notification 158M to a secondary node 102M situated at the event location through secure internet protocols. This secondary node 102M is integrated with event systems to access live feeds or real-time updates. The primary node 104M communicates with the en-route vehicle, which may include sending a signal to the vehicle's 108M infotainment system or directly to mobile devices 110M of the occupants via cellular networks. As the secondary node 102M begins streaming the event 160M to one or more of the vehicle 164M and the device 110M 166M, the primary node 104M may assume a managerial role. Using quality-of-service functionality and ML, the primary node ensures that the stream is optimized for the current network conditions and the device receiving the feed. 164M This might involve adjusting the streaming quality based on available bandwidth, selecting alternative streams, or buffering content to prevent interruptions. As vehicle 108M nears the event location 168M and the occupants' devices come within a specified range of the secondary node 102M, the primary node 104M initiates a transition phase. Local communication technologies like Wi-Fi, Bluetooth, or NFC transfer the streaming control from the wide area networks (used during the journey) to the local systems controlled by the secondary node 102M. Equipped with proximity detection capabilities, possibly through geofencing or direct device-to-node communication, the secondary node 102M may identify when the occupant's device 110M is within a specific location in the event venue. Understanding that the occupant has physically reached the event, the secondary node 174M terminates the real-time event stream, where the streaming to device 110M is terminated.

Flow diagrams depicted herein, such as FIG. 1, FIGS. 2C1-1C5, FIG. 2D1-2D5, FIGS. 2E1-2E5, and FIGS. 2F1-2F5 are separate examples but may be the same or different embodiments. Any of the operations in one flow diagram could be adopted and shared with another flow diagram. No example operation is intended to limit the subject matter of any embodiment or corresponding claim.

It is important to note that all the flow diagrams and corresponding processes derived from FIG. 1, FIGS. 2C1-1C5, FIGS. 2D1-2D5, FIGS. 2E1-2E5, and FIGS. 2F1-2F5 may be part of a same process or may share sub-processes with one another thus making the diagrams combinable into a single preferred embodiment that does not require any one specific operation but which performs certain operations from one example process and from one or more additional processes. All the example processes are related to the same physical system and can be used separately or interchangeably.

The instant solution can be used in conjunction with one or more types of vehicles: battery electric vehicles, hybrid vehicles, fuel cell vehicles, internal combustion engine vehicles and/or vehicles utilizing renewable sources.

Figure 2A:
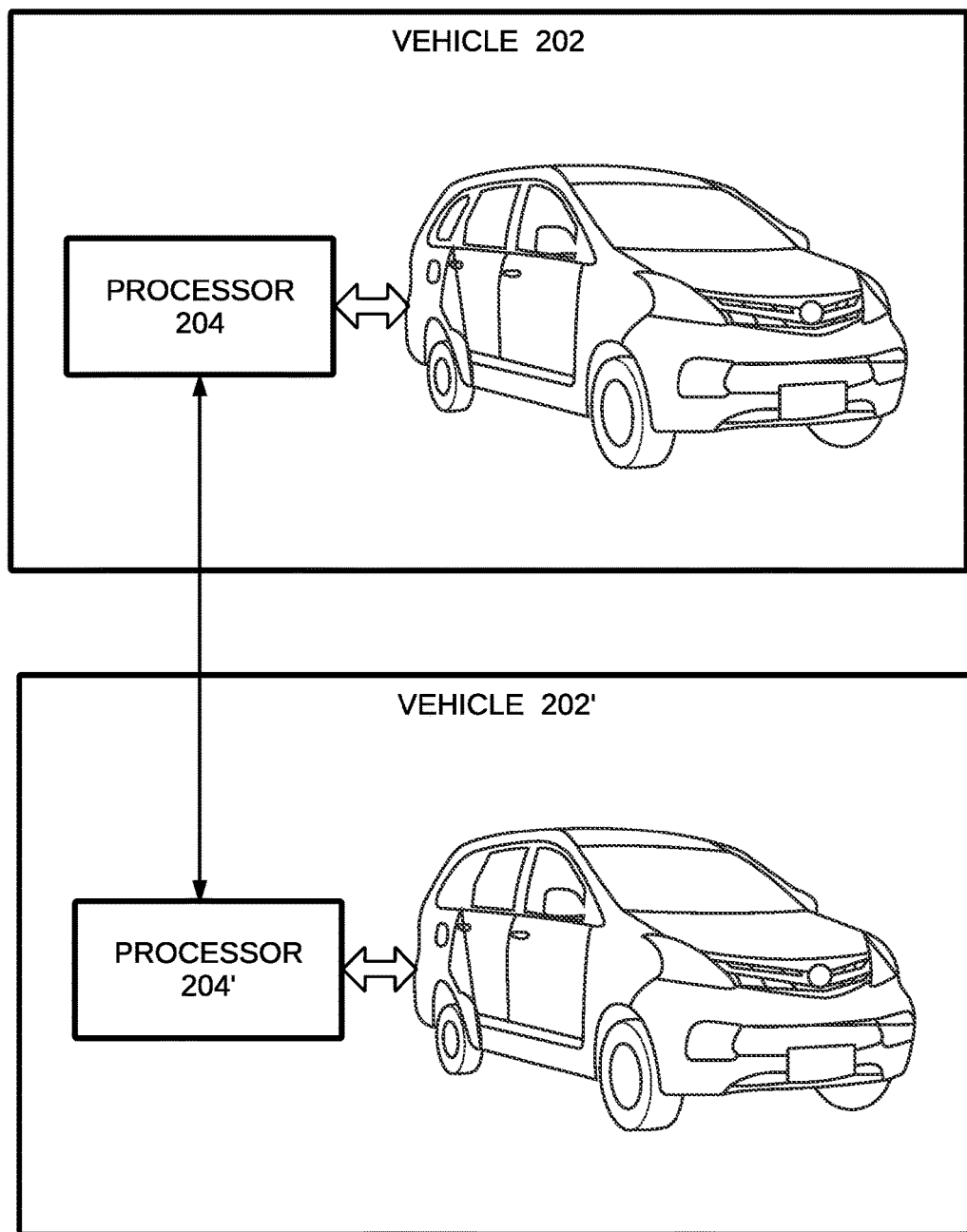
FIG. 2A illustrates a vehicle network diagram, according to example embodiments.

FIG. 2A illustrates a vehicle network diagram 200, according to example embodiments. The network comprises elements including a vehicle 202 including a processor 204, as well as a vehicle 202' including a processor 204'. The vehicles 202, 202' communicate with one another via the processors 204, 204', as well as other elements (not shown) including transceivers, transmitters, receivers, storage, sensors, and other elements capable of providing communication. The communication between the vehicles 202, and 202' can occur directly, via a private and/or a public network (not shown), or via other vehicles and elements comprising one or more of a processor, memory, and software. Although depicted as single vehicles and processors, a plurality of vehicles and processors may be present. One or more of the applications, features, steps, solutions, etc., described and/or depicted herein may be utilized and/or provided by the instant elements.

Figure 2B:
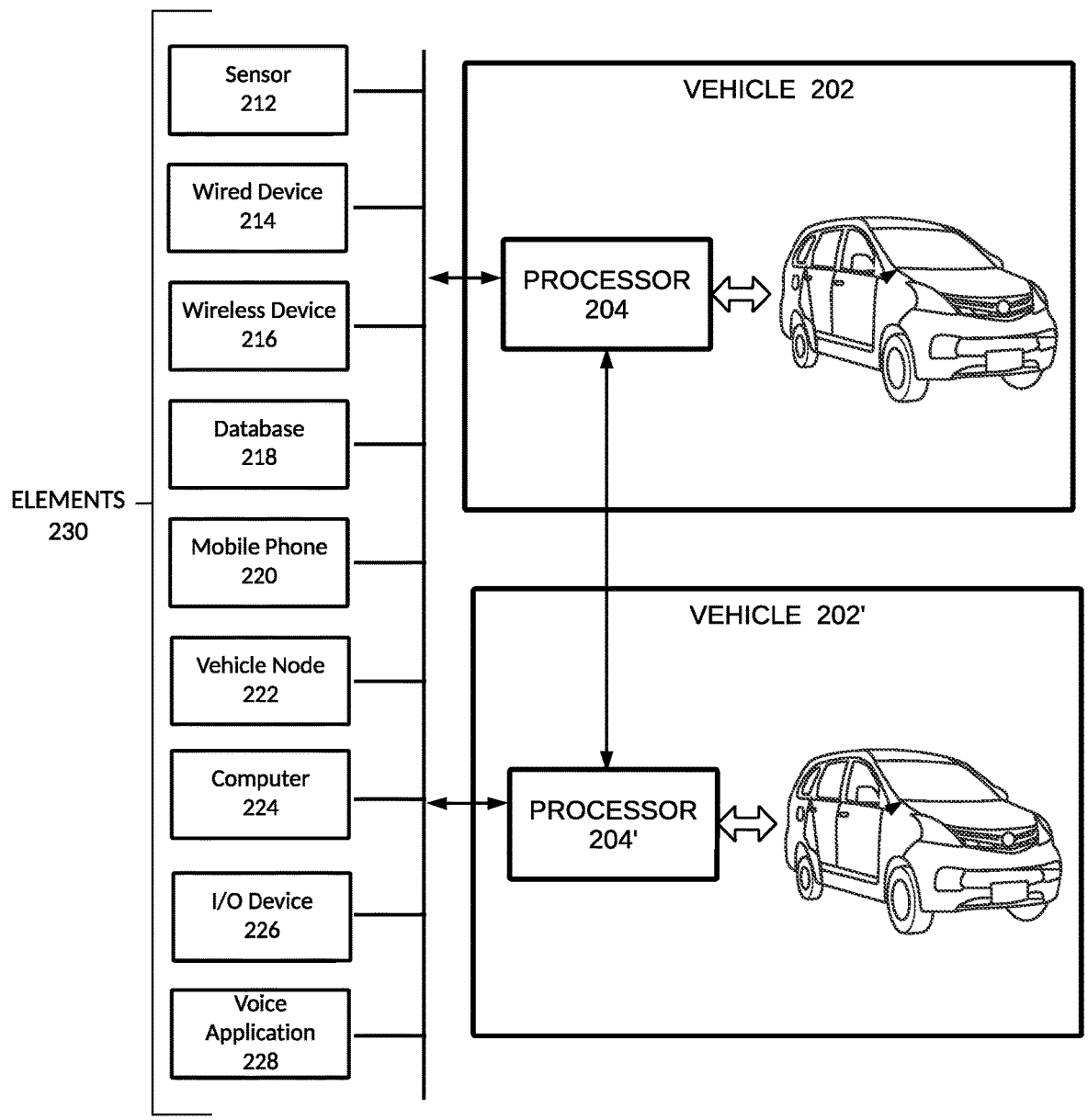
FIG. 2B illustrates another vehicle network diagram, according to example embodiments.

FIG. 2B illustrates another vehicle network diagram 210, according to example embodiments. The network comprises elements including a vehicle 202 including a processor 204, as well as a vehicle 202' including a processor 204'. The vehicles 202, 202' communicate with one another via the processors 204, 204', as well as other elements (not shown), including transceivers, transmitters, receivers, storage, sensors, and other elements capable of providing communication. The communication between the vehicles 202, and 202' can occur directly, via a private and/or a public network (not shown), or via other vehicles and elements comprising one or more of a processor, memory, and software. The processors 204, 204' can further communicate with one or more elements 230 including sensor 212, wired device 214, wireless device 216, database 218, mobile phone 220, vehicle 222, computer 224, I/O device 226, and voice application 228. The processors 204, 204' can further communicate with elements comprising one or more of a processor, memory, and software.

Although depicted as single vehicles, processors and elements, a plurality of vehicles, processors and elements may be present. Information or communication can occur to and/or from any of the processors 204, 204' and elements 230. For example, the mobile phone 220 may provide information to the processor 204, which may initiate the vehicle 202 to take an action, may further provide the information or additional information to the processor 204', which may initiate the vehicle 202' to take an action, may further provide the information or additional information to the mobile phone 220, the vehicle 222, and/or the computer 224. One or more of the applications, features, steps, solutions, etc., described and/or depicted herein may be utilized and/or provided by the instant elements.

FIG. 2C1 illustrates yet another vehicle network diagram 240, according to example embodiments. The network comprises elements including a vehicle 202, a processor 204, and a non-transitory computer readable media 242C1. The processor 204 is communicably coupled to the computer readable media 242C1 and elements 230 (which were depicted in FIG. 2B). The vehicle 202 could be a vehicle, server, or any device with a processor and memory.

The processor 204 performs one or more of determining data to be provided to a vehicle, determining data to be retrieved from the vehicle 244C1, determining a route for the vehicle based on an amount of time the data is provided to the vehicle and the data is retrieved from the vehicle, a speed of the vehicle, and a location of at least one computing node that is configured to provide and retrieve the data 246C1.

FIG. 2D1 illustrates a further vehicle network diagram 250, according to example embodiments. The network comprises elements including a vehicle 202 a processor 204, and a non-transitory computer readable media 242D1. The processor 204 is communicably coupled to the computer readable media 242D1 and elements 230 (which were depicted in FIG. 2B). The vehicle 202 could be a vehicle, server or any device with a processor and memory.

The processor 204 performs one or more of the route being based on an ability for the at least one computing node to successfully provide and retrieve the data, based on the speed of the vehicle 244D1, determining a speed for the vehicle when proximate the computing node to allow for the data providing and retrieving, an notifying the vehicle, based on the determining 245D1, the at least one computing node is configured to provide and retrieve the data from a device associated with at least one occupant of the vehicle 246D1, the determining of the route for the vehicle is based on a processing load of the at least one computing node 247D1, the configuration of the at least one computing node is based on a projected traffic density when the vehicle nears the at least one computing node 248D1, determining a location of at least one other computing node associated with a new route of the vehicle when the vehicle alters from the determined route, and transferring data that has been configured by the computing node to the at least one other computing node 249D1.

FIG. 2C2 illustrates yet another vehicle network diagram 240, according to example embodiments. The network comprises elements including a vehicle 202, a processor 204, and a non-transitory computer readable media 242C2. The processor 204 is communicably coupled to the computer readable media 242C2 and elements 230 (which were depicted in FIG. 2B). The vehicle 202 could be a vehicle, server, or any device with a processor and memory.

The processor 204 performs one or more of receiving information at a vehicle in proximity to a first node from the first node 244C2, sending information from the vehicle to the first node 246C2, analyzing the sent information by the first node 248C2, determining by the first node that the vehicle will be in proximity to an adjacent node to the first node, after the vehicle is no longer in proximity to the first node 250C2, receiving the analyzed information from the first node at the adjacent node 252C2, constructing information related to the received analyzed information at the adjacent node 254C2, sending the constructed information to the vehicle from the adjacent node 256C2.

FIG. 2D2 illustrates a further vehicle network diagram 250, according to example embodiments. The network comprises elements including a vehicle 202 a processor 204, and a non-transitory computer readable media 242D2. The processor 204 is communicably coupled to the computer readable media 242D2 and elements 230 (which were depicted in FIG. 2B). The vehicle 202 could be a vehicle, server or any device with a processor and memory.

The processor 204 performs one or more of responsive to analyzing the sent information, determining by the first node that the vehicle will alter its path toward the adjacent node based on a characteristic of the information from the vehicle and an entity associated with the adjacent node 244D2, analyzing the sent information by the first node for a period of time based on a level of the certainty threshold and a time to reach the adjacent node 245D2, sending from the adjacent node to the first node, the constructed information and additional information received at the adjacent node from the vehicle, analyzing by the first node, the received constructed information, and additional information, and determining a relevance of the analyzed information sent by the first node to the adjacent node 246D2, receiving at the first node, information from devices located within the vehicle, responsive to receiving the information from the devices, sending related information from the first node to the devices, and determining at the first node, a portion of the related information of interest based on interaction with the related information 247D2, sending additional related information of interest from the first node to the adjacent node, and sending the additional related information of interest from the adjacent node to the devices located within the vehicle 248D2, analyzing route data from an oncoming vehicle to determine a last node the oncoming vehicle passed, and predicting the adjacent node based on the last node the oncoming vehicle passed 249D2.

FIG. 2C3 illustrates yet another vehicle network diagram 240, according to example embodiments. The network comprises elements including a vehicle 202, a processor 204, and a non-transitory computer readable media 242C3. The processor 204 is communicably coupled to the computer readable media 242C3 and elements 230 (which were depicted in FIG. 2B). The vehicle 202 could be a vehicle, server, or any device with a processor and memory.

The processor 204 performs one or more of establishing a communication between a first vehicle and a computing node 244C3, determining data to be transmitted from the computing node to the first vehicle 246C3, responsive to a portion of the data being stored on a second vehicle, determining the second vehicle will be in proximity to the first vehicle 248C3, transmitting the portion of the data from the second vehicle to the first vehicle when the vehicles are in proximity and a remaining portion of the data from the computing node to the first vehicle 250C3.

FIG. 2D3 illustrates a further vehicle network diagram 250, according to example embodiments. The network comprises elements including a vehicle 202 a processor 204, and a non-transitory computer readable media 242D3. The processor 204 is communicably coupled to the computer readable media 242D3 and elements 230 (which were depicted in FIG. 2B). The vehicle 202 could be a vehicle, server or any device with a processor and memory.

The processor 204 performs one or more of responsive to establishing communication between the first vehicle and the computing node, identifying missing portions of the data from the first vehicle by the computing node 244D3, detecting the missing portions of the data stored on the second vehicle by the computing node 245D3, storing the transmitted data temporarily on the first vehicle after receiving it, wherein the first vehicle may act as a secondary source for additional vehicles requiring the same data 246D3, responsive to determining that the portion of the data is stored on multiple other vehicles in proximity to the first vehicle, transmitting the portion of the data from at least one of the multiple other vehicles to the first vehicle 247D3, determining a size of the data to be transmitted from the computing node to the first vehicle, determining a size of the data stored on the second vehicle to be transmitted to the first vehicle, and calculating a remaining portion of the data to be transmitted by the computing node to the first vehicle 248D3, determining the size of the data further includes assessing the priority level of each file of the data, and transmitting higher priority files first, regardless of a source of the data 249D3.

FIG. 2C4 illustrates yet another vehicle network diagram 240, according to example embodiments. The network comprises elements including a vehicle 202, a processor 204, and a non-transitory computer readable media 242C4. The processor 204 is communicably coupled to the computer readable media 242C4 and elements 230 (which were depicted in FIG. 2B). The vehicle 202 could be a vehicle, server, or any device with a processor and memory.

The processor 204 performs one or more of determining, by a first node, that an event has occurred in a geographic area 244C4, predicting, by the first node, a severity of the event, a duration of the event, and at least one vehicle associated with the event 246C4, pending, by the first node, the prediction to a second node and a time the at least one vehicle will be proximate the second node 248C4, sending by the second node, notifications to other vehicles proximate the second node to maneuver based on the prediction, prior to the time 250C4.

FIG. 2D4 illustrates a further vehicle network diagram 250, according to example embodiments. The network comprises elements including a vehicle 202 a processor 204, and a non-transitory computer readable media 242D4. The processor 204 is communicably coupled to the computer readable media 242D4 and elements 230 (which were depicted in FIG. 2B). The vehicle 202 could be a vehicle, server or any device with a processor and memory.

The processor 204 performs one or more of monitoring by the second node that a type of the at least one vehicle at the time is proximate the first node 244D4, sending by the second node to the first node a confirmation that the type of vehicle at the time is proximate the second node 245D4, predicting, by the second node, a time that a type of the at least one vehicle associated with the event will be proximate the first node 246D4, sending, by the second node the prediction to the first node and a time the at least one vehicle will be proximate the first node 247D4, sending by the first node, notifications to other vehicles proximate the first node to maneuver based on the prediction, prior to the time, until the duration of the event has occurred 248D4, the event is visible to the first node and is not visible to the second node 249D4.

FIG. 2C5 illustrates yet another vehicle network diagram 240, according to example embodiments. The network comprises elements including a vehicle 202, a processor 204, and a non-transitory computer readable media 242C5. The processor 204 is communicably coupled to the computer readable media 242C5 and elements 230 (which were depicted in FIG. 2B). The vehicle 202 could be a vehicle, server, or any device with a processor and memory.

The processor 204 performs one or more of determining by a primary computing node that an en route vehicle will be delayed for a time-sensitive event 244C5, coordinating by the primary computing node with a secondary computing node at an event location and the en route vehicle to provide a real-time event experience to at least one device in the en route vehicle 246C5, managing by the primary computing node the real-time event experience between the secondary computing node and the at least one device in the en route vehicle 248C5, transferring by the primary computing node the real-time event experience to the secondary computing node when a device of the at least one device is in proximity to the secondary computing node 250C5, terminating by the secondary computing node the real-time event experience when the at least one device reaches a specific location within the event location 252C5.

FIG. 2D5 illustrates a further vehicle network diagram 250, according to example embodiments. The network comprises elements including a vehicle 202 a processor 204, and a non-transitory computer readable media 242D5. The processor 204 is communicably coupled to the computer readable media 242D5 and elements 230 (which were depicted in FIG. 2B). The vehicle 202 could be a vehicle, server, or any device with a processor and memory.

The processor 204 performs one or more of calculating an estimated time of arrival for the vehicle to the time-sensitive event based on a distance between GPS coordinates of the vehicle and GPS coordinates time-sensitive event, and a velocity of the vehicle 244D5, receiving data of the real-time event experience by the primary computing node sent from the secondary computing node, and streaming the data from the real-time event experience from the primary computing node to the at least one device located within the en route vehicle 245D5, detecting by the secondary computing node the at least one device within wireless proximity, and establishing a wireless connection from the secondary computing node to the at least one device 246D5, streaming data of the real-time event experience by the secondary computing node to the at least one device 247D5, prompting by the secondary computing node to the at least one device to terminate the real-time event experience data, acknowledging by the at least one device to terminate data of the real-time event experience, and stopping the data from the real-time event experience by the secondary computing node 248D5, identifying, by the primary computing node, one or more preferences of the at least one device to tailor the real-time event experience, and customizing by the primary computing node the real-time event experience based on the identified preferences before streaming to the at least one device 249D5.

While this example describes in detail only one vehicle 202, multiple such nodes may be connected to the blockchain 206. The vehicle 202 may include additional components and that some of the components described herein may be removed and/or modified without departing from a scope of the instant application. The vehicle 202 may have a computing device or a server computer, or the like, and may include a processor 204, which may be a semiconductor-based microprocessor, a central processing unit (CPU), an application-specific integrated circuit (ASIC), a field-programmable gate array (FPGA), and/or another hardware device. Although a single processor 204 is depicted, the vehicle 202 may include multiple processors, multiple cores, or the like without departing from the scope of the instant application. The vehicle 202 could be a vehicle, server or any device with a processor and memory.

The processor 204 performs one or more of receiving a confirmation of an event from one or more elements described or depicted herein, wherein the confirmation comprises a blockchain consensus between peers represented by any of the elements 244E and executing a smart contract to record the confirmation on a blockchain-based on the blockchain consensus 246E. Consensus is formed between one or more of any element 230 and/or any element described or depicted herein, including a vehicle, a server, a wireless device, etc. In another example, the vehicle 202 can be one or more of any element 230 and/or any element described or depicted herein, including a server, a wireless device, etc.

The processors and/or computer readable media 242E may fully or partially reside in the interior or exterior of the vehicles. The steps or features stored in the computer readable media 242E may be fully or partially performed by any of the processors and/or elements in any order. Additionally, one or more steps or features may be added, omitted, combined, performed later, etc.

FIG. 2E1 illustrates a flow diagram 260E1, according to example embodiments. Referring to FIG. 2E1, the solution includes one or more of determining data to be provided to a vehicle, determining data to be retrieved from the vehicle 244E1, determining a route for the vehicle based on an amount of time the data is provided to the vehicle and the data is retrieved from the vehicle, a speed of the vehicle, and a location of at least one computing node that is configured to provide and retrieve the data 246E1

FIG. 2F1 illustrates another flow diagram 270F1, according to example embodiments. Referring to FIG. 2F1, the solution includes one or more of the route being based on an ability for the at least one computing node to successfully provide and retrieve the data, based on the speed of the vehicle 244F1, determining a speed for the vehicle when proximate the computing node to allow for the data providing and retrieving, an notifying the vehicle, based on the determining 245F1, the at least one computing node is configured to provide and retrieve the data from a device associated with at least one occupant of the vehicle 246F1, the determining of the route for the vehicle is based on a processing load of the at least one computing node 247F1, the configuration of the at least one computing node is based on a projected traffic density when the vehicle nears the at least one computing node 248F1, determining a location of at least one other computing node associated with a new route of the vehicle when the vehicle alters from the determined route, and transferring data that has been configured by the computing node to the at least one other computing node 249F1.

FIG. 2E2 illustrates a flow diagram 260E2, according to example embodiments. Referring to FIG. 2E2, the solution includes one or more of receiving information at a vehicle in proximity to a first node from the first node 244E2, sending information from the vehicle to the first node 246E2, analyzing the sent information by the first node 248E2, determining by the first node that the vehicle will be in proximity to an adjacent node to the first node, after the vehicle is no longer in proximity to the first node 250E2, receiving the analyzed information from the first node at the adjacent node 252E2, constructing information related to the received analyzed information at the adjacent node 254E2, sending the constructed information to the vehicle from the adjacent node 256E2.

FIG. 2F2 illustrates another flow diagram 270F2, according to example embodiments. Referring to FIG. 2F2, the solution includes one or more of responsive to analyzing the sent information, determining by the first node that the vehicle will alter its path toward the adjacent node based on a characteristic of the information from the vehicle and an entity associated with the adjacent node 244F2, analyzing the sent information by the first node for a period of time based on a level of the certainty threshold and a time to reach the adjacent node 245F2, sending from the adjacent node to the first node, the constructed information and additional information received at the adjacent node from the vehicle, analyzing by the first node, the received constructed information, and additional information, and determining a relevance of the analyzed information sent by the first node to the adjacent node 246F2, receiving at the first node, information from devices located within the vehicle, responsive to receiving the information from the devices, sending related information from the first node to the devices, and determining at the first node, a portion of the related information of interest based on interaction with the related information 247F2, sending additional related information of interest from the first node to the adjacent node, and sending the additional related information of interest from the adjacent node to the devices located within the vehicle 248F2, analyzing route data from an oncoming vehicle to determine a last node the oncoming vehicle passed, and predicting the adjacent node based on the last node the oncoming vehicle passed 249F2.

FIG. 2E3 illustrates a flow diagram 260E3, according to example embodiments. Referring to FIG. 2E3, the solution includes one or more of establishing a communication between a first vehicle and a computing node 244E3, determining data to be transmitted from the computing node to the first vehicle 246C3, responsive to a portion of the data being stored on a second vehicle, determining the second vehicle will be in proximity to the first vehicle 248E3, transmitting the portion of the data from the second vehicle to the first vehicle when the vehicles are in proximity and a remaining portion of the data from the computing node to the first vehicle 250E3.

FIG. 2F3 illustrates another flow diagram 270F3, according to example embodiments. Referring to FIG. 2F3, the solution includes one or more of responsive to establishing communication between the first vehicle and the computing node, identifying missing portions of the data from the first vehicle by the computing node 244F3, detecting the missing portions of the data stored on the second vehicle by the computing node 245F3, storing the transmitted data temporarily on the first vehicle after receiving it, wherein the first vehicle may act as a secondary source for additional vehicles requiring the same data 246F3, responsive to determining that the portion of the data is stored on multiple other vehicles in proximity to the first vehicle, transmitting the portion of the data from at least one of the multiple other vehicles to the first vehicle 247F3, determining a size of the data to be transmitted from the computing node to the first vehicle, determining a size of the data stored on the second vehicle to be transmitted to the first vehicle, and calculating a remaining portion of the data to be transmitted by the computing node to the first vehicle 248F3, determining the size of the data further includes assessing the priority level of each file of the data, and transmitting higher priority files first, regardless of a source of the data 249F3.

FIG. 2E4 illustrates a flow diagram 260E4, according to example embodiments. Referring to FIG. 2E4, the solution includes one or more of determining, by a first node, that an event has occurred in a geographic area 244E4, predicting, by the first node, a severity of the event, a duration of the event, and at least one vehicle associated with the event 246E4, pending, by the first node, the prediction to a second node and a time the at least one vehicle will be proximate the second node 248E4, sending by the second node, notifications to other vehicles proximate the second node to maneuver based on the prediction, prior to the time 250E4.

FIG. 2F4 illustrates another flow diagram 270F4, according to example embodiments. Referring to FIG. 2F4, the solution includes one or more of monitoring by the second node that a type of the at least one vehicle at the time is proximate the first node 244F4, sending by the second node to the first node a confirmation that the type of vehicle at the time is proximate the second node 245F4, predicting, by the second node, a time that a type of the at least one vehicle associated with the event will be proximate the first node 246F4, sending, by the second node the prediction to the first node and a time the at least one vehicle will be proximate the first node 247F4, sending by the first node, notifications to other vehicles proximate the first node to maneuver based on the prediction, prior to the time, until the duration of the event has occurred 248F4, the event is visible to the first node and is not visible to the second node 249F4.

FIG. 2E5 illustrates a flow diagram 260E5, according to example embodiments. Referring to FIG. 2E5, the solution includes one or more of determining by a primary computing node that an en route vehicle will be delayed for a time-sensitive event 244E5, coordinating by the primary computing node with a secondary computing node at an event location and the en route vehicle to provide a real-time event experience to at least one device in the en route vehicle 246E5, managing by the primary computing node the real-time event experience between the secondary computing node and the at least one device in the en route vehicle 248E5, transferring by the primary computing node the real-time event experience to the secondary computing node when a device of the at least one device is in proximity to the secondary computing node 250E5, terminating by the secondary computing node the real-time event experience when the at least one device reaches a specific location within the event location 252E5.

FIG. 2F5 illustrates another flow diagram 270F5, according to example embodiments. Referring to FIG. 2F5, the solution includes one or more of calculating an estimated time of arrival for the vehicle to the time-sensitive event based on a distance between GPS coordinates of the vehicle and GPS coordinates time-sensitive event, and a velocity of the vehicle 244F5, receiving data of the real-time event experience by the primary computing node sent from the secondary computing node, and streaming the data from the real-time event experience from the primary computing node to the at least one device located within the en route vehicle 245F5, detecting by the secondary computing node the at least one device within wireless proximity, and establishing a wireless connection from the secondary computing node to the at least one device 246F5, streaming data of the real-time event experience by the secondary computing node to the at least one device 247F5, prompting by the secondary computing node to the at least one device to terminate the real-time event experience data, acknowledging by the at least one device to terminate data of the real-time event experience, and stopping the data from the real-time event experience by the secondary computing node 248F5, identifying, by the primary computing node, one or more preferences of the at least one device to tailor the real-time event experience, and customizing by the primary computing node the real-time event experience based on the identified preferences before streaming to the at least one device 249F5.

Figure 3A:
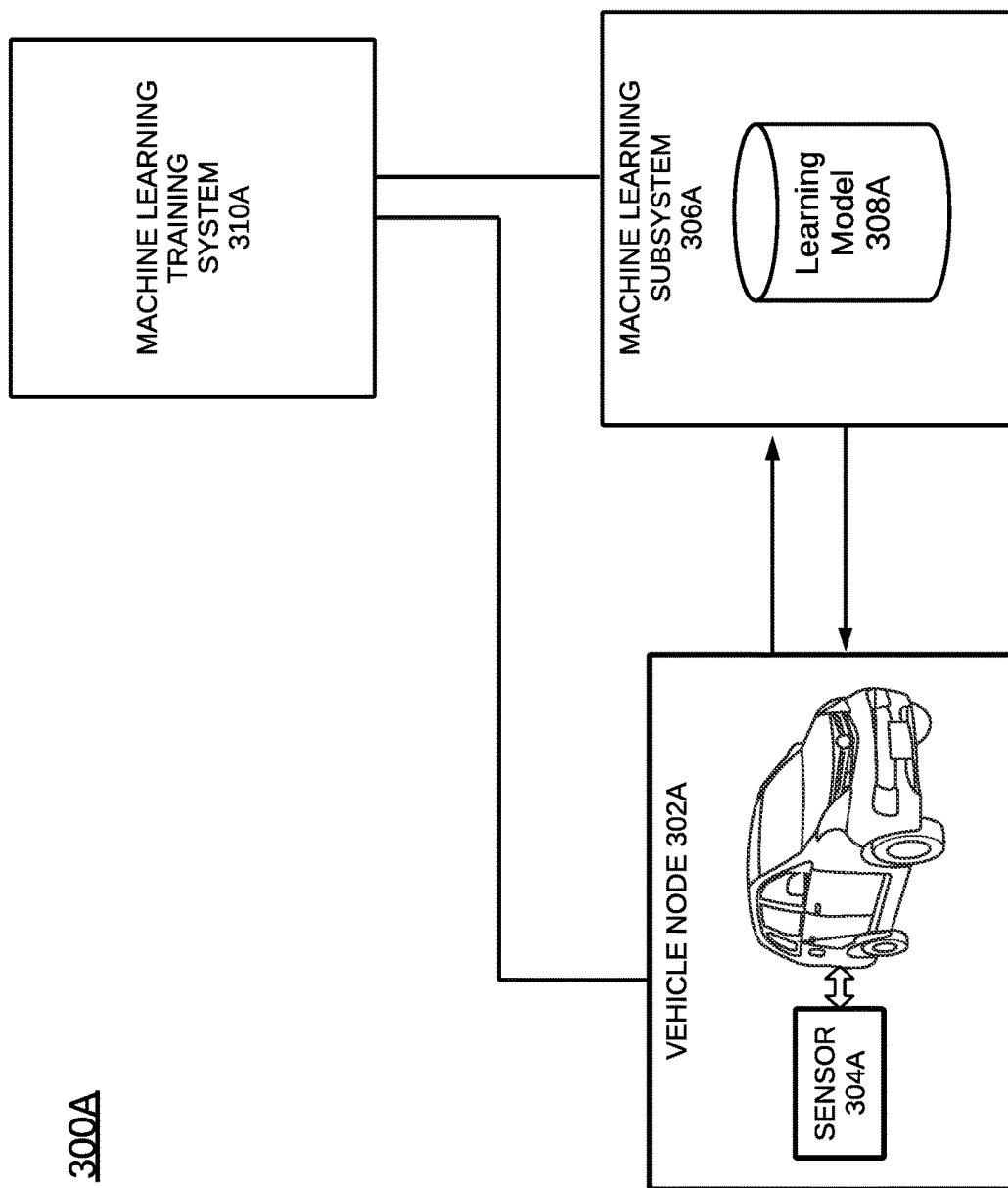
FIG. 3A illustrates a machine learning network diagram, according to example embodiments.

Referring now to FIG. 3A, a diagram depicting a machine learning vehicle network diagram 300A. The machine learning subsystem 306A contains a learning model 308A, which is an artifact created by a machine learning training system 310A that generates predictions by finding patterns in one or more training data sets. In some embodiments, the machine learning subsystem 306A resides in the vehicle node 302A. An artifact is used to describe an output created by a training process, such as a checkpoint, a file, or a model. In other embodiments, the machine learning subsystem 306A resides outside of the vehicle node 302A.

The vehicle 302A sends data from the one or more sensors 304A to the machine learning subsystem 306A. The machine learning subsystem 306A provides the one or more sensor 304A data to the learning model 308A, which returns one or more predictions. The machine learning subsystem 306A sends one or more instructions to the vehicle 302A based on the predictions from the learning model 308A.

In a further embodiment, the vehicle 302A may send the one or more sensor 304A data to the machine learning training system 310A. In yet another example, the machine learning subsystem 306A may send the sensor 304A data to the machine learning subsystem 306A. One or more of the applications, features, steps, solutions, etc., described and/or depicted herein may utilize the machine learning network 400 as described herein.

The example embodiments may communicate with a host platform 320, as shown in the examples of FIGS. 3B-3E. The system 300B may be hosted by or otherwise communicate with the host platform 320 shown in FIGS. 3B-3E. That is, the methods, systems, and processes described herein may interact with the processes and systems that are shown in the examples shown and described in FIGS. 3B-3E.

Figure 3B:
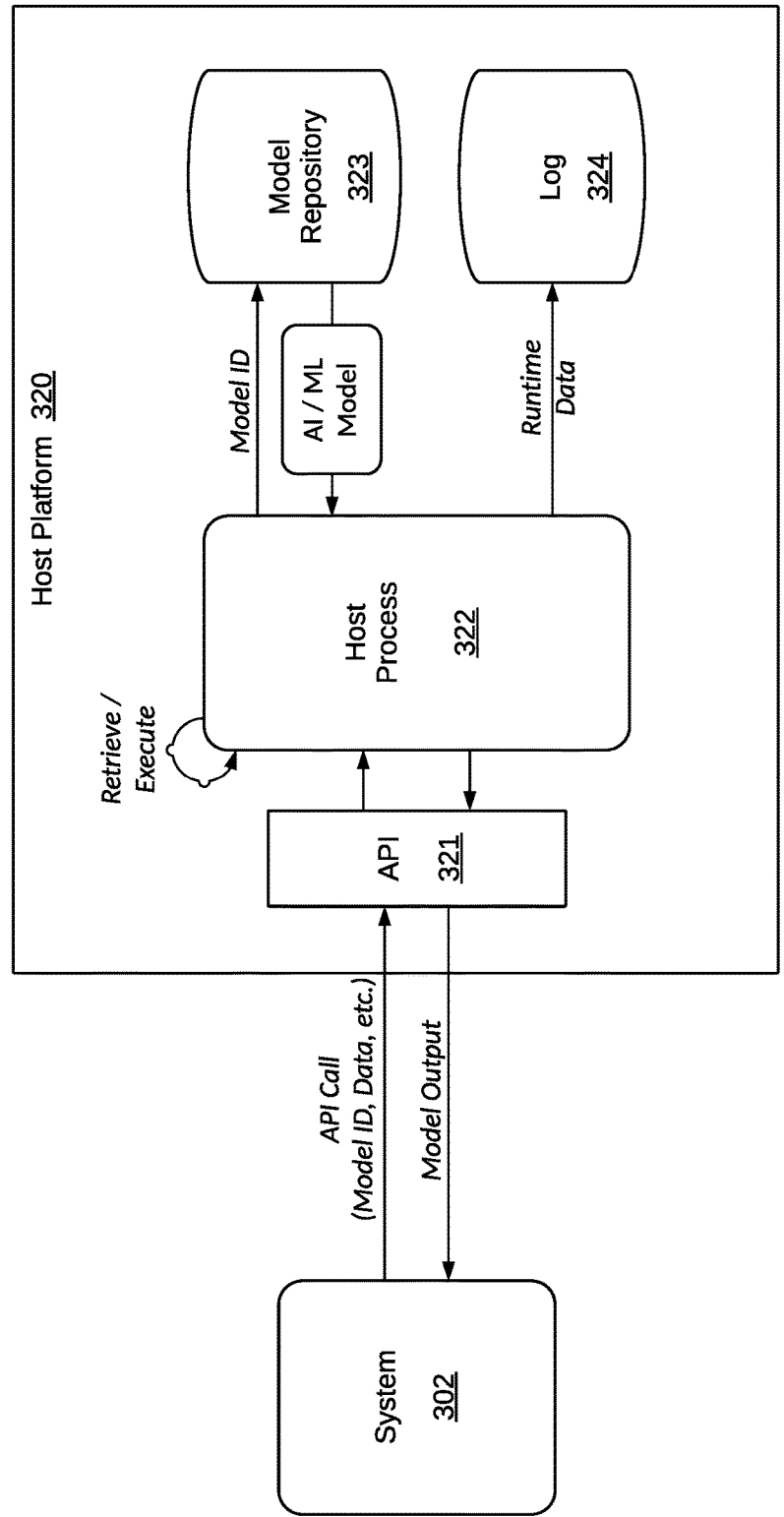
FIG. 3B illustrates another machine learning network diagram, according to example embodiments.

For example, FIG. 3B illustrates a process 300B of executing a machine learning model via the host platform 320. The host platform 320 may host a process 322 within a live runtime environment that is accessible to other software programs, applications, and the like, via a network such as the Internet. Here, the host process 322 may have a URL, endpoint, API, etc., which is publicly available on the Internet.

In this example, the host process 322 may control access to and execution of models that are stored within a model repository 323. For example, the models may include artificial intelligence (AI) models, machine learning models, neural networks, or the like. The system 300B may trigger the execution of a model from the model repository 323 via submission of a call to an application programming interface (API) 321 of the host process 322. The request may include an identifier of a model or models to be executed, a payload of data (e.g., to be input to the model during execution), and the like. The host process 322 may receive the call from the system 300B and retrieve the corresponding model from the model repository 323, deploy the model within a live runtime environment, execute the model on the input data, and return a result of the execution to the system 302. The result of the execution may include an output result from the execution of the model.

In some embodiments, the system 300B may provide feedback from the output provided by the model. For example, a user may input a confirmation that the prediction output by the model is correct or provide a notification that the model is incorrect. This information may be added to the results of execution and stored within a log 324. The log data may include an identifier of the input, an identifier of the output, an identifier of the model used, and feedback from the recipient. This information may be used to subsequently retrain the model, for example, using the model development environment shown in the example of FIG. 3C.

Figure 3C:
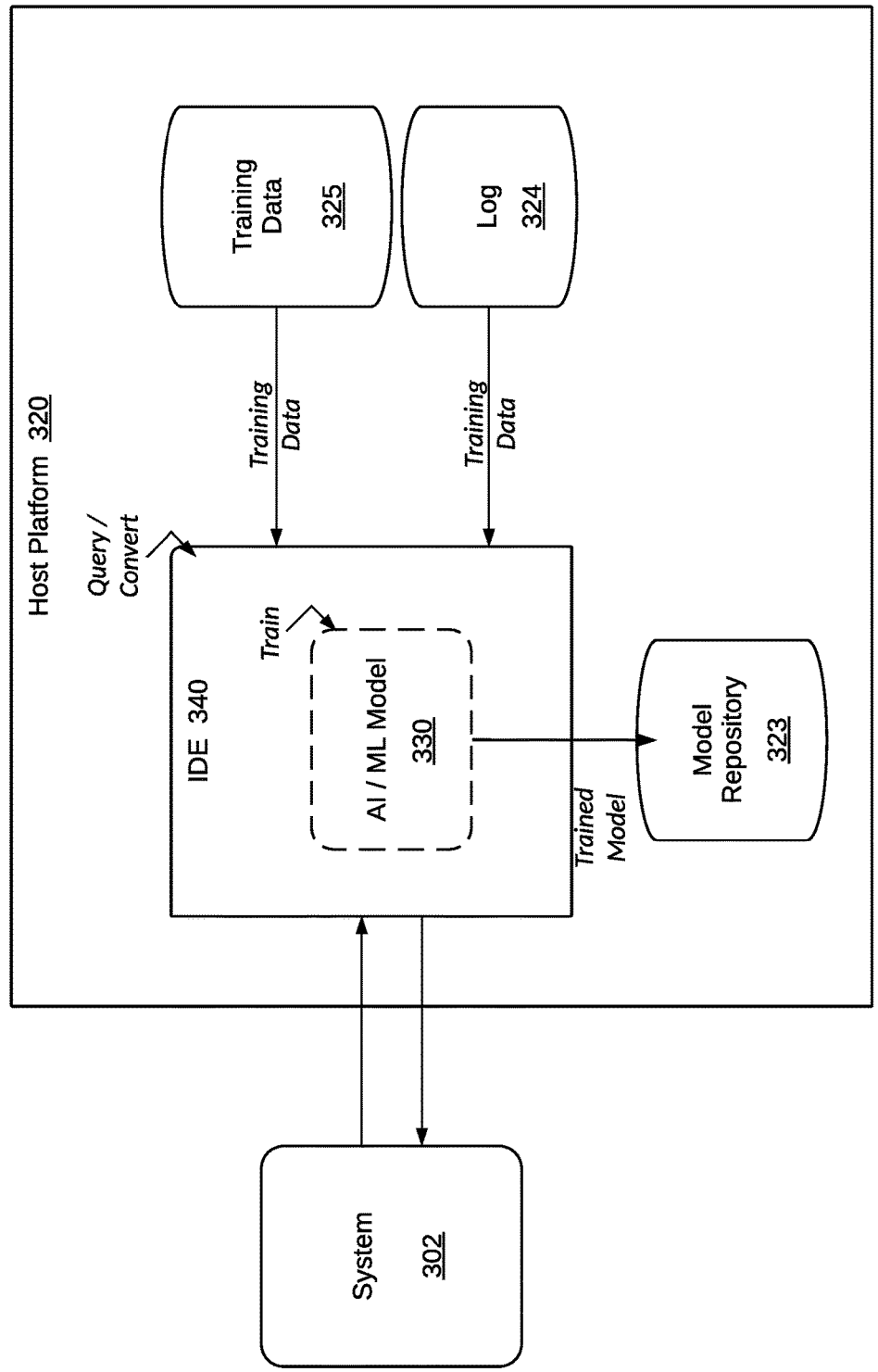
FIG. 3C illustrates yet another machine learning network diagram, according to example embodiments.

FIG. 3C illustrates a process 300C of training a machine learning model 330 according to example embodiments. Referring to FIG. 3C, the host platform 320 may host an integrated development environment (IDE) 340 where machine learning models, AI models, and the like may be developed, trained, retrained, and the like. In this example, the IDE 340 may include a software application with a user interface accessible by the system 302. For example, the IDE 340 may be embodied as a web application that can be accessed by a device at a network address, URL, etc. As another example, the IDE 340 may be locally or remotely installed on a computing device used by a user.

The system 300C may be used to design a model (via a user interface of the IDE), such as a machine learning model, etc. The model can then be executed/trained based on the training data established via the user interface. For example, the user interface may be used to build a new model. The training data for training such a new model may be provided from a training data store 325, which includes training samples from the web, from customers, and the like. Here, the model is executed on the training data via the host platform 320 to generate a result. The execution of the model causes the model to learn based on the input training data. When the model is fully trained, it may be stored within the model repository 323 via the IDE 340, or the like.

As another example, the IDE 340 may be used to retrain an existing model. Here, the training process may use executional results previously generated/output by the model 330 (including any feedback, etc.) to retrain the model 330. For example, predicted outputs that are identified as accurate, best, good, etc., may be distinguished from outputs that are inaccurate, incorrect, bad, etc. One or more of these types of outputs can be identified and used for retraining the model to help the model provide better outputs.

Figure 3D:
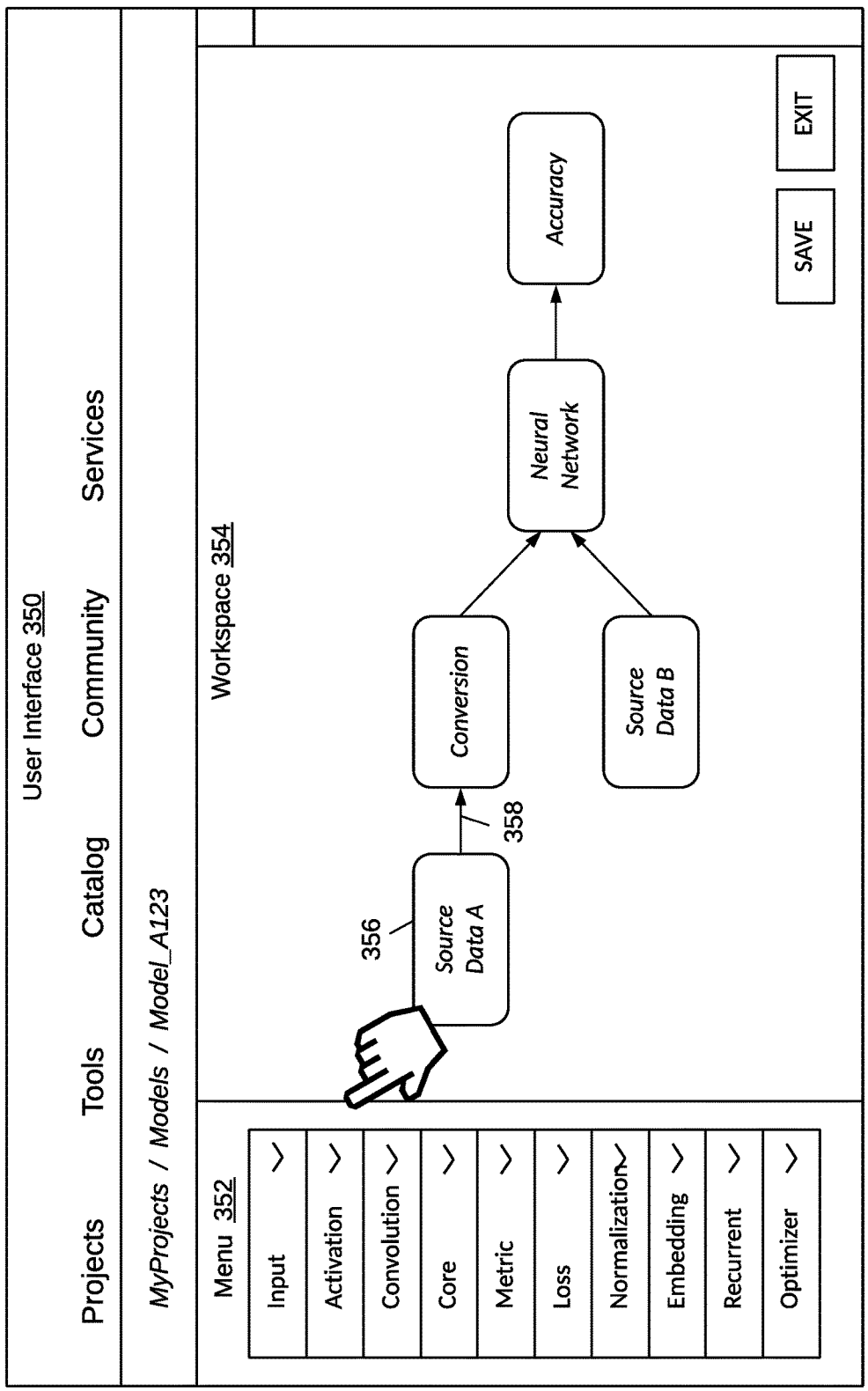
FIG. 3D illustrates a further machine learning network diagram, according to example embodiments.

FIG. 3D illustrates a process 300D of designing a new machine learning model via a user interface of the system 300B according to example embodiments. As an example, the system 300B may be output as part of the software application 330, which interacts with the IDE 340 shown in FIG. 3C, however, embodiments are not limited thereto. Referring to FIG. 3D, a user can use an input mechanism from a menu 352 of a user interface 350 to add pieces/components to a model being developed within a workspace 354 of the user interface 350.

In the example of FIG. 3D, the menu 352 includes a plurality of graphical user interface (GUI) menu options which can be selected to drill down into additional components that can be added to the model design shown in the workspace 354. Here, the GUI menu includes options for adding features such as neural networks, machine learning models, AI models, data sources, conversion processes (e.g., vectorization, encoding, etc.), analytics, etc. The user can continue to add features to the model and connect them using edges or other means to create a flow within the workspace 354. For example, the user may add a node 356 to a diagram of a new model within the workspace 354. For example, the user may connect the node 356 to another node in the diagram via an edge 358, creating a dependency within the diagram. When the user is done, the user can save the model for subsequent training/testing.

In another example, the name of the object can be identified from a web page or a user interface 350 where the object is visible within a browser or the workspace 354 on the user device. A pop-up within the browser or the workspace 354 can be overlayed where the object is visible, which includes an option to navigate to the identified web page corresponding to the alternative object via a rule set.

Figure 3E:
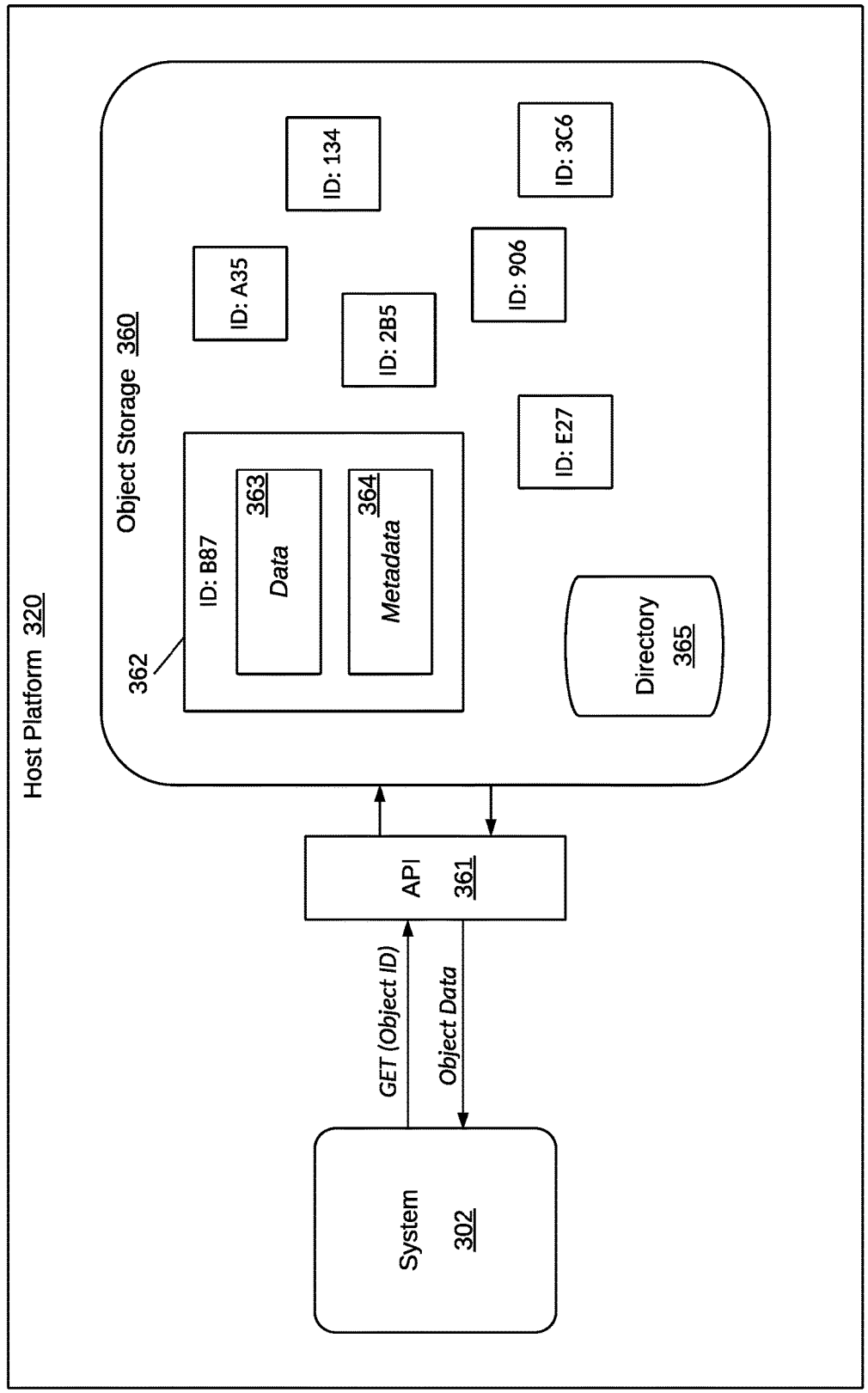
FIG. 3E illustrates a machine learning network diagram, according to example embodiments.

FIG. 3E illustrates a process 300E of accessing an object 362 from an object storage 360 of the host platform 320 according to example embodiments. For example, the object storage 360 may store data that is used by the AI models and machine learning (ML) models 330, training data, expected outputs for testing, training results, and the like. The object storage 360 may also store any other kind of data. Each object may include a unique identifier, a data section 363, and a metadata section 364, which provides a descriptive context associated with the data, including data that can later be extracted for purposes of machine learning. The unique identifier may uniquely identify an object with respect to all other objects in the object storage 360. The data section 363 may include unstructured data such as web pages, digital content, images, audio, text, and the like.

Instead of breaking files into blocks stored on disks in a file system, the object storage 360 handles objects as discrete units of data stored in a structurally flat data environment. Here, the object storage may not use folders, directories, or complex hierarchies. Instead, each object may be a simple, self-contained repository that includes the data, the metadata, and the unique identifier that a client application 300C can use to locate and access it. In this case, the metadata is more descriptive than a file-based approach. The metadata can be customized with additional context that can later be extracted and leveraged for other purposes, such as data analytics.

The objects that are stored in the object storage 360 may be accessed via an application programming interface (API) 361. The API 361 may be a Hypertext Transfer Protocol (HTTP)-based RESTful API (also known as a RESTful Web service). The API 361 can be used by the client application 300C to query an object's metadata to locate the desired object (data) via the Internet from anywhere on any device. The API 361 may use HTTP commands such as "PUT" or "POST" to upload an object, "GET" to retrieve an object, "DELETE" to remove an object, and the like.

The object storage 360 may provide a directory 365 that uses the metadata of the objects to locate appropriate data files. The directory 365 may contain descriptive information about each object stored in the object storage 360, such as a name, a unique identifier, a creation timestamp, a collection name, etc. To query the object within the object storage 360, the client application 300C may submit a command, such as an HTTP command, with an identifier of the object 362, a payload, etc. The object storage 360 can store the actions and results described herein, including associating two or more lists of ranked assets with one another based on variables used by the two or more lists of ranked assets that have a correlation above a predetermined threshold.

Figure 4A:
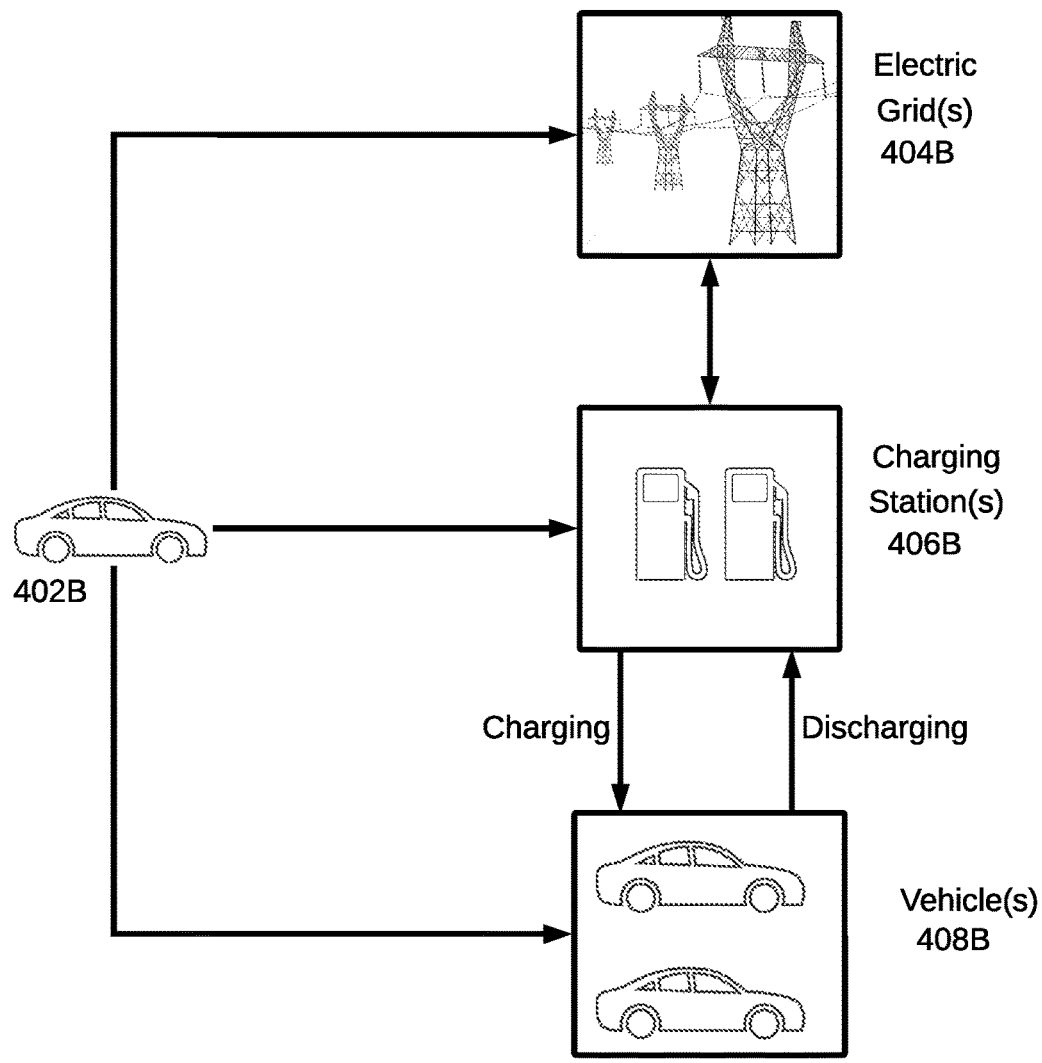
FIG. 4A illustrates a diagram depicting electrification of one or more elements, according to example embodiments.

FIG. 4A illustrates a diagram 400A depicting the electrification of one or more elements. In one example, a vehicle 402B may provide power stored in its batteries to one or more elements, including other vehicle(s) 408B, charging station(s) 406B, and electric grid(s) 404B. The electric grid(s) 404B is/are coupled to one or more of the charging stations 406B, which may be coupled to one or more of the vehicles 408B. This configuration allows the distribution of electricity/power received from the vehicle 402B. The vehicle 402B may also interact with the other vehicle(s) 408B, such as via Vehicle to Vehicle (V2V) technology, communication over cellular, WiFi, and the like. The vehicle 402B may also interact wirelessly and/or wired with other vehicles 408B, the charging station(s) 406B and/or with the electric grid(s) 404B. In one example, the vehicle 402B is routed (or routes itself) in a safe and efficient manner to the electric grid(s) 404B, the charging station(s) 406B, or the other vehicle(s) 408B. Using one or more embodiments of the instant solution, the vehicle 402B can provide energy to one or more of the elements depicted herein in various advantageous ways as described and/or depicted herein.

Further, the safety and efficiency of the vehicle may be increased, and the environment may be positively affected as described and/or depicted herein.

The term 'energy', 'electricity', 'power', and the like may be used to denote any form of energy received, stored, used, shared, and/or lost by the vehicles(s). The energy may be referred to in conjunction with a voltage source and/or a current supply of charge provided from an entity to the vehicle(s) during a charge/use operation. Energy may also be in the form of fossil fuels (for example, for use with a hybrid vehicle) or via alternative power sources, including but not limited to lithium-based, nickel-based, hydrogen fuel cells, atomic/nuclear energy, fusion-based energy sources, and energy generated on-the-fly during an energy sharing and/or usage operation for increasing or decreasing one or more vehicles energy levels at a given time.

In one example, the charging station 406B manages the amount of energy transferred from the vehicle 402B such that there is sufficient charge remaining in the vehicle 402B to arrive at a destination. In one example, a wireless connection is used to wirelessly direct an amount of energy transfer between vehicles 408B, wherein the vehicles may both be in motion. In one embodiment, wireless charging may occur via a fixed charger and batteries of the vehicle in alignment with one another (such as a charging mat in a garage or parking space). In one example, an idle vehicle, such as a vehicle 402B (which may be autonomous) is directed to provide an amount of energy to a charging station 406B and return to the original location (for example, its original location or a different destination). In one example, a mobile energy storage unit (not shown) is used to collect surplus energy from at least one other vehicle 408B and transfer the stored surplus energy at a charging station 406B. In one example, factors determine an amount of energy to transfer to a charging station 406B, such as distance, time, as well as traffic conditions, road conditions, environmental/weather conditions, the vehicle's condition (weight, etc.), an occupant(s) schedule while utilizing the vehicle, a prospective occupant(s) schedule waiting for the vehicle, etc. In one example, the vehicle(s) 408B, the charging station(s) 406B and/or the electric grid(s) 404B can provide energy to the vehicle 402B.

In one embodiment, a location such as a building, a residence, or the like (not depicted), communicably coupled to one or more of the electric grid 404B, the vehicle 402B, and/or the charging station(s) 406B. The rate of electric flow to one or more of the location, the vehicle 402B, the other vehicle(s) 408B is modified, depending on external conditions, such as weather. For example, when the external temperature is extremely hot or extremely cold, raising the chance for an outage of electricity, the flow of electricity to a connected vehicle 402B/308B is slowed to help minimize the chance for an outage.

In one embodiment, vehicles 402B and 408B may be utilized as bidirectional vehicles. Bidirectional vehicles are those that may serve as mobile microgrids that can assist in the supplying of electrical power to the grid 404B and/or reduce the power consumption when the grid is stressed. Bidirectional vehicles incorporate bidirectional charging, which in addition to receiving a charge to the vehicle, the vehicle can take energy from the vehicle and "push" the energy back into the grid 404B, otherwise referred to as "V2G". In bidirectional charging, the electricity flows both ways, to the vehicle and from the vehicle. When a vehicle is charged, alternating current (AC) electricity from the grid 404B is converted to direct current (DC). This may be performed by one or more of the vehicle's own converter or a converter on the charger 406B. The energy stored in the vehicle's batteries may be sent in an opposite direction back to the grid. The energy is converted from DC to AC through a converter usually located in the charger 406B, otherwise referred to as a bidirectional charger. Further, the instant solution as described and depicted with respect to FIG. 3B can be utilized in this and other networks and/or systems.

Figure 4B:
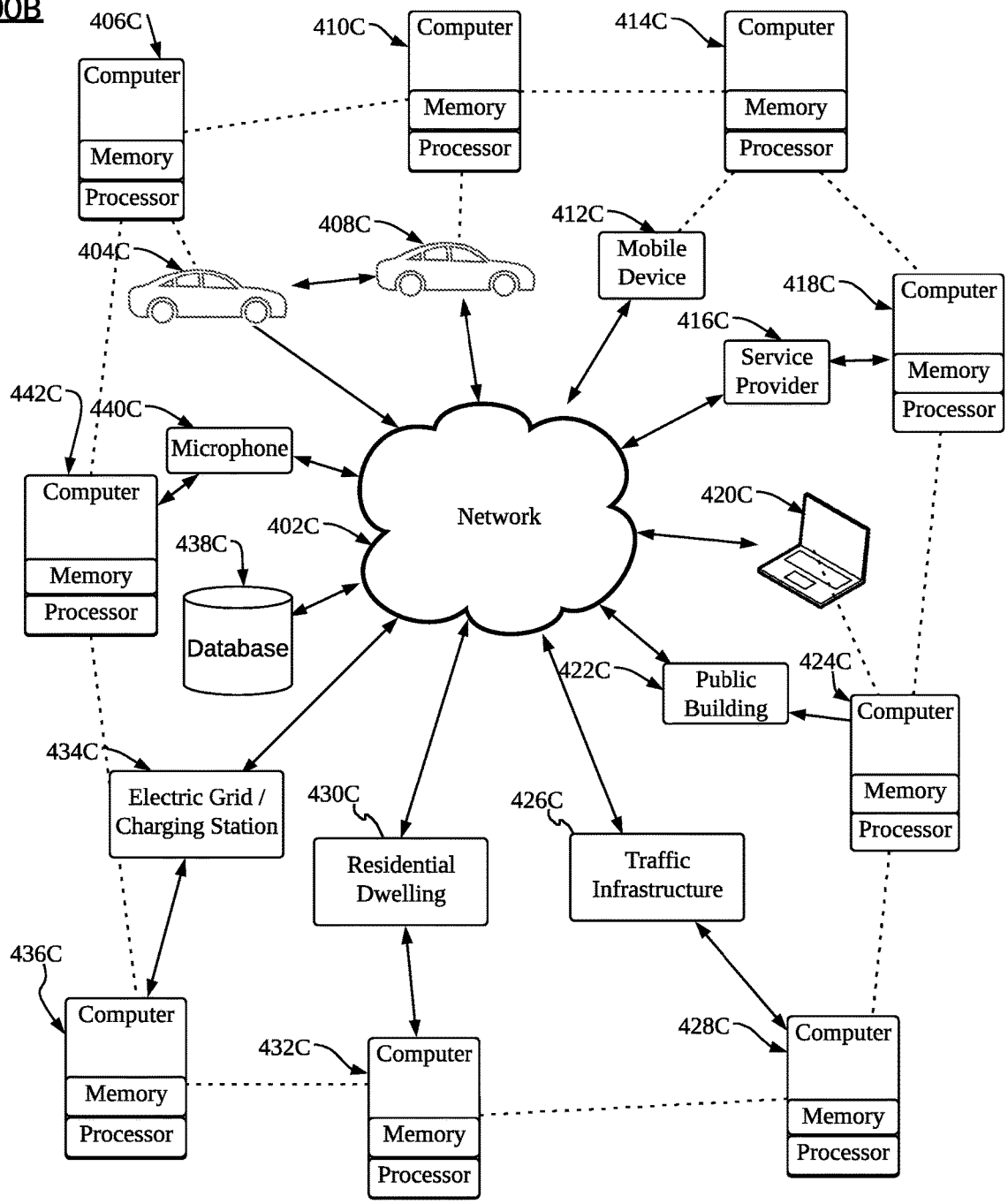
FIG. 4B illustrates a diagram depicting interconnections between different elements, according to example embodiments.

FIG. 4B is a diagram showing interconnections between different elements 400B. The instant solution may be stored and/or executed entirely or partially on and/or by one or more computing devices 414C, 418C, 424C, 428C, 432C, 436C, 406C, 442C, 440C and 410C associated with various entities, all communicably coupled and in communication with a network 402C. A database 440C is communicably coupled to the network and allows for the storage and retrieval of data. In one example, the database is an immutable ledger. One or more of the various entities may be a vehicle 404C, one or more service provider 416C, one or more public buildings 422C, one or more traffic infrastructure 426C, one or more residential dwellings 430C, an electric grid/charging station 434C, a microphone 440C, and/or another vehicle 408C. Other entities and/or devices, such as one or more private users using a smartphone 412C, a laptop 420C, an augmented reality (AR) device, a virtual reality (VR) device, and/or any wearable device may also interwork with the instant solution. The smartphone 412C, laptop 420C, the microphone 440C, and other devices may be connected to one or more of the connected computing devices 414C, 418C, 424C, 428C, 432C, 436C, 406C, 442C, 440C, and 410C. The one or more public buildings 422C may include various agencies. The one or more public buildings 422C may utilize a computing device 424C. The one or more service provider 416C may include a dealership, a tow truck service, a collision center, or other repair shop. The one or more service provider 416C may utilize a computing apparatus 418C. These various computer devices may be directly and/or communicably coupled to one another, such as via wired networks, wireless networks, blockchain networks, and the like. The microphone 440C may be utilized as a virtual assistant, in one example. In one example, the one or more traffic infrastructure 426C may include one or more traffic signals, one or more sensors including one or more cameras, vehicle speed sensors or traffic sensors, and/or other traffic infrastructure. The one or more traffic infrastructure 426C may utilize a computing device 428C.

In one embodiment, anytime an electrical charge is given or received to/from a charging station and/or an electrical grid, the entities that allow that to occur are one or more of a vehicle, a charging station, a server, and a network communicably coupled to the vehicle, the charging station, and the electrical grid.

In one example, a vehicle 408C/404C can transport a person, an object, a permanently or temporarily affixed apparatus, and the like. In one example, the vehicle 408C may communicate with vehicle 404C via V2V communication through the computers associated with each vehicle 406C and 410C and may be referred to as a car, vehicle, automobile, and the like. The vehicle 404C/408C may be a self-propelled wheeled conveyance, such as a car, a sports utility vehicle, a truck, a bus, a van, or other motor or battery-driven or fuel cell-driven vehicle. For example, vehicle 404C/408C may be an electric vehicle, a hybrid vehicle, a hydrogen fuel cell vehicle, a plug-in hybrid vehicle, or any other type of vehicle with a fuel cell stack, a motor, and/or a generator. Other examples of vehicles include bicycles, scooters, trains, planes, boats, and any other form of conveyance that is capable of transportation. The vehicle 404C/408C may be semi-autonomous or autonomous. For example, vehicle 404C/408C may be self-maneuvering and navigate without human input. An autonomous vehicle may have and use one or more sensors and/or a navigation unit to drive autonomously. All data described or depicted herein can be stored, analyzed, processed and/or forwarded by one or more of the elements in FIG. 4B.

Figure 4C:
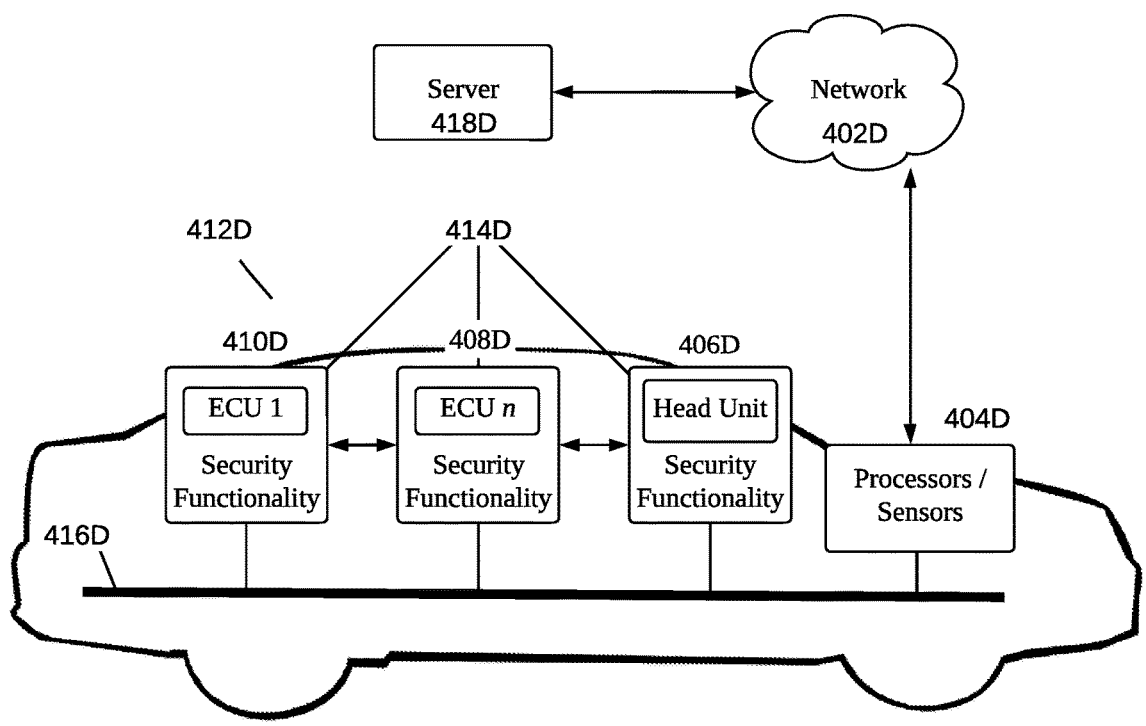
FIG. 4C illustrates a further diagram depicting interconnections between different elements, according to example embodiments.

FIG. 4C is another block diagram showing interconnections between different elements in one example 400C. A vehicle 412D is presented and includes ECUs 410D, 408D, and a Head Unit (otherwise known as an Infotainment System) 406D. An Electrical Control Unit (ECU) is an embedded system in automotive electronics controlling one or more of the electrical systems or subsystems in a vehicle. ECUs may include but are not limited to the management of a vehicle's engine, brake system, gearbox system, door locks, dashboard, airbag system, infotainment system, electronic differential, and active suspension. ECUs are connected to the vehicle's Controller Area Network (CAN) bus 416D. The ECUs may also communicate with a vehicle computer 404D via the CAN bus 416D. The vehicle's processors/sensors (such as the vehicle computer) 404D can communicate with external elements, such as a server 418D via a network 402D (such as the Internet). Each ECU 410D, 408D, and Head Unit 406D may contain its own security policy. The security policy defines permissible processes that can be executed in the proper context. In one example, the security policy may be partially or entirely provided in the vehicle computer 404D.

ECUs 410D, 408D, and Head Unit 406D may each include a custom security functionality element 414D defining authorized processes and contexts within which those processes are permitted to run. Context-based authorization to determine validity if a process can be executed allows ECUs to maintain secure operation and prevent unauthorized access from elements such as the vehicle's Controller Area Network (CAN Bus). When an ECU encounters a process that is unauthorized, that ECU can block the process from operating. Automotive ECUs can use different contexts to determine whether a process is operating within its permitted bounds, such as proximity contexts such as nearby objects, distance to approaching objects, speed, and trajectory relative to other moving objects, and operational contexts such as an indication of whether the vehicle is moving or parked, the vehicle's current speed, the transmission state, user-related contexts such as devices connected to the transport via wireless protocols, use of the infotainment, cruise control, parking assist, driving assist, location-based contexts, and/or other contexts.

Figure 4D:
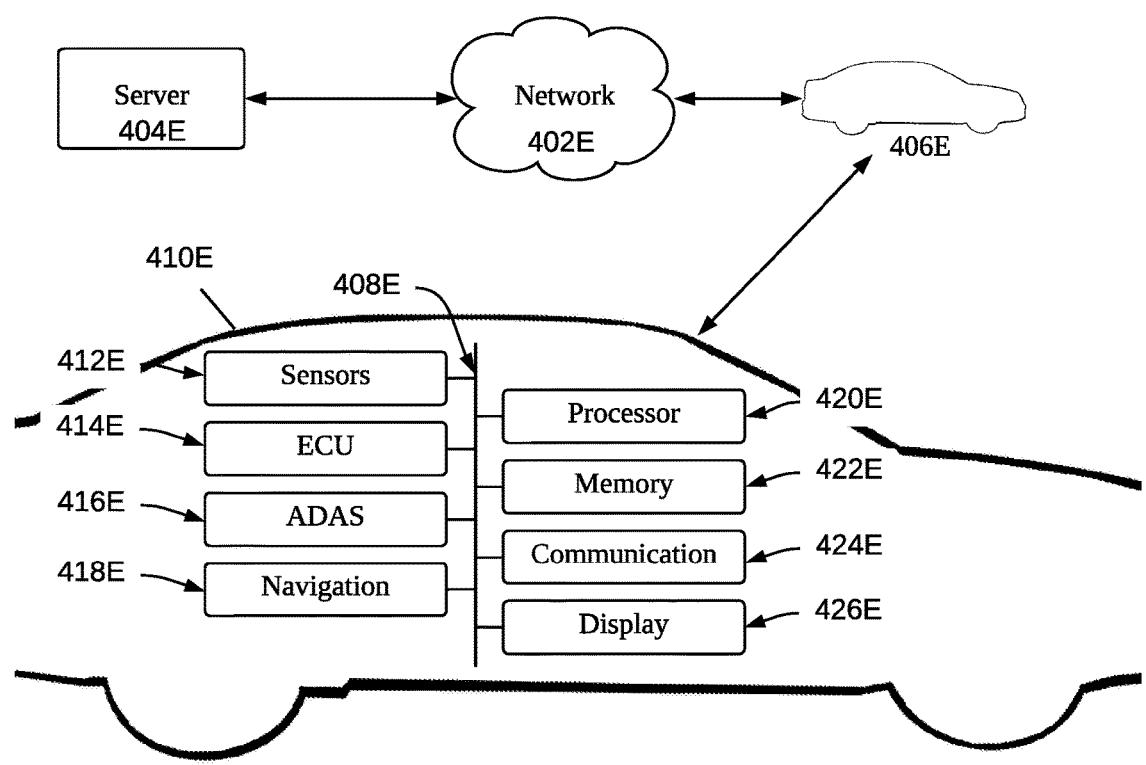
FIG. 4D illustrates yet a further diagram depicting interconnections between elements, according to example embodiments.

Referring to FIG. 4D, an operating environment 400D for a connected vehicle, is illustrated according to some embodiments. As depicted, the vehicle 410E includes a Controller Area Network (CAN) bus 408E connecting elements 412E-426E of the vehicle. Other elements may be connected to the CAN bus and are not depicted herein. The depicted elements connected to the CAN bus include a sensor set 412E, Electronic Control Units 414E, autonomous features or Advanced Driver Assistance Systems (ADAS) 416E, and the navigation system 418E. In some embodiments, the vehicle 410E includes a processor 420E, a memory 422E, a communication unit 424E, and an electronic display 426E.

The processor 420E includes an arithmetic logic unit, a microprocessor, a general-purpose controller, and/or a similar processor array to perform computations and provide electronic display signals to a display unit 426E. The processor 420E processes data signals and may include various computing architectures, including a complex instruction set computer (CISC) architecture, a reduced instruction set computer (RISC) architecture, or an architecture implementing a combination of instruction sets. The vehicle 410E may include one or more processors 420E. Other processors, operating systems, sensors, displays, and physical configurations that are communicably coupled to one another (not depicted) may be used with the instant solution.

Memory 422E is a non-transitory memory storing instructions or data that may be accessed and executed by the processor 420E. The instructions and/or data may include code to perform the techniques described herein. The memory 422E may be a dynamic random-access memory (DRAM) device, a static random-access memory (SRAM) device, flash memory, or another memory device. In some embodiments, the memory 422E also may include non-volatile memory or a similar permanent storage device and media, which may include a hard disk drive, a floppy disk drive, a CD-ROM device, a DVD-ROM device, a DVD-RAM device, a DVD-RW device, a flash memory device, or some other mass storage device for storing information on a permanent basis. A portion of the memory 422E may be reserved for use as a buffer or virtual random-access memory (virtual RAM). The vehicle 410E may include one or more memories 422E without deviating from the current solution.

The memory 422E of the vehicle 410E may store one or more of the following types of data: navigation route data 418E, and autonomous features data 416E. In some embodiments, the memory 422E stores data that may be necessary for the navigation application 418E to provide the functions.

The navigation system 418E may describe at least one navigation route including a start point and an endpoint. In some embodiments, the navigation system 418E of the vehicle 410E receives a request from a user for navigation routes wherein the request includes a starting point and an ending point. The navigation system 418E may query a real-time data server 404E (via a network 402E), such as a server that provides driving directions, for navigation route data corresponding to navigation routes, including the start point and the endpoint. The real-time data server 404E transmits the navigation route data to the vehicle 410E via a wireless network 402E, and the communication system 424E stores the navigation data 418E in the memory 422E of the vehicle 410E.

The ECU 414E controls the operation of many of the systems of the vehicle 410E, including the ADAS systems 416E. The ECU 414E may, responsive to instructions received from the navigation system 418E, deactivate any unsafe and/or unselected autonomous features for the duration of a journey controlled by the ADAS systems 416E. In this way, the navigation system 418E may control whether ADAS systems 416E are activated or enabled so that they may be activated for a given navigation route.

The sensor set 412E may include any sensors in the vehicle 410E generating sensor data. For example, the sensor set 412E may include short-range sensors and long-range sensors. In some embodiments, the sensor set 412E of the vehicle 410E may include one or more of the following vehicle sensors: a camera, a Lidar sensor, an ultrasonic sensor, an automobile engine sensor, a radar sensor, a laser altimeter, a manifold absolute pressure sensor, an infrared detector, a motion detector, a thermostat, a sound detector, a carbon monoxide sensor, a carbon dioxide sensor, an oxygen sensor, a mass airflow sensor, an engine coolant temperature sensor, a throttle position sensor, a crankshaft position sensor, a valve timer, an air-fuel ratio meter, a blind spot meter, a curb feeler, a defect detector, a Hall effect sensor, a parking sensor, a radar gun, a speedometer, a speed sensor, a tire-pressure monitoring sensor, a torque sensor, a transmission fluid temperature sensor, a turbine speed sensor (TSS), a variable reluctance sensor, a vehicle speed sensor (VSS), a water sensor, a wheel speed sensor, a GPS sensor, a mapping functionality, and any other type of automotive sensor. The navigation system 418E may store the sensor data in the memory 422E.

The communication unit 424E transmits and receives data to and from the network 420E or to another communication channel. In some embodiments, the communication unit 424E may include a DSRC transceiver, a DSRC receiver, and other hardware or software necessary to make the vehicle 410E a DSRC-equipped device.

The vehicle 410E may interact with other vehicles 406E via V2V technology. V2V communication includes sensing radar information corresponding to relative distances to external objects, receiving GPS information of the vehicles, setting areas as areas where the other vehicles 406E are located based on the sensed radar information, calculating probabilities that the GPS information of the object vehicles will be located at the set areas, and identifying vehicles and/or objects corresponding to the radar information and the GPS information of the object vehicles based on the calculated probabilities, in one example.

For a vehicle to be adequately secured, the vehicle must be protected from unauthorized physical access as well as unauthorized remote access (e.g., cyber-threats). To prevent unauthorized physical access, a vehicle is equipped with a secure access system such as a keyless entry in one example. Meanwhile, security protocols are added to a vehicle's computers and computer networks to facilitate secure remote communications to and from the vehicle in one example.

Electronic Control Units (ECUs) are nodes within a vehicle that control tasks such as activating the windshield wipers to tasks such as an anti-lock brake system. ECUs are often connected to one another through the vehicle's central network, which may be referred to as a controller area network (CAN). State-of-the-art features such as autonomous driving are strongly reliant on implementing new, complex ECUs such as advanced driver-assistance systems (ADAS), sensors, and the like. While these new technologies have helped improve the safety and driving experience of a vehicle, they have also increased the number of externally communicating units inside of the vehicle, making them more vulnerable to attack. Below are some examples of protecting the vehicle from physical intrusion and remote intrusion.

In one embodiment, a CAN includes a CAN bus with a high and low terminal and a plurality of electronic control units (ECUs), which are connected to the CAN bus via wired connections. The CAN bus is designed to allow microcontrollers and devices to communicate with each other in an application without a host computer. The CAN bus implements a message-based protocol (i.e., ISO 11898 standards) that allows ECUs to send commands to one another at a root level. Meanwhile, the ECUs represent controllers for controlling electrical systems or subsystems within the vehicle. Examples of the electrical systems include power steering, anti-lock brakes, air-conditioning, tire pressure monitoring, cruise control, and many other features.

In this example, the ECU includes a transceiver and a microcontroller. The transceiver may be used to transmit and receive messages to and from the CAN bus. For example, the transceiver may convert the data from the microcontroller into a format of the CAN bus and convert data from the CAN bus into a format for the microcontroller. Meanwhile, the microcontroller interprets the messages and decide what messages to send using ECU software installed therein in one example.

To protect the CAN from cyber threats, various security protocols may be implemented. For example, sub-networks (e.g., sub-networks A and B, etc.) may be used to divide the CAN into smaller sub-CANs and limit an attacker's capabilities to access the vehicle remotely. In one embodiment, a firewall (or gateway, etc.) may be added to block messages from crossing the CAN bus across sub-networks. If an attacker gains access to one sub-network, the attacker will not have access to the entire network. To make sub-networks even more secure, the most critical ECUs are not placed on the same sub-network, in one example.

In addition to protecting a vehicle's internal network, vehicles may also be protected when communicating with external networks such as the Internet. One of the benefits of having a vehicle connection to a data source such as the Internet is that information from the vehicle can be sent through a network to remote locations for analysis. Examples of vehicle information include GPS, onboard diagnostics, tire pressure, and the like. These communication systems are often referred to as telematics because they involve the combination of telecommunications and informatics. Further, the instant solution as described and depicted can be utilized in this and other networks and/or systems, including those that are described and depicted herein.

Figure 4E:
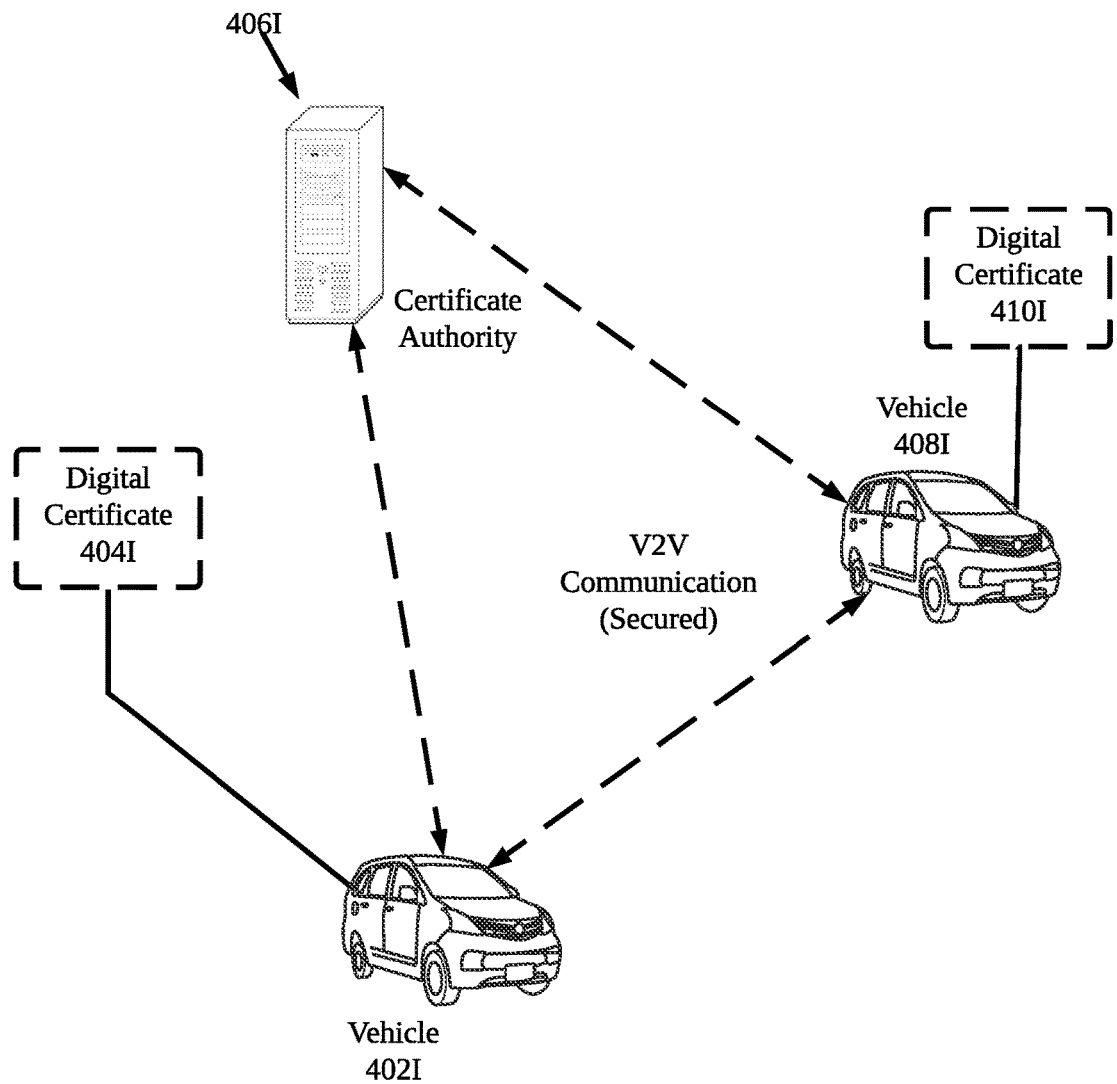
FIG. 4E illustrates yet a further diagram depicting an example of vehicles performing secured V2V communications using security certificates, according to example embodiments.

FIG. 4E illustrates an example 400E of vehicles 402I and 408I performing secured V2V communications using security certificates, according to example embodiments. Referring to FIG. 4E, the vehicles 402I and 408I may communicate via V2V communications over a short-range network, a cellular network, or the like. Before sending messages, the vehicles 402I and 408I may sign the messages using a respective public key certificate. For example, the vehicle 402I may sign a V2V message using a public key certificate 404I. Likewise, the vehicle 408I may sign a V2V message using a public key certificate 410I. The public key certificates 404I and 410I are associated with the vehicles 402I and 408I, respectively, in one example.

Upon receiving the communications from each other, the vehicles may verify the signatures with a certificate authority 406I or the like. For example, the vehicle 408I may verify with the certificate authority 406I that the public key certificate 404I used by vehicle 402I to sign a V2V communication is authentic. If the vehicle 408I successfully verifies the public key certificate 404I, the vehicle knows that the data is from a legitimate source. Likewise, the vehicle 402I may verify with the certificate authority 406I that the public key certificate 410I used by the vehicle 408I to sign a V2V communication is authentic. Further, the instant solution as described and depicted with respect to FIG. 4E can be utilized in this and other networks and/or systems including those that are described and depicted herein.

In some embodiments, a computer may include security processor. In particular, the security processor may perform authorization, authentication, cryptography (e.g., encryption), and the like, for data transmissions that are sent between ECUs and other devices on a CAN bus of a vehicle, and also data messages that are transmitted between different vehicles. The security processor may include an authorization module, an authentication module, and a cryptography module. The security processor may be implemented within the vehicle's computer and may communicate with other vehicle elements, for example, the ECUs/CAN network, wired and wireless devices such as wireless network interfaces, input ports, and the like. The security processor may ensure that data frames (e.g., CAN frames, etc.) that are transmitted internally within a vehicle (e.g., via the ECUs/CAN network) are secure. Likewise, the security processor can ensure that messages transmitted between different vehicles and devices attached or connected via a wire to the vehicle's computer are also secured.

For example, the authorization module may store passwords, usernames, PIN codes, biometric scans, and the like for different vehicle users. The authorization module may determine whether a user (or technician) has permission to access certain settings such as a vehicle's computer. In some embodiments, the authorization module may communicate with a network interface to download any necessary authorization information from an external server. When a user desires to make changes to the vehicle settings or modify technical details of the vehicle via a console or GUI within the vehicle or via an attached/connected device, the authorization module may require the user to verify themselves in some way before such settings are changed. For example, the authorization module may require a username, a password, a PIN code, a biometric scan, a predefined line drawing or gesture, and the like. In response, the authorization module may determine whether the user has the necessary permissions (access, etc.) being requested.

The authentication module may be used to authenticate internal communications between ECUs on the CAN network of the vehicle. As an example, the authentication module 308J may provide information for authenticating communications between the ECUS. As an example, the authentication module may transmit a bit signature algorithm to the ECUs of the CAN network. The ECUs may use the bit signature algorithm to insert authentication bits into the CAN fields of the CAN frame. All ECUs on the CAN network typically receive each CAN frame. The bit signature algorithm may dynamically change the position, amount, etc., of authentication bits each time a new CAN frame is generated by one of the ECUs. The authentication module may also provide a list of ECUs that are exempt (safe list) and that do not need to use the authentication bits. The authentication module may communicate with a remote server to retrieve updates to the bit signature algorithm and the like.

The encryption module may store asymmetric key pairs to be used by the vehicle to communicate with other external user devices and vehicles. For example, the encryption module may provide a private key to be used by the vehicle to encrypt/decrypt communications, while the corresponding public key may be provided to other user devices and vehicles to enable the other devices to decrypt/encrypt the communications. The encryption module may communicate with a remote server to receive new keys, updates to keys, keys of new vehicles, users, etc., and the like. The encryption module may also transmit any updates to a local private/public key pair to the remote server.

Figure 5A:
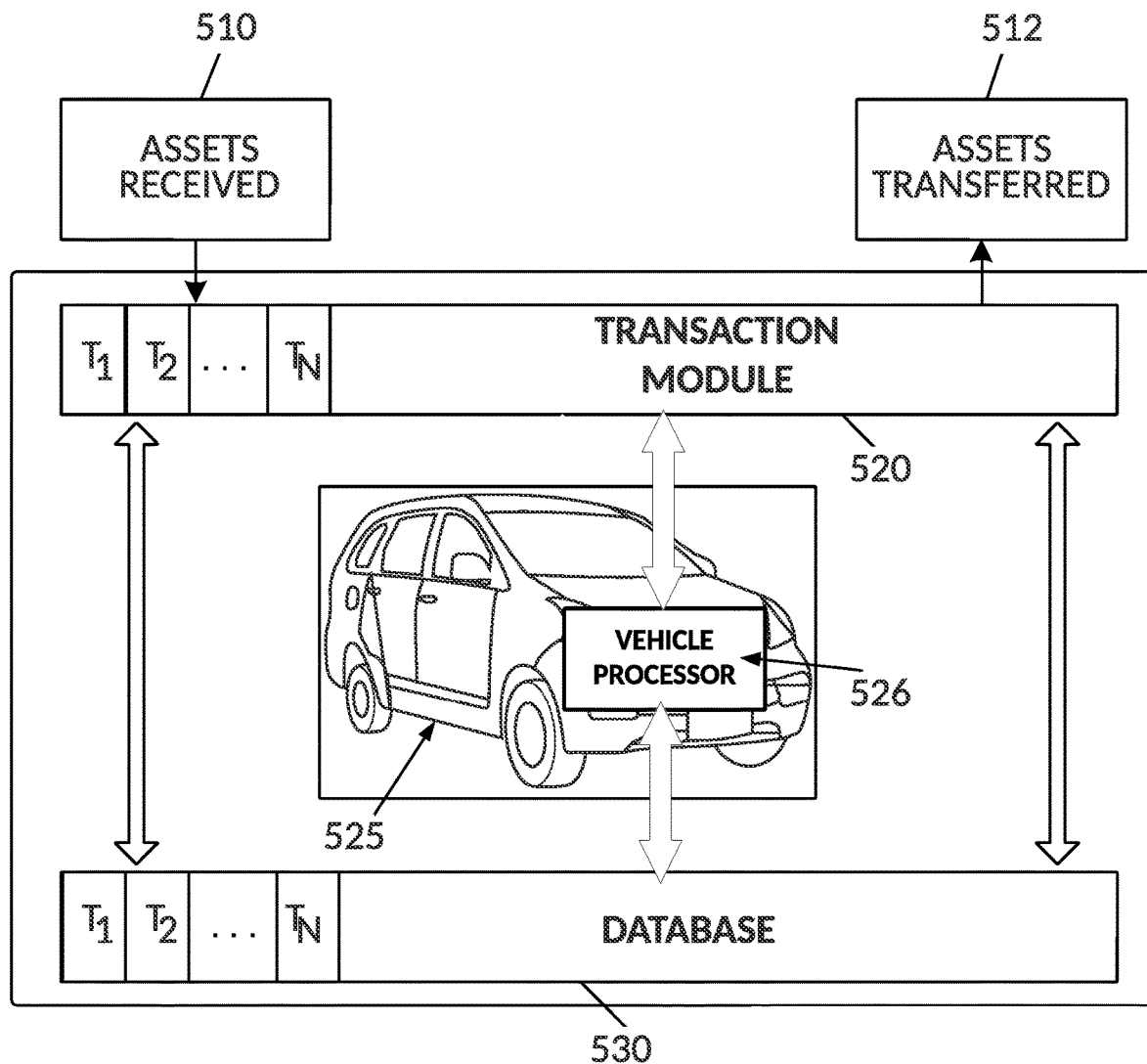
FIG. 5A illustrates an example vehicle configuration for managing database transactions associated with a vehicle, according to example embodiments.

FIG. 5A illustrates an example vehicle configuration 500A for managing database transactions associated with a vehicle, according to example embodiments. Referring to FIG. 5A, as a particular vehicle 525 is engaged in transactions (e.g., vehicle service, dealer transactions, delivery/pickup, transportation services, etc.), the vehicle may receive assets 510 and/or expel/transfer assets 512 according to a transaction(s). A vehicle processor 526 resides in the vehicle 525 and communication exists between the vehicle processor 526, a database 530, a vehicle processor 526 and the transaction module 520. The transaction module 520 may record information, such as assets, parties, credits, service descriptions, date, time, location, results, notifications, unexpected events, etc. Those transactions in the transaction module 520 may be replicated into a database 530. The database 530 can be one of a SQL database, an RDBMS, a relational database, a non-relational database, a blockchain, a distributed ledger, and may be on board the vehicle, may be off board the vehicle, may be accessed directly and/or through a network, or be accessible to the vehicle.

In one embodiment, a vehicle may engage with another vehicle to perform various actions such as to share, transfer, acquire service calls, etc. when the vehicle has reached a status where the services need to be shared with another vehicle. For example, the vehicle may be due for a battery charge and/or may have an issue with a tire and may be in route to pick up a package for delivery. A vehicle processor resides in the vehicle and communication exists between the vehicle processor, a first database, and a transaction module. The vehicle may notify another vehicle, which is in its network and which operates on its blockchain member service. A vehicle processor resides in the another vehicle and communication exists between the vehicle processor, a second database, the vehicle processor and a transaction module. The another vehicle may then receive the information via a wireless communication request to perform the package pickup from the vehicle and/or from a server (not shown). The transactions are logged in the transaction modules and of both vehicles. The credits are transferred from vehicle to the another vehicle and the record of the transferred service is logged in the first and databases, assuming that the blockchains are different from one another, or are logged in the same blockchain used by all members. The first database can be one of a SQL database, an RDBMS, a relational database, a non-relational database, a blockchain, a distributed ledger, and may be on board the vehicle, may be off board the vehicle, may be accessible directly and/or through a network.

Figure 5B:
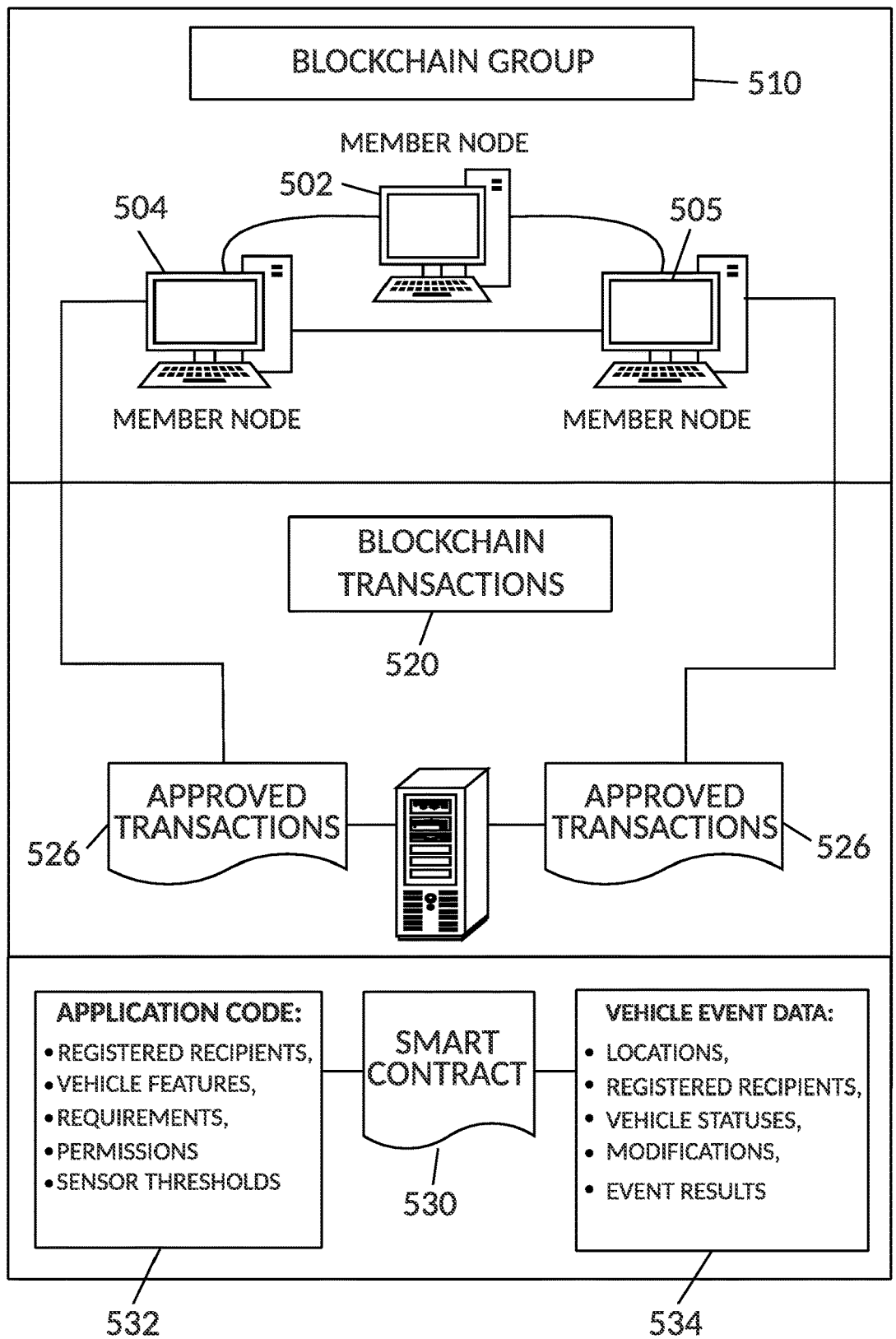
FIG. 5B illustrates an example blockchain group, according to example embodiments.

FIG. 5B illustrates a blockchain architecture configuration 500B, according to example embodiments. Referring to FIG. 5B, the blockchain architecture 500B may include certain blockchain elements, for example, a group of blockchain member nodes 502-506 as part of a blockchain group 510. In one example embodiment, a permissioned blockchain is not accessible to all parties but only to those members with permissioned access to the blockchain data. The blockchain nodes participate in several activities, such as blockchain entry addition and validation process (consensus). One or more of the blockchain nodes may endorse entries based on an endorsement policy and may provide an ordering service for all blockchain nodes. A blockchain node may initiate a blockchain action (such as an authentication) and seek to write to a blockchain immutable ledger stored in the blockchain, a copy of which may also be stored on the underpinning physical infrastructure.

The blockchain transactions 520 are stored in memory of computers as the transactions are received and approved by the consensus model dictated by the members' nodes. Approved transactions 526 are stored in current blocks of the blockchain and committed to the blockchain via a committal procedure, which includes performing a hash of the data contents of the transactions in a current block and referencing a previous hash of a previous block. Within the blockchain, one or more smart contracts 530 may exist that define the terms of transaction agreements and actions included in smart contract executable application code 532, such as registered recipients, vehicle features, requirements, permissions, sensor thresholds, etc. The code may be configured to identify whether requesting entities are registered to receive vehicle services, what service features they are entitled/required to receive given their profile statuses and whether to monitor their actions in subsequent events. For example, when a service event occurs and a user is riding in the vehicle, the sensor data monitoring may be triggered, and a certain parameter, such as a vehicle charge level, may be identified as being above/below a particular threshold for a particular period of time, then the result may be a change to a current status, which requires an alert to be sent to the managing party (i.e., vehicle owner, vehicle operator, server, etc.) so the service can be identified and stored for reference. The vehicle sensor data collected may be based on types of sensor data used to collect information about vehicle's status. The sensor data may also be the basis for the vehicle event data 534, such as a location(s) to be traveled, an average speed, a top speed, acceleration rates, whether there were any collisions, was the expected route taken, what is the next destination, whether safety measures are in place, whether the vehicle has enough charge/fuel, etc. All such information may be the basis of smart contract terms 530, which are then stored in a blockchain. For example, sensor thresholds stored in the smart contract can be used as the basis for whether a detected service is necessary and when and where the service should be performed.

In one embodiment, a blockchain logic example includes a blockchain application interface as an API or plug-in application that links to the computing device and execution platform for a particular transaction. The blockchain configuration may include one or more applications, which are linked to application programming interfaces (APIs) to access and execute stored program/application code (e.g., smart contract executable code, smart contracts, etc.), which can be created according to a customized configuration sought by participants and can maintain their own state, control their own assets, and receive external information. This can be deployed as an entry and installed, via appending to the distributed ledger, on all blockchain nodes.

The smart contract application code provides a basis for the blockchain transactions by establishing application code, which when executed causes the transaction terms and conditions to become active. The smart contract, when executed, causes certain approved transactions to be generated, which are then forwarded to the blockchain platform. The platform includes a security/authorization, computing devices, which execute the transaction management and a storage portion as a memory that stores transactions and smart contracts in the blockchain.

The blockchain platform may include various layers of blockchain data, services (e.g., cryptographic trust services, virtual execution environment, etc.), and underpinning physical computer infrastructure that may be used to receive and store new entries and provide access to auditors, which are seeking to access data entries. The blockchain may expose an interface that provides access to the virtual execution environment necessary to process the program code and engage the physical infrastructure. Cryptographic trust services may be used to verify entries such as asset exchange entries and keep information private.

The blockchain architecture configuration of FIGS. 5A and 5B may process and execute program/application code via one or more interfaces exposed, and services provided, by the blockchain platform. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information may include a new entry, which may be processed by one or more processing entities (e.g., processors, virtual machines, etc.) included in the blockchain layer. The result may include a decision to reject or approve the new entry based on the criteria defined in the smart contract and/or a consensus of the peers. The physical infrastructure may be utilized to retrieve any of the data or information described herein.

Within smart contract executable code, a smart contract may be created via a high-level application and programming language, and then written to a block in the blockchain. The smart contract may include executable code that is registered, stored, and/or replicated with a blockchain (e.g., distributed network of blockchain peers). An entry is an execution of the smart contract code, which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

A smart contract executable code may include the code interpretation of a smart contract, with additional features. As described herein, the smart contract executable code may be program code deployed on a computing network, where it is executed and validated by chain validators together during a consensus process. The smart contract executable code receives a hash and retrieves from the blockchain a hash associated with the data template created by use of a previously stored feature extractor. If the hashes of the hash identifier and the hash created from the stored identifier template data match, then the smart contract executable code sends an authorization key to the requested service. The smart contract executable code may write to the blockchain data associated with the cryptographic details.

Figure 5C:
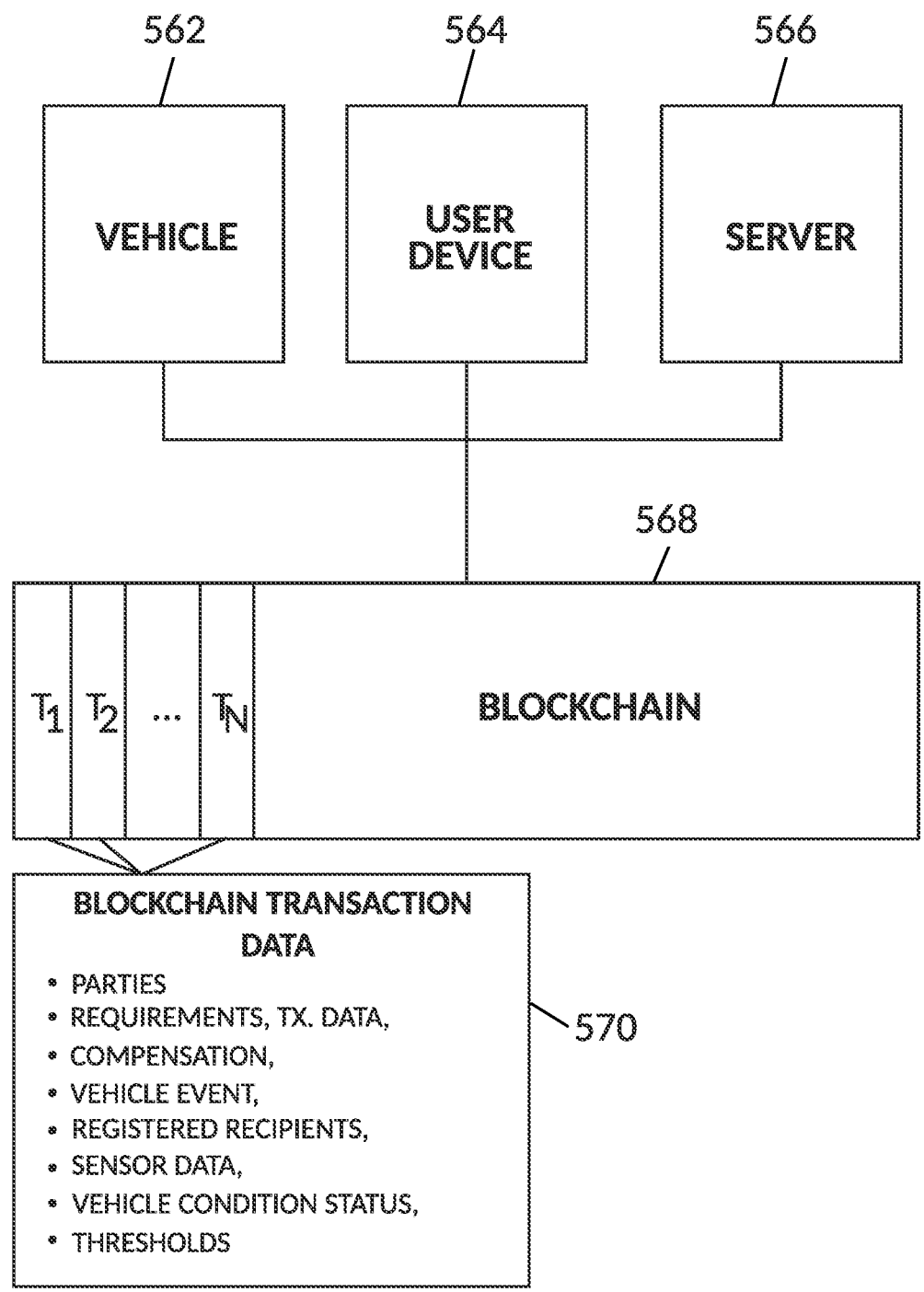
FIG. 5C illustrates an example interaction between elements and a blockchain, according to example embodiments.

FIG. 5C illustrates a blockchain configuration for storing blockchain transaction data, according to example embodiments. Referring to FIG. 5C, the example configuration 500C provides for the vehicle 562, the user device 564 and a server 566 sharing information with a distributed ledger (i.e., blockchain) 568. The server may represent a service provider entity inquiring with a vehicle service provider to share user profile rating information in the event that a known and established user profile is attempting to rent a vehicle with an established rated profile. The server 566 may be receiving and processing data related to a vehicle's service requirements. As the service events occur, such as the vehicle sensor data indicates a need for fuel/charge, a maintenance service, etc., a smart contract may be used to invoke rules, thresholds, sensor information gathering, etc., which may be used to invoke the vehicle service event. The blockchain transaction data 570 is saved for each transaction, such as the access event, the subsequent updates to a vehicle's service status, event updates, etc. The transactions may include the parties, the requirements (e.g., 18 years of age, service eligible candidate, valid driver's license, etc.), compensation levels, the distance traveled during the event, the registered recipients permitted to access the event and host a vehicle service, rights/permissions, sensor data retrieved during the vehicle event operation to log details of the next service event and identify a vehicle's condition status, and thresholds used to make determinations about whether the service event was completed and whether the vehicle's condition status has changed.

Figure 5D:
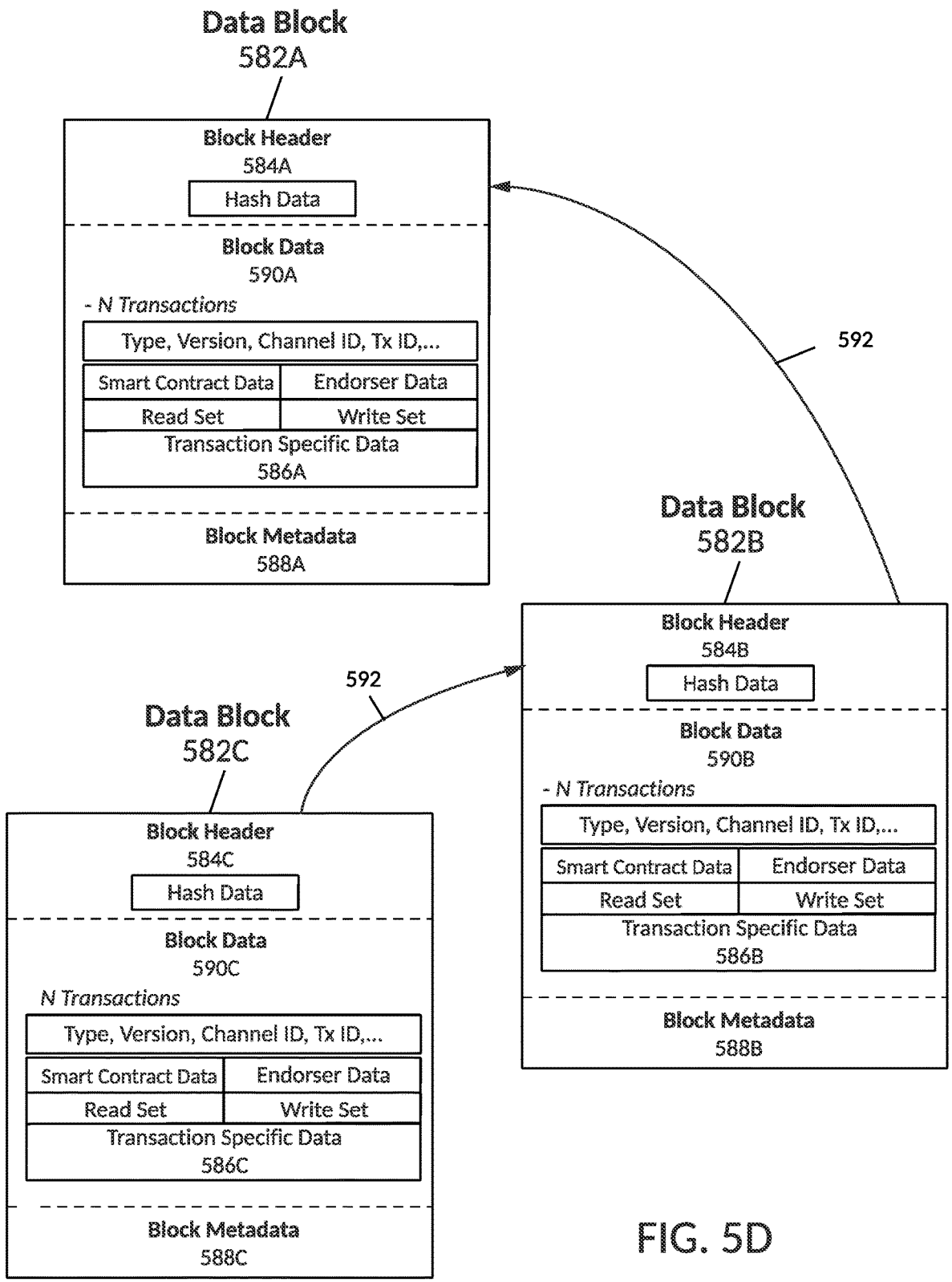
FIG. 5D illustrates an example data block interaction, according to example embodiments.

FIG. 5D illustrates blockchain blocks 580 that can be added to a distributed ledger, according to example embodiments, and contents of block structures 582A to 582*n*. Referring to FIG. 5D, clients (not shown) may submit entries to blockchain nodes to enact activity on the blockchain. As an example, clients may be applications that act on behalf of a requester, such as a device, person, or entity to propose entries for the blockchain. The plurality of blockchain peers (e.g., blockchain nodes) may maintain a state of the blockchain network and a copy of the distributed ledger. Different types of blockchain nodes/peers may be present in the blockchain network including endorsing peers, which simulate and endorse entries proposed by clients and committing peers which verify endorsements, validate entries, and commit entries to the distributed ledger. In this example, the blockchain nodes may perform the role of endorser node, committer node, or both.

The instant system includes a blockchain that stores immutable, sequenced records in blocks, and a state database (current world state) maintaining a current state of the blockchain. One distributed ledger may exist per channel and each peer maintains its own copy of the distributed ledger for each channel of which they are a member. The instant blockchain is an entry log, structured as hash-linked blocks where each block contains a sequence of N entries. Blocks may include various components such as those shown in FIG. 5D. The linking of the blocks may be generated by adding a hash of a prior block's header within a block header of a current block. In this way, all entries on the blockchain are sequenced and cryptographically linked together preventing tampering with blockchain data without breaking the hash links. Furthermore, because of the links, the latest block in the blockchain represents every entry that has come before it. The instant blockchain may be stored on a peer file system (local or attached storage), which supports an append-only blockchain workload.

The current state of the blockchain and the distributed ledger may be stored in the state database. Here, the current state data represents the latest values for all keys ever included in the chain entry log of the blockchain. Smart contract executable code invocations execute entries against the current state in the state database. To make these smart contract executable code interactions extremely efficient, the latest values of all keys are stored in the state database. The state database may include an indexed view into the entry log of the blockchain, it can therefore be regenerated from the chain at any time. The state database may automatically get recovered (or generated if needed) upon peer startup before entries are accepted.

Endorsing nodes receive entries from clients and endorse the entry based on simulated results. Endorsing nodes hold smart contracts, which simulate the entry proposals. When an endorsing node endorses an entry, the endorsing nodes creates an entry endorsement, which is a signed response from the endorsing node to the client application indicating the endorsement of the simulated entry. The method of endorsing an entry depends on an endorsement policy that may be specified within smart contract executable code. An example of an endorsement policy is "the majority of endorsing peers must endorse the entry." Different channels may have different endorsement policies. Endorsed entries are forward by the client application to an ordering service.

The ordering service accepts endorsed entries, orders them into a block, and delivers the blocks to the committing peers. For example, the ordering service may initiate a new block when a threshold of entries has been reached, a timer times out, or another condition. In this example, blockchain node is a committing peer that has received a data block 582A for storage on the blockchain. The ordering service may be made up of a cluster of orderers. The ordering service does not process entries, smart contracts, or maintain the shared ledger. Rather, the ordering service may accept the endorsed entries and specifies the order in which those entries are committed to the distributed ledger. The architecture of the blockchain network may be designed such that the specific implementation of 'ordering' (e.g., Solo, Kafka, BFT, etc.) becomes a pluggable component.

Entries are written to the distributed ledger in a consistent order. The order of entries is established to ensure that the updates to the state database are valid when they are committed to the network. Unlike a cryptocurrency blockchain system (e.g., Bitcoin, etc.) where ordering occurs through the solving of a cryptographic puzzle, or mining, in this example the parties of the distributed ledger may choose the ordering mechanism that best suits that network.

Referring to FIG. 5D, a block 582A (also referred to as a data block) that is stored on the blockchain and/or the distributed ledger may include multiple data segments such as a block header 584A to 584*n*, transaction-specific data 586A to 586*n*, and block metadata 588A to 588*n*. It should be appreciated that the various depicted blocks and their contents, such as block 582A and its contents are merely for purposes of an example and are not meant to limit the scope of the example embodiments. In some cases, both the block header 584A and the block metadata 588A may be smaller than the transaction-specific data 586A, which stores entry data, however, this is not a requirement. The block 582A may store transactional information of N entries (e.g., 100, 500, 1000, 2000, 3000, etc.) within the block data 590A to 590*n*. The block 582A may also include a link to a previous block (e.g., on the blockchain) within the block header 584A. In particular, the block header 584A may include a hash of a previous block's header. The block header 584A may also include a unique block number, a hash of the block data 590A of the current block 582A, and the like. The block number of the block 582A may be unique and assigned in an incremental/sequential order starting from zero. The first block in the blockchain may be referred to as a genesis block, which includes information about the blockchain, its members, the data stored therein, etc.

The block data 590A may store entry information of each entry that is recorded within the block. For example, the entry data may include one or more of a type of the entry, a version, a timestamp, a channel ID of the distributed ledger, an entry ID, an epoch, a payload visibility, a smart contract executable code path (deploy tx), a smart contract executable code name, a smart contract executable code version, input (smart contract executable code and functions), a client (creator) identify such as a public key and certificate, a signature of the client, identities of endorsers, endorser signatures, a proposal hash, smart contract executable code events, response status, namespace, a read set (list of key and version read by the entry, etc.), a write set (list of key and value, etc.), a start key, an end key, a list of keys, a Merkel tree query summary, and the like. The entry data may be stored for each of the N entries.

In some embodiments, the block data 590A may also store transaction-specific data 586A, which adds additional information to the hash-linked chain of blocks in the blockchain. Accordingly, the data 586A can be stored in an immutable log of blocks on the distributed ledger. Some of the benefits of storing such data 586A are reflected in the various embodiments disclosed and depicted herein. The block metadata 588A may store multiple fields of metadata (e.g., as a byte array, etc.). Metadata fields may include signature on block creation, a reference to a last configuration block, an entry filter identifying valid and invalid entries within the block, last offset persisted of an ordering service that ordered the block, and the like. The signature, the last configuration block, and the orderer metadata may be added by the ordering service. Meanwhile, a committer of the block (such as a blockchain node) may add validity/invalidity information based on an endorsement policy, verification of read/write sets, and the like. The entry filter may include a byte array of a size equal to the number of entries in the block data 510A and a validation code identifying whether an entry was valid/invalid.

The other blocks 582B to 582n in the blockchain also have headers, files, and values. However, unlike the first block 582A, each of the headers 584A to 584n in the other blocks includes the hash value of an immediately preceding block. The hash value of the immediately preceding block may be just the hash of the header of the previous block or may be the hash value of the entire previous block. By including the hash value of a preceding block in each of the remaining blocks, a trace can be performed from the Nth block back to the genesis block (and the associated original file) on a block-by-block basis, as indicated by arrows 592, to establish an auditable and immutable chain-of-custody.

The above embodiments may be implemented in hardware, in a computer program executed by a processor, in firmware, or in a combination of the above. A computer program may be embodied on a computer readable media, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 6:
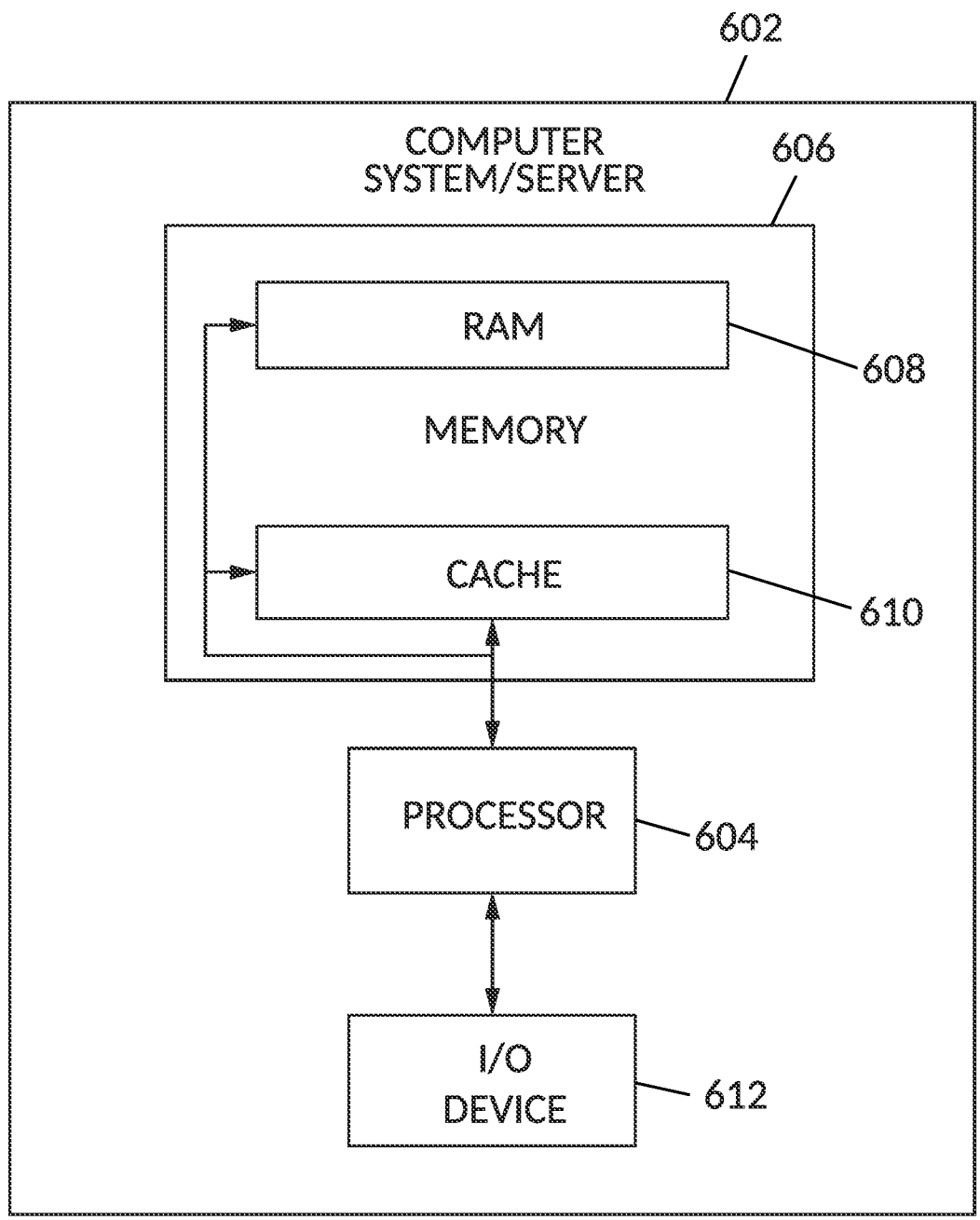
FIG. 6 illustrates an example system that supports one or more of the example embodiments.

An exemplary storage medium may be coupled to the processor such that the processor may read information from, and write information to, the storage medium. In the alternative, the storage medium may be integral to the processor. The processor and the storage medium may reside in an application-specific integrated circuit ("ASIC"). In the alternative, the processor and the storage medium may reside as discrete components. For example, FIG. 6 illustrates an example computer system architecture 600, which may represent or be integrated in any of the above-described components, etc.

Figure 5E:
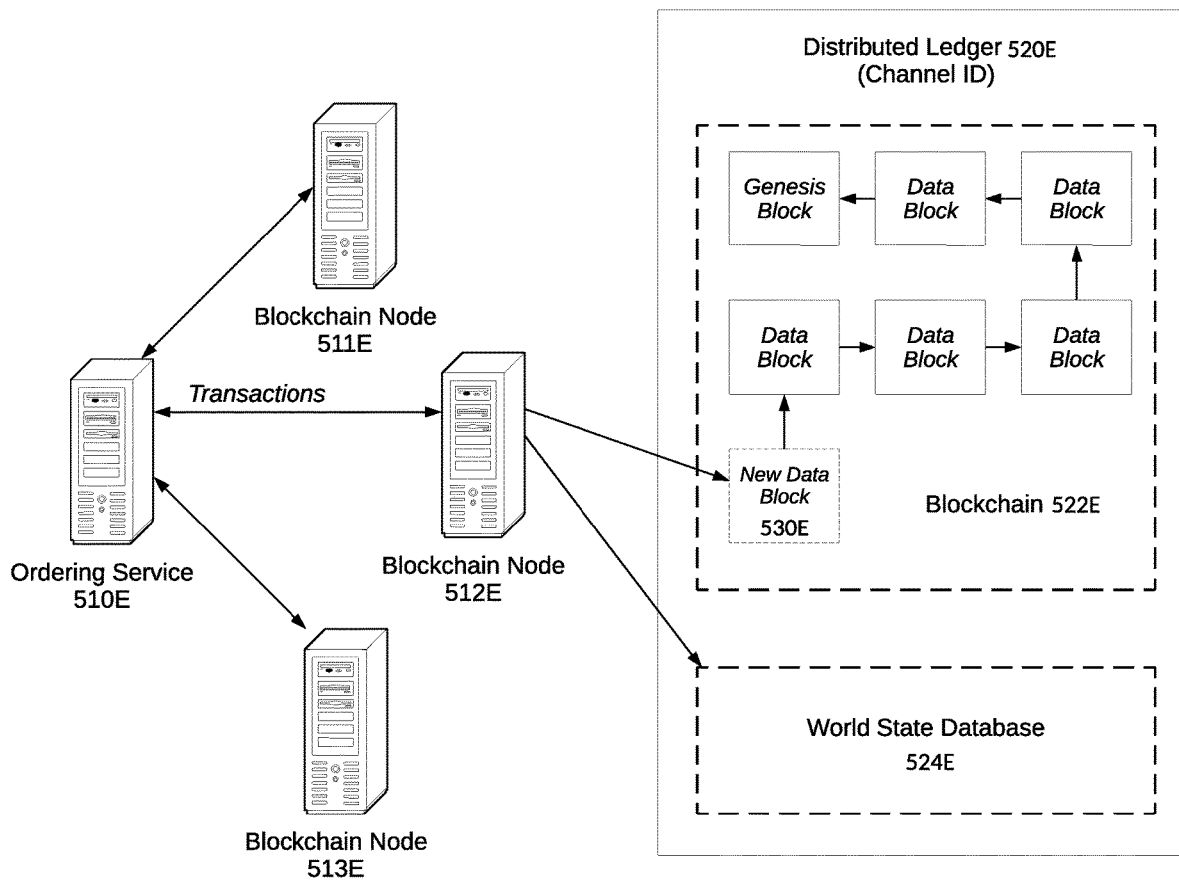
FIG. 5E illustrates a blockchain network diagram, according to example embodiments.

FIG. 5E illustrates a process 500E of a new block being added to a distributed ledger 520E, according to example embodiments, and FIG. 5B illustrates contents of a new data block structure 530E for blockchain, according to example embodiments. Referring to FIG. 5E, clients (not shown) may submit transactions to blockchain nodes 511E, 512E, and/or 513E. Clients may be instructions received from any source to enact activity on the blockchain 520E. As an example, clients may be applications that act on behalf of a requester, such as a device, person, or entity to propose transactions for the blockchain. The plurality of blockchain peers (e.g., blockchain nodes 511E, 512E, and 513E) may maintain a state of the blockchain network and a copy of the distributed ledger 520E. Different types of blockchain nodes/peers may be present in the blockchain network including endorsing peers which simulate and endorse transactions proposed by clients and committing peers which verify endorsements, validate transactions, and commit transactions to the distributed ledger 520. In this example, the blockchain nodes 511E, 512E, and 513E may perform the role of endorser node, committer node, or both.

The distributed ledger 520E includes a blockchain which stores immutable, sequenced records in blocks, and a state database 524E (current world state) maintaining a current state of the blockchain 522E. One distributed ledger 520E may exist per channel and each peer maintains its own copy of the distributed ledger 520E for each channel of which they are a member. The blockchain 522E is a transaction log, structured as hash-linked blocks where each block contains a sequence of N transactions. The linking of the blocks (shown by arrows in FIG. 5E) may be generated by adding a hash of a prior block's header within a block header of a current block. In this way, all transactions on the blockchain 522E are sequenced and cryptographically linked together preventing tampering with blockchain data without breaking the hash links. Furthermore, because of the links, the latest block in the blockchain 522E represents every transaction that has come before it. The blockchain 522E may be stored on a peer file system (local or attached storage), which supports an append-only blockchain workload.

The current state of the blockchain 522E and the distributed ledger 522E may be stored in the state database 524E. Here, the current state data represents the latest values for all keys ever included in the chain transaction log of the blockchain 522E. Chaincode invocations execute transactions against the current state in the state database 524E. To make these chaincode interactions extremely efficient, the latest values of all keys are stored in the state database 524E. The state database 524E may include an indexed view into the transaction log of the blockchain 522E, it can therefore be regenerated from the chain at any time. The state database 524E may automatically get recovered (or generated if needed) upon peer startup before transactions are accepted.

Endorsing nodes receive transactions from clients and endorse the transaction based on simulated results. Endorsing nodes hold smart contracts which simulate the transaction proposals. When an endorsing node endorses a transaction, the endorsing nodes creates a transaction endorsement which is a signed response from the endorsing node to the client application indicating the endorsement of the simulated transaction. The method of endorsing a transaction depends on an endorsement policy which may be specified within chaincode. An example of an endorsement policy is "the majority of endorsing peers must endorse the transaction." Different channels may have different endorsement policies. Endorsed transactions are forward by the client application to ordering service 510E.

The ordering service 510E accepts endorsed transactions, orders them into a block, and delivers the blocks to the committing peers. For example, the ordering service 510E may initiate a new block when a threshold of transactions has been reached, a timer times out, or another condition. In the example of FIG. 5E, blockchain node 512E is a committing peer that has received a new data new data block 530E for storage on blockchain 520E. The first block in the blockchain may be referred to as a genesis block which includes information about the blockchain, its members, the data stored therein, etc.

The ordering service 510E may be made up of a cluster of orderers. The ordering service 510E does not process transactions, smart contracts, or maintain the shared ledger. Rather, the ordering service 510E may accept the endorsed transactions and specifies the order in which those transactions are committed to the distributed ledger 520E. The architecture of the blockchain network may be designed such that the specific implementation of 'ordering' (e.g., Solo, Kafka, BFT, etc.) becomes a pluggable component.

Transactions are written to the distributed ledger 520E in a consistent order. The order of transactions is established to ensure that the updates to the state database 524E are valid when they are committed to the network. Unlike a cryptocurrency blockchain system (e.g., Bitcoin, etc.) where ordering occurs through the solving of a cryptographic puzzle, or mining, in this example the parties of the distributed ledger 520E may choose the ordering mechanism that best suits that network.

When the ordering service 510E initializes a new data block 530E, the new data block 530E may be broadcast to committing peers (e.g., blockchain nodes 511E, 512E, and 513E). In response, each committing peer validates the transaction within the new data block 530E by checking to make sure that the read set and the write set still match the current world state in the state database 524E. Specifically, the committing peer can determine whether the read data that existed when the endorsers simulated the transaction is identical to the current world state in the state database 524E. When the committing peer validates the transaction, the transaction is written to the blockchain 522E on the distributed ledger 520E, and the state database 524E is updated with the write data from the read-write set. If a transaction fails, that is, if the committing peer finds that the read-write set does not match the current world state in the state database 524E, the transaction ordered into a block will still be included in that block, but it will be marked as invalid, and the state database 524E will not be updated.

Figure 5F:
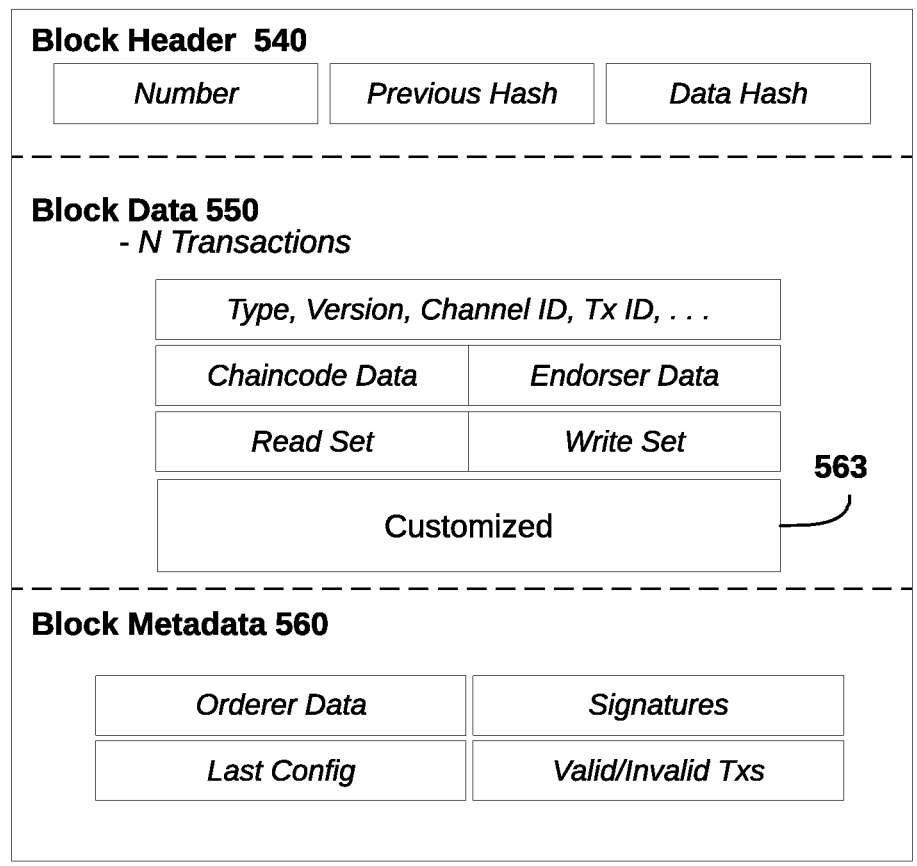
FIG. 5F illustrates an example new data block, according to example embodiments.

Referring to FIG. 5F 500F, a new data block 530 (also referred to as a data block) that is stored on the blockchain 522E of the distributed ledger 520E may include multiple data segments such as a block header 540, block data 550, and block metadata 560. It should be appreciated that the various depicted blocks and their contents, such as new data block 530 and its contents. shown in FIG. 5F are merely examples and are not meant to limit the scope of the example embodiments. The new data block 530 may store transactional information of N transaction(s) (e.g., 1, 10, 100, 500, 1000, 2000, 3000, etc.) within the block data 550. The new data block 530 may also include a link to a previous block (e.g., on the blockchain 522E in FIG. 5E) within the block header 540. In particular, the block header 540 may include a hash of a previous block's header. The block header 540 may also include a unique block number, a hash of the block data 550 of the new data block 530, and the like. The block number of the new data block 530 may be unique and assigned in various orders, such as an incremental/sequential order starting from zero.

The block data 550 may store transactional information of each transaction that is recorded within the new data block 530. For example, the transaction data may include one or more of a type of the transaction, a version, a timestamp, a channel ID of the distributed ledger 520E, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

In one embodiment, block 563 may contain software that is configured to perform determining a route for a vehicle based on an amount of time data is provided to the vehicle and the data is retrieved from the vehicle, a speed of the vehicle, and a location of at least one computing node that is configured to provide and retrieve the data.

In another embodiment, block 563 may contain software that is configured to perform receiving information at a vehicle in proximity to a first node from the first node, sending information from the vehicle to the first node, analyzing the sent information by the first node, determining by the first node that the vehicle will be in proximity to an adjacent node to the first node, after the vehicle is no longer in proximity to the first node, receiving the analyzed information from the first node at the adjacent node, constructing information related to the received analyzed information at the adjacent node, sending the constructed information to the vehicle from the adjacent node.

In another embodiment, block 563 may contain software that is configured to perform establishing a communication between a first vehicle and a computing node, determining data to be transmitted from the computing node to the first vehicle, responsive to a portion of the data being stored on a second vehicle, determining the second vehicle will be in proximity to the first vehicle, transmitting the portion of the data from the second vehicle to the first vehicle when the vehicles are in proximity and a remaining portion of the data from the computing node to the first vehicle.

In another embodiment, block 563 may contain software that is configured to perform determining, by a first node, that an event has occurred in a geographic area, predicting, by the first node, a severity of the event, a duration of the event, and at least one vehicle associated with the event, pending, by the first node, the prediction to a second node and a time the at least one vehicle will be proximate the second node, sending by the second node, notifications to other vehicles proximate the second node to maneuver based on the prediction, prior to the time.

In another embodiment, block 563 may contain software that is configured to perform determining by a primary computing node that an en route vehicle will be delayed for a time-sensitive event, coordinating by the primary computing node with a secondary computing node at an event location and the en route vehicle to provide a real-time event experience to at least one device in the en route vehicle, managing by the primary computing node the real-time event experience between the secondary computing node and the at least one device in the en route vehicle, transferring by the primary computing node the real-time event experience to the secondary computing node when a device of the at least one device is in proximity to the secondary computing node, terminating by the secondary computing node the real-time event experience when the at least one device reaches a specific location within the event location.

Although in FIG. 5F the blockchain data 563 is depicted in the block data 550 but could also be in the block header 540 or the block metadata 560.

The block metadata 560 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 510E. Meanwhile, a committer of the block (such as blockchain node 512E) may add validity/invalidity information based on an endorsement policy, verification of read/write sets, and the like. The transaction filter may include a byte array of a size equal to the number of transactions in the block data 500D and a validation code identifying whether a transaction was valid/invalid.

FIG. 6 is not intended to suggest any limitation as to the scope of use or functionality of embodiments of the application described herein. Regardless, the computing node 600 is capable of being implemented and/or performing any of the functionality set forth hereinabove.

In computing node 600 there is a computer system/server 602, which is operational with numerous other general purpose or special purpose computing system environments or configurations. Examples of well-known computing systems, environments, and/or configurations that may be suitable for use with computer system/server 602 include, but are not limited to, personal computer systems, server computer systems, thin clients, thick clients, hand-held or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Computer system/server 602 may be described in the general context of computer system-executable instructions, such as program modules, being executed by a computer system. Generally, program modules may include routines, programs, objects, components, logic, data structures, and so on that perform tasks or implement abstract data types. Computer system/server 602 may be practiced in distributed cloud computing environments where tasks are performed by remote processing devices that are linked through a communications network. In a distributed cloud computing environment, program modules may be in both local and remote computer system storage media including memory storage devices.

As shown in FIG. 6, computer system/server 602 in cloud computing node 600 is shown in the form of a general-purpose computing device. The components of computer system/server 602 may include, but are not limited to, one or more processors or processing units 604, a system memory 606, and a bus that couples various system components including system memory 606 to processor 604.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media. System memory 606, in one example, implements the flow diagrams of the other figures. The system memory 606 can include computer system readable media in the form of volatile memory, such as random-access memory (RAM) 608 and/or cache memory 610. Computer system/server 602 may further include other removable/non-removable, volatile/non-volatile computer system storage media. By way of example only, memory 606 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 606 may include at least one program product having a set (e.g., at least one) of program modules that are configured to carry out the functions of various embodiments of the application.

Program/utility, having a set (at least one) of program modules, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable media(s) having computer readable program code embodied thereon.

Computer system/server 602 may also communicate with one or more external devices via an I/O device 612 (such as an I/O adapter), which may include a keyboard, a pointing device, a display, a voice recognition module, etc., one or more devices that enable a user to interact with computer system/server 602, and/or any devices (e.g., network card, modem, etc.) that enable computer system/server 602 to communicate with one or more other computing devices. Such communication can occur via I/O interfaces of the device 612. Still yet, computer system/server 602 can communicate with one or more networks such as a local area network (LAN), a general wide area network (WAN), and/or a public network (e.g., the Internet) via a network adapter. As depicted, device 612 communicates with the other components of computer system/server 602 via a bus. Although not shown, other hardware and/or software components could be used in conjunction with computer system/server 602. Examples, include, but are not limited to: microcode, device drivers, redundant processing units, external disk drive arrays, RAID systems, tape drives, and data archival storage systems, etc.

In one embodiment, a shared autonomous vehicle contains passengers who may be en route to a live sports game but are at risk of missing the beginning due to unforeseen traffic delays. Recognizing this delay, the primary computing node, integrated within the vehicle's central system, communicates with the stadium's (secondary computing node) broadcasting system. The primary node arranges for the game to be streamed live to the infotainment system within the vehicle. As the vehicle approaches the stadium and a passenger's smartphone (or another device) gets within range of the stadium's WiFi, the primary node transfers the streaming responsibilities to the secondary computing node. Once the passenger reaches their seat inside the stadium, the secondary node ensures the streaming is halted.

In one embodiment, a vehicle en route to a significant business conference is located at an EV charging station due to a low battery. Aware of the delay and the importance of the event, the vehicle's primary computing node communicates with the secondary computing node at the conference venue. The conference's live feed or video call is then relayed in real-time to the vehicle's onboard infotainment system. As the vehicle gets closer to the conference venue and the individual's device connects to the conference hall's network, the primary node seamlessly transfers the conference call feed to the secondary node, which displays it on the device. Once the individual is seated in the conference room, the call feed on the tablet is automatically terminated.

In one embodiment, a vehicle, such as a driverless taxi heads to a music concert. However, due to unexpected delays, they'll miss the opening act. The primary computing node within the taxi communicates this delay to the concert venue's secondary computing node. The concert venue then provides a live feed of the opening act to the taxi's surround sound system and visual displays. As the taxi arrives in the parking area of the concert venue and the passengers' smartwatches connect to the venue's network, the primary node transfers the live feed responsibilities to the secondary node. By the time the group reaches the main stage area, the live feed on their smartwatches is automatically terminated, ensuring they transition smoothly from the virtual to the live experience.

In one embodiment, a collision is detected by a vehicle using onboard cameras and sensors. A vehicle-to-everything (V2X module sends an alert to an Urban Traffic Management System, referred to herein as the first node. Using AI functionality executing on the first node, the first node estimates the severity and expected duration of the disruption. The system then communicates with the secondary node controlling the intersection to alert approaching vehicles, using the V2X communications, to recommend alternative routes or precautionary measures.

In one embodiment, upon the system detecting a spill on the road has occurred, the truck's sensors trigger an alert, which, via V2X, is sent to the Highway Management System (first node). The first node may include cameras, road sensors, and V2X communication to detect and respond to incidents. The system, using AI algorithms, determines the extent and possible duration of the cleanup. It communicates with a second node managing a rest area to inform and divert approaching vehicles, using the V2X communication systems, to alternative routes or to halt at the rest area.

In one embodiment, the current solution is used for map updates. For example, a first vehicle may request the latest map update from a central traffic management computing node. The node determines that the most recent data, which includes a new road closure, is available on another vehicle, such as a taxi (second vehicle) nearby, due to its frequent runs in the area. Recognizing that the two vehicles will soon cross paths, the node orchestrates a data transfer. As the two vehicles come within proximity, the taxi transmits the latest map information to the car while the computing node sends the remainder of the map data. Vehicle-to-vehicle (V2V) Communication Modules enable direct data transfer between vehicles when in proximity. The onboard navigation system in the first vehicle may request and process the map data, and the computing nodes may contain updated map data, and a tracking system, that monitors the position of all connected vehicles to determine proximity.

In one embodiment, the current solution may be utilized in a remote area with weak network connections. For example, a car (first vehicle) may be unable to download the latest software update directly from the manufacturer's computing node. However, a nearby vehicle (second vehicle), which recently visited an urban area, has already downloaded the latest software patch. Recognizing the opportunity, the computing node instructs the second vehicle to relay the software update to the first vehicle when they come close, while any additional or non-critical data is downloaded directly from the computing node when the network permits.

In one embodiment, the current solution to execute adaptive traffic light systems. For example, as a car approaches a traffic light (first node), it sends data about its speed, intended direction, and current fuel/electricity level using V2X communication, for example. The traffic light system analyzes this data and anticipates that, based on the car's current trajectory and speed, it will soon approach the next traffic light (adjacent node). The first traffic light sends this analyzed data to the adjacent traffic light, which, in turn, processes this information, possibly adjusting its light cycle for optimal traffic flow and energy efficiency for the vehicle. The adjacent traffic light then sends a predictive light-change schedule to the approaching vehicle, allowing it to optimize its speed for a potential "green wave."

In one embodiment, the current solution is used for dynamic EV charging recommendations. For example, an EV communicates with a charging station (first node), sending details about its current battery status, consumption rate, and intended route. The charging station, upon analyzing the data, determines that the EV will likely need another charging stop before reaching its destination. Knowing the location of the next charging station (adjacent node) along the route, the first node sends this data there. The adjacent charging station then checks its current queue and availability, constructs information regarding optimal charging times, and sends this recommendation to the EV, ensuring it faces minimal waiting time upon arrival.

In one embodiment, a smart parking system is described. For example, as a car enters a large parking complex, it interacts with a parking information system (first node) near the entrance, sending details about its size and parking preferences. The system analyzes the vehicle's data and predicts its likely path through the parking area. Anticipating that the car will soon be near another part of the parking area (adjacent node), the initial system sends this prediction there. The adjacent node, which has its own real-time data about available parking spots, constructs a list of suitable and available spots based on the car's size and preference and then sends this information to the approaching vehicle, ensuring a streamlined parking experience.

In one embodiment, the current solution is used for advanced entertainment system updates in rental cars. Rental cars, especially in tourist-heavy areas, frequently update their onboard entertainment and information systems with the latest city guides, music, podcasts, and movies. Upon entering the car, a user's mobile device pairs with the car, triggering the system to determine the data it should provide (localized entertainment) and retrieve (user preferences from previous rentals). The car's system calculates the most efficient route to their destination that also passes by several computing nodes (localized data centers) spread throughout the city. These nodes facilitate quick data exchange. If the car approaches a node in a congested area, it gets notified to maintain a slower speed, ensuring complete data transfer. Meanwhile, if the traveler alters their destination to a location off the predicted path, the original computing node coordinates with another one closer to the new route, ensuring continuous data exchange services.

In one embodiment, a dynamic software patching in freight transport is described. For example, large freight trucks are equipped with autonomous driving features, real-time software updates, and diagnostics. A control center realizes that a particular truck needs a vital software patch and wants to retrieve engine performance data from its last long-haul journey.

Based on the truck's intended route, weight (which affects its speed), and the location of computing nodes, an optimal path is outlined. As the truck cruises on the highway, it gets informed in advance to adjust its speed for seamless data transfer when it approaches a node. This ensures that the truck always has the latest software for safety and optimal performance. If, due to road conditions, the truck deviates from its planned path, the data prepared at the original node is swiftly transferred to another node along the truck's new trajectory.

In one embodiment, a personalized travel recommendation is described. For example, in smart cities, public buses are fitted with systems that offer personalized travel recommendations to daily commuters based on their travel history. As commuters board the bus using their smart cards or mobile apps, the system quickly determines the travel recommendations and ads to be displayed to them, as well as gathers data about their current trip for future analytics.

Knowing its regular stops (computing nodes), the bus calculates the optimal speed and route, considering traffic conditions and boarding patterns. For efficient data transfer at bus stops (nodes), the bus may adjust its halt duration. For example, if a popular tourist spot has an event causing an influx of new riders, the bus might halt for a few more seconds at the nearby stop, ensuring data transfer for all new boarders. If there's a sudden route change due to roadwork, the initial bus stop node communicates with the next one on the altered route to ensure seamless recommendation services.

Although an exemplary embodiment of at least one of a system, method, and non-transitory computer readable media has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver, or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules to emphasize their implementation independence more particularly. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field-programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations that, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations, including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order and/or with hardware elements in configurations that are different from those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
identifying, by a computing node, data to be provided to a first vehicle;
providing a first portion of the data to the first vehicle by a computing node proximate to the first vehicle; and
instructing, by the computing node, a second vehicle to provide a second portion of the data to the first vehicle based on the first vehicle and the second vehicle being within a certain proximity to each other.

2. The method of claim 1, comprising:
responsive to establishing communication between the first vehicle and the computing node, identifying by the computing node that the first vehicle is missing the second portion.

3. The method of claim 1, comprising:
detecting the second vehicle stores the second portion by the computing node.

4. The method of claim 1, comprising:
providing the second portion of the data to the second vehicle by the computing node, wherein the first portion is different than the second portion.

5. The method of claim 1, comprising:
instructing, by the computing node, a third vehicle to provide a third portion of the data to the first vehicle based on the first vehicle and the third vehicle being within the certain proximity to each other.

6. The method of claim 1, wherein the computing node and the computing node proximate to the first vehicle are a same computing node or are different computing nodes.

7. The method of claim 1, comprising:
identifying a priority of the first portion and the second portion by the computing node; and
providing the first portion and the second portion in order of highest priority first.

8. A computing node, comprising:
a processor that executes instructions stored in a memory to configure the processor to:
identify data to be provided to a first vehicle;
provide a first portion of the data to the first vehicle by a computing node proximate to the first vehicle; and
instruct a second vehicle to provide a second portion of the data to the first vehicle based on the first vehicle and the second vehicle being within a certain proximity to each other.

9. The computing node of claim 8, wherein the processor is configured to:
responsive to communication between the first vehicle and the computing node being established, identify that the first vehicle is missing the second portion.

10. The computing node of claim 8, wherein the processor is configured to:
detect the second vehicle stores the second portion by the computing node.

11. The computing node of claim 8, wherein the processor is configured to:
provide the second portion of the data to the second vehicle by the computing node, wherein the first portion is different than the second portion.

12. The computing node of claim 8, wherein the processor is configured to:
instruct a third vehicle to provide a third portion of the data to the first vehicle based on the first vehicle and the third vehicle being within the certain proximity to each other.

13. The computing node of claim 8, wherein the computing node and the computing node proximate to the first vehicle are a same computing node or are different computing nodes.

14. The computing node of claim 8, wherein the processor is configured to:
identifying a priority of the first portion and the second portion by the computing node; and
providing the first portion and the second portion in order of highest priority first.

15. A non-transitory computer-readable storage medium comprising instructions that, when executed by a processor of a computing node, cause the processor to perform:
identifying data to be provided to a first vehicle;
providing a first portion of the data to the first vehicle by a computing node proximate to the first vehicle; and
instructing a second vehicle to provide a second portion of the data to the first vehicle based on the first vehicle and the second vehicle being within a certain proximity to each other.

16. The non-transitory computer-readable storage medium of claim 15, wherein the instructions cause the processor to perform:
responsive to establishing communication between the first vehicle and the computing node, identifying by the computing node that the first vehicle is missing the second portion.

17. The non-transitory computer-readable storage medium of claim 16, wherein the instructions cause the processor to perform:
detecting the second vehicle stores the second portion by the computing node.

18. The non-transitory computer-readable storage medium of claim 15, wherein the instructions cause the processor to perform:
providing the second portion of the data to the second vehicle by the computing node, wherein the first portion is different than the second portion.

19. The non-transitory computer-readable storage medium of claim 15, wherein the instructions cause the processor to perform:
instructing a third vehicle to provide a third portion of the data to the first vehicle based on the first vehicle and the third vehicle being within the certain proximity to each other.

20. The non-transitory computer-readable storage medium of claim 15, wherein the computing node and the computing node proximate to the first vehicle are a same computing node, or are different computing nodes.

* * * * *